United States Patent
Ishiwata et al.

(10) Patent No.: US 11,015,060 B2
(45) Date of Patent: *May 25, 2021

(54) POLYMER, MOLDED BODY, FOAM, RESIN COMPOSITION, AND PRODUCTION METHOD FOR POLYMER

(71) Applicant: Sumitomo Chemical Company, Limited, Tokyo (JP)

(72) Inventors: Koji Ishiwata, Osaka (JP); Yasutoyo Kawashima, Osaka (JP); Yoshinobu Nozue, Tokyo (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 169 days.

This patent is subject to a terminal disclaimer.

(21) Appl. No.: 16/309,728

(22) PCT Filed: Jun. 13, 2017

(86) PCT No.: PCT/JP2017/021845
§ 371 (c)(1),
(2) Date: Dec. 13, 2018

(87) PCT Pub. No.: WO2017/217419
PCT Pub. Date: Dec. 21, 2017

(65) Prior Publication Data
US 2019/0144676 A1    May 16, 2019

(30) Foreign Application Priority Data
Jun. 15, 2016 (JP) .............................. JP2016-119207

(51) Int. Cl.
| | | |
|---|---|---|
| *C08F 210/02* | (2006.01) | |
| *C08F 220/18* | (2006.01) | |
| *C08F 8/14* | (2006.01) | |
| *C08L 101/12* | (2006.01) | |
| *C08L 33/06* | (2006.01) | |
| *C08F 8/00* | (2006.01) | |
| *C08L 101/02* | (2006.01) | |
| *C08L 101/08* | (2006.01) | |

(52) U.S. Cl.
CPC .............. *C08L 101/12* (2013.01); *C08F 8/00* (2013.01); *C08F 8/14* (2013.01); *C08L 33/06* (2013.01); *C08L 101/025* (2013.01); *C08F 210/02* (2013.01); *C08F 220/1818* (2020.02); *C08L 101/08* (2013.01); *C08L 2312/00* (2013.01)

(58) Field of Classification Search
CPC .... C08F 220/1818; C08F 8/14; C08F 210/02; C08L 33/08; C08L 33/10
See application file for complete search history.

(56) References Cited

U.S. PATENT DOCUMENTS

| | | |
|---|---|---|
| 3,350,372 A | 10/1967 | Anspon et al. |
| 3,510,448 A | 5/1970 | Byler et al. |
| 3,642,459 A | 2/1972 | Ilnyckyj |
| 3,700,754 A | 10/1972 | Schmitt et al. |
| 4,782,110 A | 11/1988 | Wolfe, Jr. |
| 4,990,566 A | 2/1991 | Hert |
| 5,252,675 A | 10/1993 | Moteki et al. |
| 5,656,692 A * | 8/1997 | Hayes ........................ C08F 8/14 525/330.6 |
| 6,037,297 A | 3/2000 | Stibrany et al. |
| 6,200,720 B1 | 3/2001 | Tagami |
| 6,803,424 B2 * | 10/2004 | Bendler .................... C08F 8/14 525/326.1 |
| 8,202,958 B2 | 6/2012 | Demirors et al. |
| 9,574,146 B2 * | 2/2017 | Garcia Castro ........ C10G 71/00 |
| 10,208,192 B2 | 2/2019 | Garcia Castro et al. |
| 10,370,467 B2 * | 8/2019 | Miura ..................... C08L 23/26 |
| 2004/0170816 A1 | 9/2004 | Watanabe et al. |
| 2005/0049373 A1 | 3/2005 | Minami et al. |
| 2005/0106392 A1 | 5/2005 | Sano et al. |
| 2007/0157509 A1 | 7/2007 | Siggelkow et al. |
| 2007/0225446 A1 | 9/2007 | Nakano et al. |

(Continued)

FOREIGN PATENT DOCUMENTS

| | | |
|---|---|---|
| EP | 0184321 A2 | 6/1986 |
| JP | H10152524 A | 6/1998 |

(Continued)

OTHER PUBLICATIONS

International Preliminary Report on Patentability dated Dec. 18, 2018 in International Application No. PCT/JP2017/021845.
International Search Report dated Sep. 19, 2017 in International Application No. PCT/JP2017/021845.
Extended European Search Report dated May 11, 2020 in EP Application No. 17813315.3.
Extended European Search Report dated Nov. 30, 2018 in EP Application No. 15869879.5.
Int'l Preliminary Report on Patentability dated Jun. 29, 2017 in Int'l Application No. PCT/JP2015/084613.

(Continued)

*Primary Examiner* — Rip A Lee
(74) *Attorney, Agent, or Firm* — Panitch Schwarze Belisario & Nadel LLP

(57) ABSTRACT

Provided is a polymer having a sharp melting peak and allowing easy adjustment of the melting peak temperature. Specifically provided is a polymer having two or more kinds of constitutional units containing an alkyl group having 14 or more and 30 or less carbon atoms, wherein the proportions of the number of the two or more kinds of constitutional units containing an alkyl group having 14 or more and 30 or less carbon atoms are each 20% or more, with respect to 100% of the total number of all constitutional units containing an alkyl group having 14 or more and 30 or less carbon atoms. An enthalpy of fusion of the polymer observed within a temperature range of 10° C. or higher and lower than 60° C. in differential scanning calorimetry is 30 J/g or more.

9 Claims, 1 Drawing Sheet

(56) References Cited

U.S. PATENT DOCUMENTS

| | | | |
|---|---|---|---|
| 2009/0118451 A1 | 5/2009 | Fuchs et al. | |
| 2010/0016513 A1 | 1/2010 | Hartmann et al. | |
| 2012/0005951 A1* | 1/2012 | Mahling | C08F 220/18 |
| | | | 44/388 |
| 2015/0105477 A1* | 4/2015 | Nakatsuka | A61Q 19/00 |
| | | | 514/772.6 |
| 2016/0326331 A1 | 11/2016 | Hamajima et al. | |
| 2017/0121516 A1 | 5/2017 | Kawashima et al. | |
| 2018/0030175 A1 | 2/2018 | Miura et al. | |
| 2019/0002779 A1* | 1/2019 | Feustel | C10L 1/195 |

FOREIGN PATENT DOCUMENTS

| | | | |
|---|---|---|---|
| JP | H10330742 A | 12/1998 | |
| JP | H11194494 A | 7/1999 | |
| JP | 2003026839 A | 1/2003 | |
| JP | 2004027189 A | 1/2004 | |
| JP | 2007186700 A | 7/2007 | |
| JP | 2008214535 A | 9/2008 | |
| JP | 2011213803 A | 10/2011 | |
| JP | 2015091903 A | 5/2015 | |
| WO | 9930822 A1 | 6/1999 | |
| WO | 2015099086 A1 | 7/2015 | |
| WO | 2015156416 A1 | 10/2015 | |
| WO | 2016098674 A1 | 6/2016 | |
| WO | WO-2016098674 A1 * | 6/2016 | C08K 5/14 |

OTHER PUBLICATIONS

Office Action dated Jan. 17, 2019 in CN Application No. 201580067900.0.

Office Action dated Apr. 26, 2016 in JP Application No. 2015561803.

Office Action dated Sep. 17, 2018 in U.S. Appl. No. 15/535,606, by Miura.

Partial European Search Report dated Aug. 17, 2018 in EP Application No. 15869879.5.

Yokota et al., "Synthesis of Sequence-Ordered Copolymer. Hydrogenation of Alternating Butadiene-Methyl Methacrylate Copolymer," American Chemical Society, Macromolecules, vol. 14, No. 6, pp. 1613-1616 (1981).

Yokota et al., "Synthesis, Structure, and Thermal Properties of Widely-Spaced Comb-Like Polymers," Polymer Journal, vol. 15, No. 12, pp. 891-898 (1983).

Office Action dated Aug. 4, 2020 in CN Application No. 201780036880.X.

Office Action dated Jul. 21, 2020 in IN Application No. 20194700651.

Office Action dated Jan. 25, 2021 in in Application No. 201947000651.

* cited by examiner

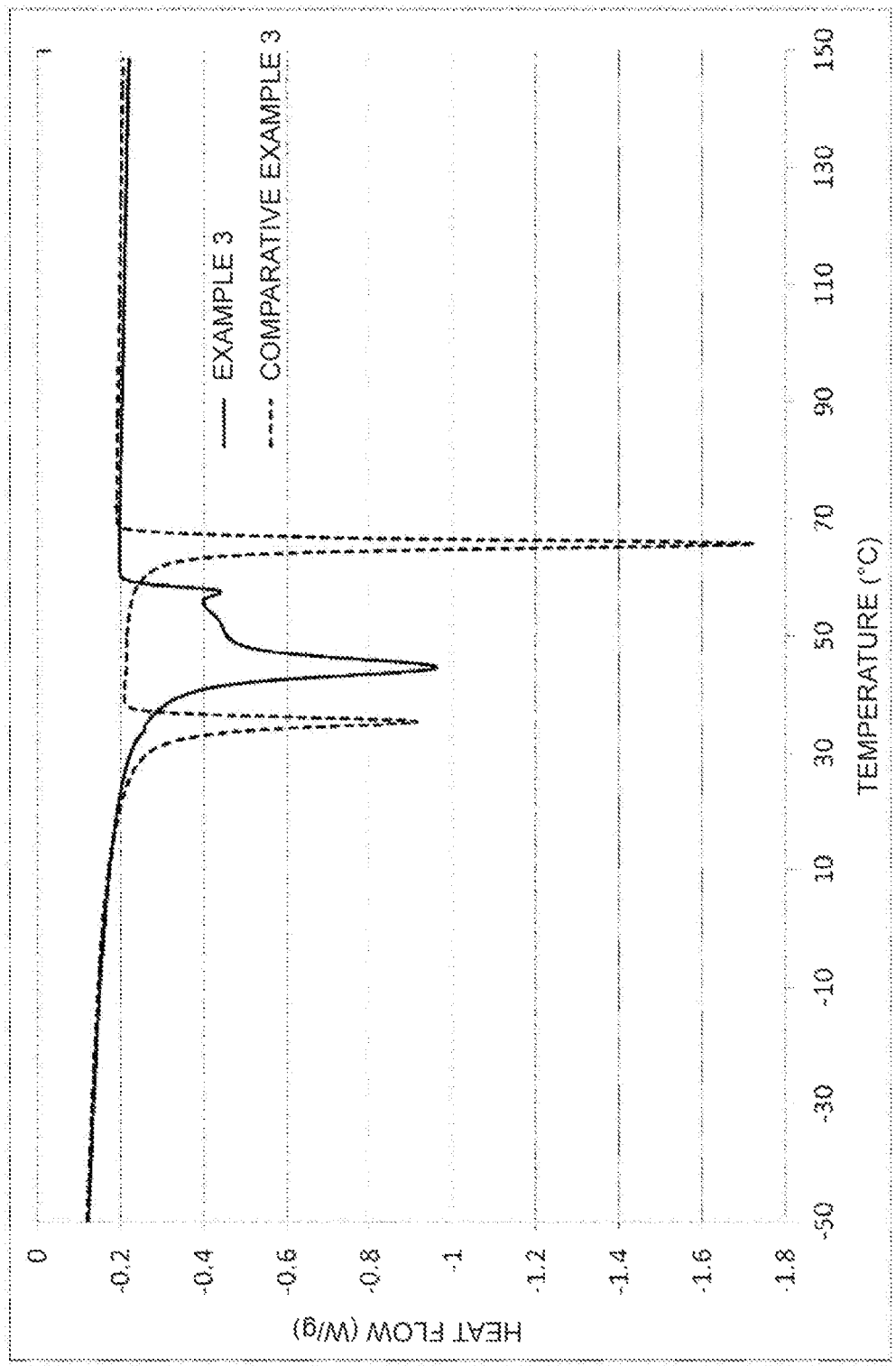

POLYMER, MOLDED BODY, FOAM, RESIN COMPOSITION, AND PRODUCTION METHOD FOR POLYMER

CROSS-REFERENCE TO RELATED APPLICATION

This application is a Section 371 of International Application No. PCT/JP2017/021845, filed Jun. 13, 2017, which was published in the Japanese language on Dec. 21, 2017 under International Publication No. WO 2017/217419 A1, which claims priority under 35 U.S.C. § 119(b) to Japanese Application No. 2016-119207, filed Jun. 15, 2016, and the disclosures of which are incorporated herein by reference.

TECHNICAL FIELD

The present invention relates to a polymer, a molded article, a foam, a resin composition, and a production method for a polymer.

BACKGROUND ART

Patent Literature 1 describes an olefin polymer as a polymer having heat storage performance, wherein the olefin polymer includes a main chain including a monomer unit based on ethylene and branches having five or more carbon atoms, the number of branches is in the range of 20 or more and 40 or less per 1000 carbon atoms, the melting peak temperature observed with a differential scanning calorimeter is in the range of 10° C. or higher and 50° C. or lower, the crystallization peak temperature is in the range of 0° C. or higher and 40° C. or lower, and the enthalpy of fusion is 50 J/g or more.

CITATION LIST

Patent Literature

Patent Literature 1: Japanese Unexamined Patent Publication No. 2015-91903

SUMMARY OF INVENTION

Technical Problem

It is desirable for heat storage materials to be capable of efficiently storing and releasing heat in accordance with the usage environment. It is preferable for this purpose that the melting peak of a polymer contained in a heat storage material be a sharp peak, and easiness in adjustment of the melting peak temperature is required.

An object of the present invention is to provide a polymer having a sharp melting peak and allowing easy adjustment of the melting peak temperature.

Solution to Problem

To solve the above problem, the present invention provides any of the followings.
1) A polymer comprising:
two or more kinds of constitutional units containing an alkyl group having 14 or more and 30 or less carbon atoms, wherein
proportions of the number of the two or more kinds of constitutional units containing an alkyl group having 14 or more and 30 or less carbon atoms are each 20% or more, with respect to 100% of the total number of all constitutional units containing an alkyl group having 14 or more and 30 or less carbon atoms, and
an enthalpy of fusion of the polymer observed within a temperature range of 10° C. or higher and lower than 60° C. in differential scanning calorimetry is 30 J/g or more.

2) The polymer according to 1), wherein the polymer is a polymer comprising a constitutional unit (B) represented by the following formula (1):

[Chemical Formula 1]

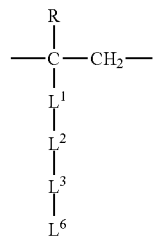

formula (1)

wherein

R represents a hydrogen atom or a methyl group;

$L^1$ represents a single bond, —CO—O—, —O—CO—, or —O—;

$L^2$ represents a single bond, —$CH_2$—, —$CH_2$—$CH_2$—, —$CH_2$—$CH_2$—$CH_2$—, —$CH_2$—CH(OH)—$CH_2$—, or —$CH_2$—CH($CH_2$OH)—;

$L^3$ represents a single bond, —CO—O—, —O—CO—, —O—, —CO—NH—, —NH—CO—, —CO—NH—CO—, —NH—CO—NH—, —NH—, or —N($CH_3$)—;

$L^6$ represents an alkyl group having 14 or more and 30 or less carbon atoms; and a left side and a right side of each of the horizontal chemical formulas for describing chemical structures of $L^1$, $L^2$, and $L^3$ correspond to an upper side of the formula (1) and a lower side of the formula (1), respectively.

3) The polymer according to 1) or 2), wherein the polymer comprises a constitutional unit (A) derived from ethylene and a constitutional unit (B) represented by the following formula (1), and optionally comprises at least one constitutional unit (C) selected from the group consisting of a constitutional unit represented by the following formula (2) and a constitutional unit represented by the following formula (3);

a proportion of the number of the constitutional unit (A) is 70% or more and 99% or less and a proportion of the number of the constitutional unit (B) and the constitutional unit (C) in total is 1% or more and 30% or less, with respect to 100% of the total number of the constitutional unit (A), the constitutional unit (B) and the constitutional unit (C); and a proportion of the number of the constitutional unit (B) is 1% or more and 100% or less and a proportion of the number of the constitutional unit (C) is 0% or more and 99% or less, with respect to 100% of the total number of the constitutional unit (B) and the constitutional unit (C):

[Chemical Formula 2]

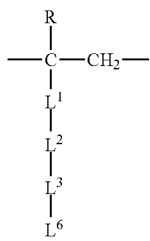

formula (1)

wherein

R represents a hydrogen atom or a methyl group;

$L^1$ represents a single bond, —CO—O—, —O—CO—, or —O—;

$L^2$ represents a single bond, —CH$_2$—, —CH$_2$—CH$_2$—, —CH$_2$—CH$_2$—CH$_2$—, —CH$_2$—CH(OH)—CH$_2$—, or —CH$_2$—CH(CH$_2$OH)—;

$L^3$ represents a single bond, —CO—O—, —O—CO—, —O—, —CO—NH—, —NH—CO—, —CO—NH—CO—, —NH—CO—NH—, —NH—, or —N(CH$_3$)—;

$L^6$ represents an alkyl group having 14 or more and 30 or less carbon atoms; and a left side and a right side of each of the horizontal chemical formulas for describing chemical structures of $L^1$, $L^2$, and $L^3$ correspond to an upper side of the formula (1) and a lower side of the formula (1), respectively,

[Chemical Formula 3]

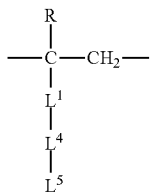

formula (2)

wherein

R represents a hydrogen atom or a methyl group;

$L^1$ represents a single bond, —CO—O—, —O—CO—, or —O—;

$L^4$ represents an alkylene group having one or more and eight or less carbon atoms;

$L^5$ represents a hydrogen atom, an epoxy group, —CH(OH)—CH$_2$OH, a carboxy group, a hydroxy group, an amino group, or an alkylamino group having one or more and four or less carbon atoms; and a left side and a right side of each of the horizontal chemical formulas for describing a chemical structure of $L^1$ correspond to an upper side of the formula (2) and a lower side of the formula (2), respectively,

[Chemical Formula 4]

formula (3)

4) The polymer according to 3), wherein a proportion of the number of the constitutional unit (A), the constitutional unit (B) and the constitutional unit (C) in total is 90% or more, with respect to 100% of the total number of all constitutional units contained in the polymer.

5) The polymer according to any one of 1) to 4), wherein a ratio defined as the following formula (I), A, is 0.95 or lower:

$$A = \alpha_1 / \alpha_0 \quad (I)$$

wherein $\alpha_1$ represents a value obtained by using a method comprising: measuring an absolute molecular weight and an intrinsic viscosity of a polymer by using gel permeation chromatography with an apparatus equipped with a light scattering detector and a viscosity detector; plotting measurements in such a manner that logarithms of the absolute molecular weight are plotted on an abscissa and logarithms of the intrinsic viscosity are plotted on an ordinate; and performing least squares approximation for the logarithms of the absolute molecular weight and the logarithms of the intrinsic viscosity by using the formula (I-I) within a range of not less than a logarithm of a weight-average molecular weight of the polymer and not more than a logarithm of a z-average molecular weight of the polymer along the abscissa to derive a slope of a line representing the formula (I-I) as $\alpha_1$:

$$\log[\eta_1] = \alpha_1 \log M_1 + \log K_1 \quad (I\text{-}I)$$

wherein $[\eta_1]$ represents an intrinsic viscosity (unit: dl/g) of the polymer, $M_1$ represents an absolute molecular weight of the polymer, and $K_1$ represents a constant; and $\alpha_0$ represents a value obtained by using a method comprising: measuring an absolute molecular weight and an intrinsic viscosity of Polyethylene Standard Reference Material 1475a produced by National Institute of Standards and Technology by using gel permeation chromatography with an apparatus equipped with a light scattering detector and a viscosity detector, plotting measurements in such a manner that logarithms of the absolute molecular weight are plotted on an abscissa and logarithms of the intrinsic viscosity are plotted on an ordinate; and performing least squares approximation for the logarithms of the absolute molecular weight and the logarithms of the intrinsic viscosity by using the formula (I-II) within a range of not less than a logarithm of a weight-average molecular weight of the Polyethylene Standard Reference Material 1475a and not more than a logarithm of a z-average molecular weight of the Polyethylene Standard Reference Material 1475a along the abscissa to derive a slope of a line representing the formula (I-II) as $\alpha_0$:

$$\log[\eta_0] = \alpha_0 \log M_0 + \log K_0 \quad (I\text{-}II)$$

wherein $[\eta_0]$ represents an intrinsic viscosity (unit: dl/g) of the Polyethylene Standard Reference Material 1475a, $M_0$ represents an absolute molecular weight of the Polyethylene Standard Reference Material 1475a, and $K_0$ represents a constant, provided that in the measurement of the absolute molecular weight and the intrinsic viscosity of each of the polymer and the Polyethylene Standard Reference Material 1475a by using gel permeation chromatography, a mobile phase is ortho-dichlorobenzene and the measurement temperature is 155° C.

6) The polymer according to any one of 1) to 5), wherein the polymer is a crosslinked polymer.

7) The polymer according to any one of 1) to 6), wherein a gel fraction of the polymer is 20 wt % or more.

8) A molded article comprising the polymer according to any one of 1) to 7).

9) A foam comprising the polymer according to any one of 1) to 7).

10) A resin composition comprising:

a polymer (1) which is the polymer according to 1); and a polymer (2) which is a polymer whose melting peak temperature or glass transition temperature observed in differential scanning calorimetry is 50° C. or higher and 180° C. or lower, provided that the polymer (2) is different from an excluded polymer defined below, wherein a content of the polymer (1) is 30 wt % or more and 99 wt % or less and a content of the polymer (2) is 1 wt % or more and 70 wt % or less, with respect to 100 wt % of the total amount of the polymer (1) and the polymer (2), the excluded polymer is a polymer comprising two or more kinds of constitutional units containing an alkyl group having 14 or more and 30 or less carbon atoms, proportions of the number of the two or more kinds of constitutional units containing an alkyl group having 14 or more and 30 or less carbon atoms in the excluded polymer are each 20% or more, with respect to 100% of the total number of all constitutional units containing an alkyl group having 14 or more and 30 or less carbon atoms, and an enthalpy of fusion of the excluded polymer observed in a temperature range of 10° C. or higher and lower than 60° C. in differential scanning calorimetry is 30 J/g or more.

11) A production method for the polymer according to any one of 1) to 7), comprising:

a step of reacting a polymer comprising at least one constitutional unit (C) selected from the group consisting of a constitutional unit represented by the following formula (2) and a constitutional unit represented by the following formula (3) with two or more kinds of compounds selected from the group consisting of an alcohol containing an alkyl group having 14 or more and 30 or less carbon atoms, an amine containing an alkyl group having 14 or more and 30 or less carbon atoms, an alkyl halide containing an alkyl group having 14 or more and 30 or less carbon atoms, a carboxylic acid containing an alkyl group having 14 or more and 30 or less carbon atoms, a carboxamide containing an alkyl group having 14 or more and 30 or less carbon atoms, a carboxylic acid halide containing an alkyl group having 14 or more and 30 or less carbon atoms, a carbamic acid containing an alkyl group having 14 or more and 30 or less carbon atoms, an alkylurea containing an alkyl group having 14 or more and 30 or less carbon atoms, and an isocyanate containing an alkyl group having 14 or more and 30 or less carbon atoms, wherein contents of the two or more kinds of compounds are each 20 mol % or more, with respect to 100 mol % of the total amount of compounds used in the step:

[Chemical Formula 5]

formula (2)

wherein

R represents a hydrogen atom or a methyl group;

$L^1$ represents —CO—O—, —O—CO—, or —O—;

$L^4$ represents an alkylene group having one or more and eight or less carbon atoms;

$L^5$ represents a hydrogen atom, an epoxy group, —CH(OH)—CH$_2$OH, a carboxy group, a hydroxy group, an amino group, or an alkylamino group having one or more and four or less carbon atoms; and a left side and a right side of each of the horizontal chemical formulas for describing a chemical structure of $L^1$ correspond to an upper side of the formula (2) and a lower side of the formula (2), respectively,

[Chemical Formula 6]

formula (3)

Advantageous Effects of Invention

The present invention can provide a polymer having a sharp melting peak and allowing easy adjustment of the melting peak temperature.

BRIEF DESCRIPTION OF DRAWING

FIG. 1 shows melting curves acquired for a polymer (ex3) obtained in Example 3 and a resin composition (ref3) obtained in Comparative Example 3.

DESCRIPTION OF EMBODIMENTS

<Polymer (1)>

The polymer according to the present invention is a polymer comprising:

two or more kinds of constitutional units including an alkyl group having 14 or more and 30 or less carbon atoms, wherein the proportions of the number of the two or more kinds of constitutional units including an alkyl group having 14 or more and 30 or less carbon atoms are each 20% or more with respect to 100%6 of the total number of all constitutional units including an alkyl group having 14 or more and 30 or less carbon atoms, and the polymer has an enthalpy of fusion of 30 J/g or more observed in a temperature range of 10° C. or higher and lower than 60° C. in differential scanning calorimetry (hereinafter, occasionally referred to as "polymer (1)"). Hereinafter, enthalpy of fusion is occasionally expressed as ΔH.

The ΔH of the polymer (1) observed in a temperature range of 10° C. or higher and lower than 60° C. is preferably 50 J/g or more, and more preferably 70 J/g or more. The ΔH is typically 200 J/g or less.

The term "enthalpy of fusion" as used herein refers to heat of fusion obtained through analysis of a part in a temperature range of 10° C. or higher and lower than 60° C. in a melting curve acquired in differential scanning calorimetry as in the following by using a method in accordance with JIS K7122-1987. The ΔH can be controlled in the above range through adjustment of the number of carbon atoms of the alkyl group of each of the constitutional units including an alkyl group having 14 or more and 30 or less carbon atoms in the polymer (1) and the contents of the constitutional units including an alkyl group having 14 or more and 30 or less carbon atoms in the polymer (1).

[Method of Differential Scanning Calorimetry]

In a differential scanning calorimeter under nitrogen atmosphere, an aluminum pan encapsulating approximately 5 mg of a sample therein is (1) retained at 150° C. for 5 minutes, and then (2) cooled from 150° C. to −50° C. at a rate of 5° C./min, and then (3) retained at −50° C. for 5 minutes, and then (4) warmed from −50° C. to 150° C. at a rate of 5° C./min. A differential scanning calorimetry curve acquired in the calorimetry of the process (4) is defined as a melting curve.

The melting peak temperature of the polymer (1) is preferably 10° C. or higher and 60° C. or lower.

Herein, the melting peak temperature of a polymer is a temperature at a melting peak top determined through analysis of a melting curve acquired in the above differential scanning calorimetry by using a method in accordance with JIS K7121-1987, and a temperature at which heat of fusion absorbed is maximized. In the case that a plurality of melting peaks as defined in JIS K7121-1987 is present in the melting curve, a temperature at a melting peak top with the maximum heat of fusion absorbed is defined as melting peak temperature.

The melting peak temperature of the polymer (1) can be controlled through adjustment of the number of carbon atoms of the alkyl group of each of the constitutional units including an alkyl group having 14 or more and 30 or less carbon atoms in the polymer (1) and the contents of the constitutional units including an alkyl group having 14 or more and 30 or less carbon atoms in the polymer (1).

The proportions of the number of the two or more kinds of constitutional units including an alkyl group having 14 or more and 30 or less carbon atoms in the polymer (1) are each 20% or more with respect to 100% of the total number of all constitutional units including an alkyl group having 14 or more and 30 or less carbon atoms.

More preferably, the proportions of the number of the two or more kinds of constitutional units including an alkyl group having 14 or more and 30 or less carbon atoms are each 30% or more.

Even more preferably, the proportions of the number of the two or more kinds of constitutional units including an alkyl group having 14 or more and 30 or less carbon atoms are each 40% or more.

It is preferable that each of the constitutional units including an alkyl group having 14 or more and 30 or less carbon atoms in the polymer (1) be a constitutional unit (B) represented by the following formula (1).

[Chemical Formula 7]

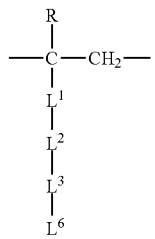

formula (1)

In the formula (1),

R represents a hydrogen atom or a methyl group;

$L^1$ represents a single bond, —CO—O—, —O—CO—, or —O—;

$L^2$ represents a single bond, —$CH_2$—, —$CH_2$—$CH_2$—, —$CH_2$—$CH_2$—$CH_2$—, —$CH_2$—CH(OH)—$CH_2$—, or —$CH_2$—CH($CH_2$OH)—;

$L^3$ represents a single bond, —CO—O—, —O—CO—, —O—, —CO—NH—, —NH—CO—, —CO—NH—CO—, —NH—CO—NH—, —NH—, or —N($CH_3$)—;

$L^6$ represents an alkyl group having 14 or more and 30 or less carbon atoms; and the left side and right side of each of the horizontal chemical formulas for describing the chemical structures of $L^1$, $L^2$, and $L^3$ correspond to the upper side of the formula (1) and the lower side of the formula (1), respectively.

R is preferably a hydrogen atom.

$L^1$ is preferably —CO—O—, —O—CO—, or —O—, more preferably —CO—O— or —O—CO—, and even more preferably —CO—O—.

$L^2$ is preferably a single bond, —$CH_2$—, —$CH_2$—$CH_2$—, or —$CH_2$—$CH_2$—$CH_2$—, and more preferably a single bond.

$L^3$ is preferably a single bond, —O—CO—, —O—, —NH—, or —N($CH_3$)—, and more preferably a single bond.

$L^6$ in the formula (1) is an alkyl group having 14 or more and 30 or less carbon atoms for imparting good formability to the polymer (1). Examples of the alkyl group having 14 or more and 30 or less carbon atoms include linear alkyl groups having 14 or more and 30 or less carbon atoms and branched alkyl groups having 14 or more and 30 or less carbon atoms. $L^6$ is preferably a linear alkyl group having 14 or more and 30 or less carbon atoms, more preferably a linear alkyl group having 14 or more and 24 or less carbon atoms, and even more preferably a linear alkyl group having 16 or more and 22 or less carbon atoms.

Examples of the linear alkyl group having 14 or more and 30 or less carbon atoms include an n-tetradecyl group, an n-pentadecyl group, an n-hexadecyl group, an n-heptadecyl group, an n-octadecyl group, an n-nonadecyl group, an n-eicosyl group, an n-heneicosyl group, an n-docosyl group, an n-tricosyl group, an n-tetracosyl group, an n-pentacosyl group, an n-hexacosyl group, an n-heptacosyl group, an n-octacosyl group, an n-nonacosyl group, and an n-triacontyl group.

Examples of the branched alkyl group having 14 or more and 30 or less carbon atoms include an isotetradecyl group, an isopentadecyl group, an isohexadecyl group, an isoheptadecyl group, an isooctadecyl group, an isononadecyl group, an isoeicosyl group, an isoheneicosyl group, an isodocosyl group, an isotricosyl group, an isotetracosyl group, an isopentacosyl group, an isohexacosyl group, an isoheptacosyl group, an isooctacosyl group, an isononacosyl group, and an isotriacontyl group.
Examples of combination of R, $L^1$, $L^2$, and $L^3$ in the formula (1) include the followings.
[Chemical Formula 8]
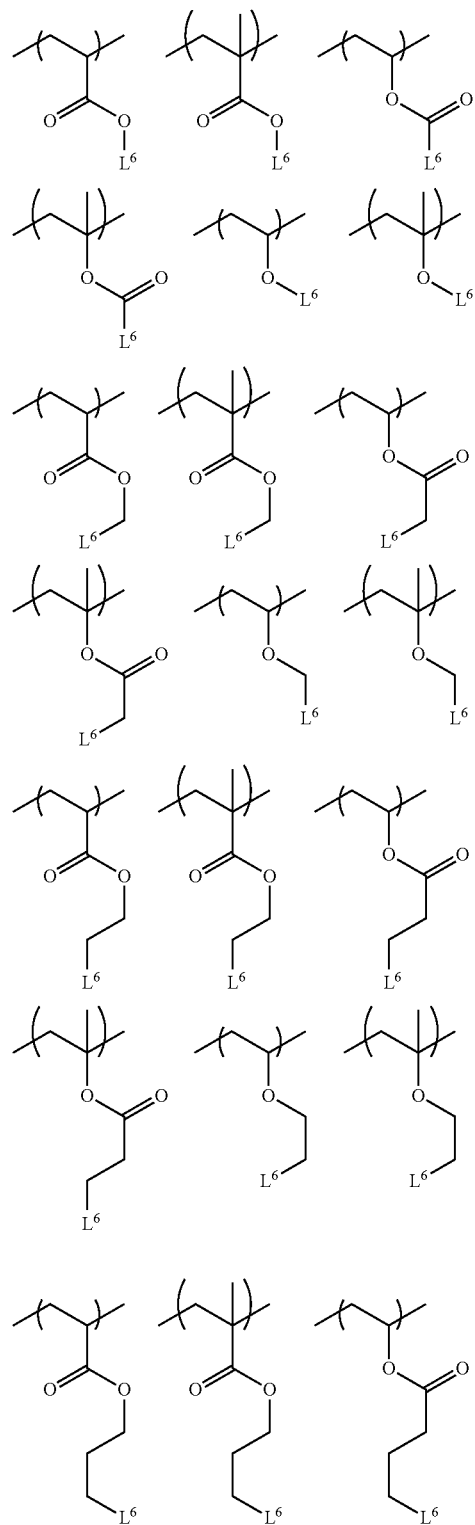
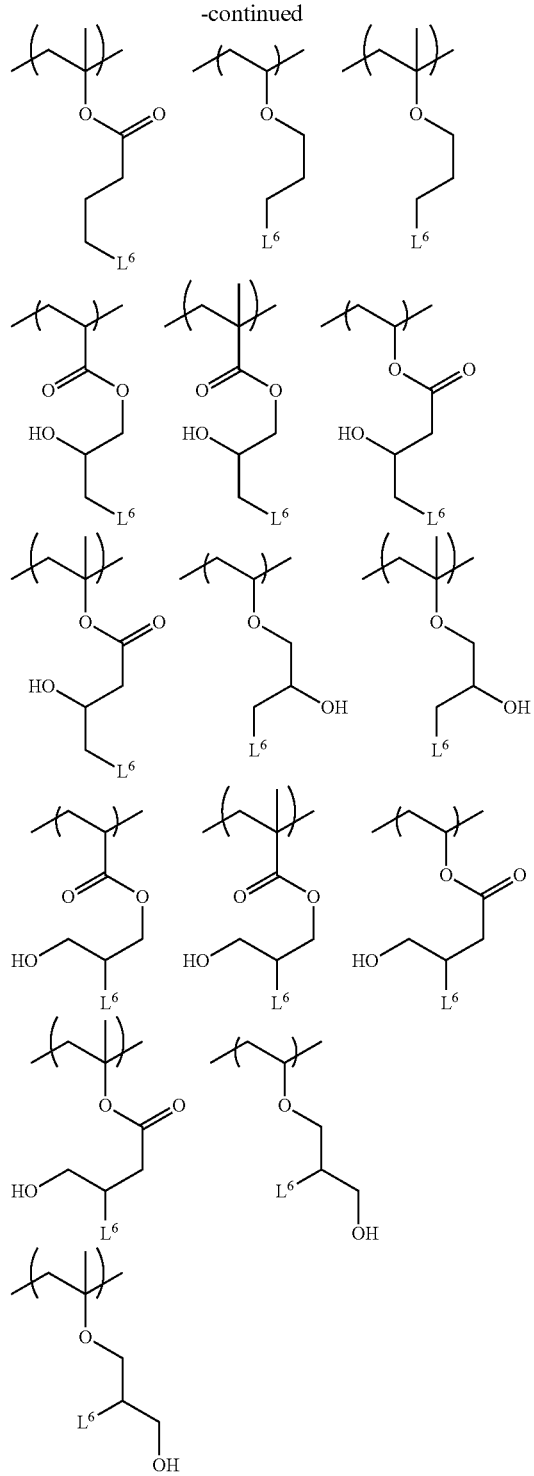
[Chemical Formula 9]
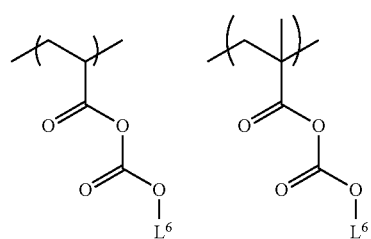

-continued
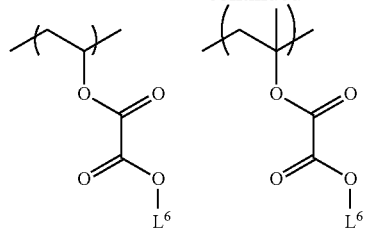
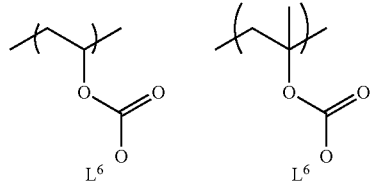
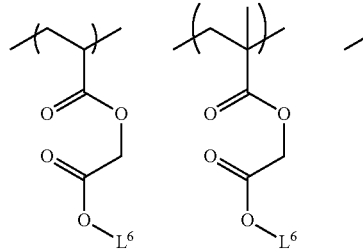
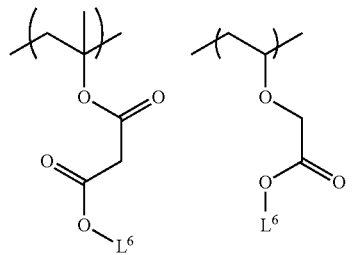
-continued
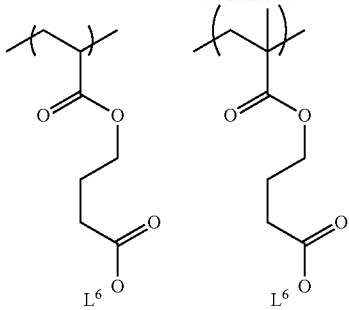
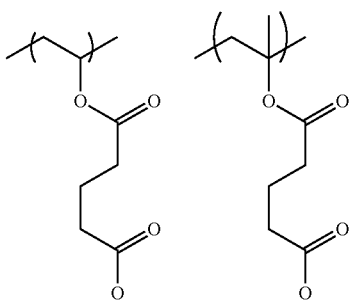
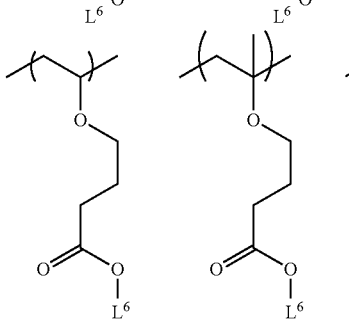
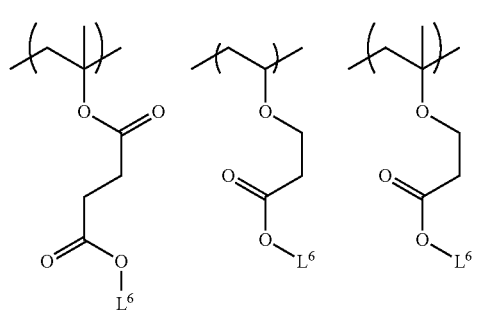

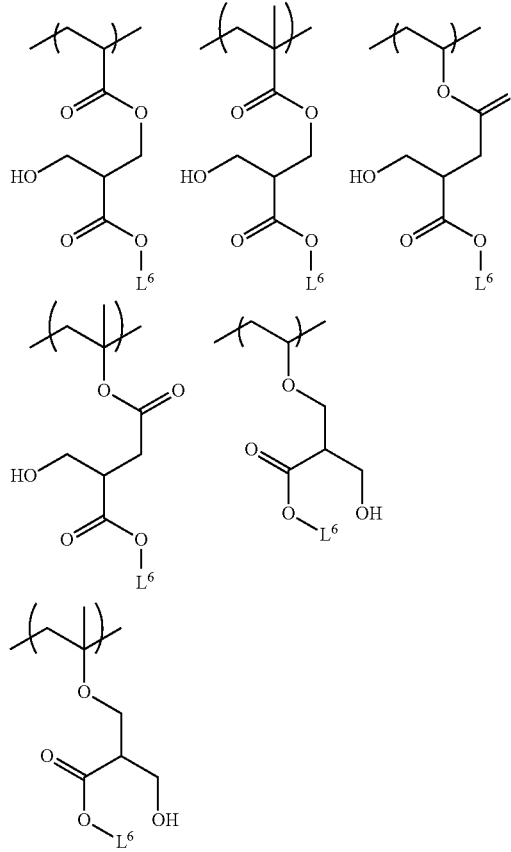
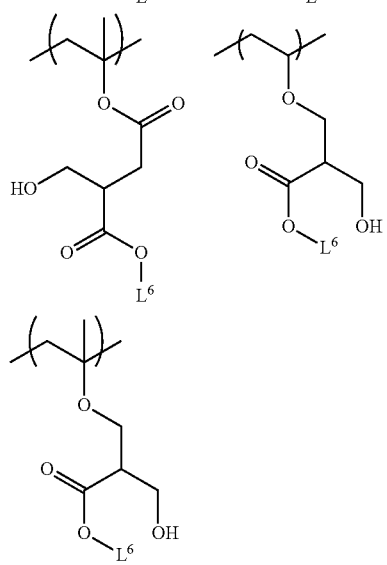
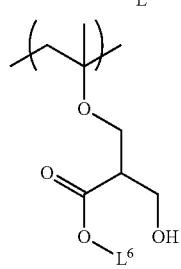
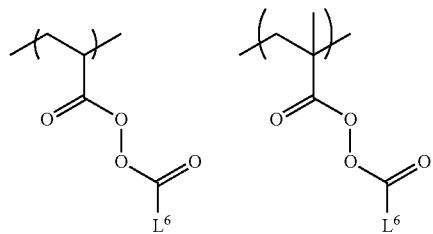
[Chemical Formula 10]
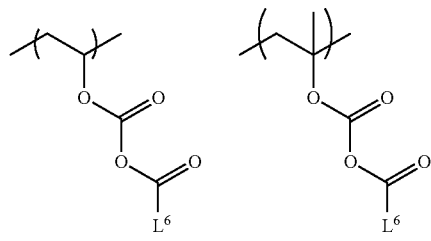
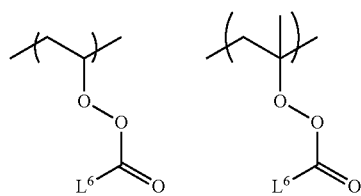
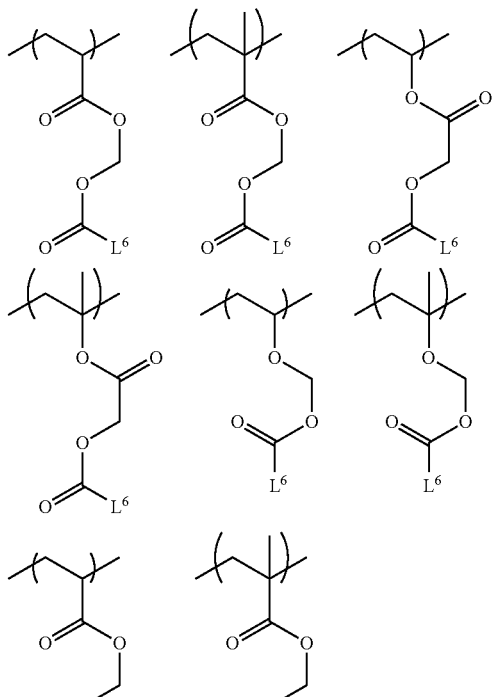
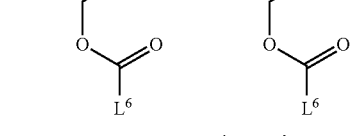
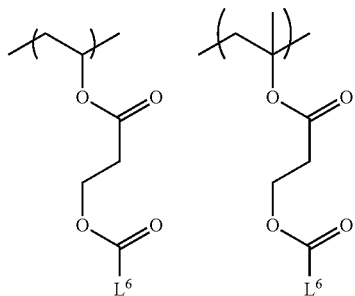
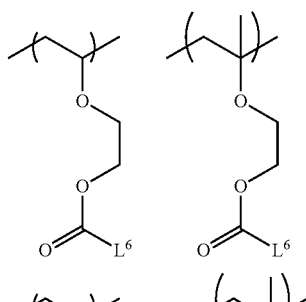
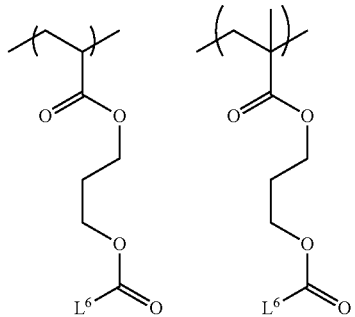

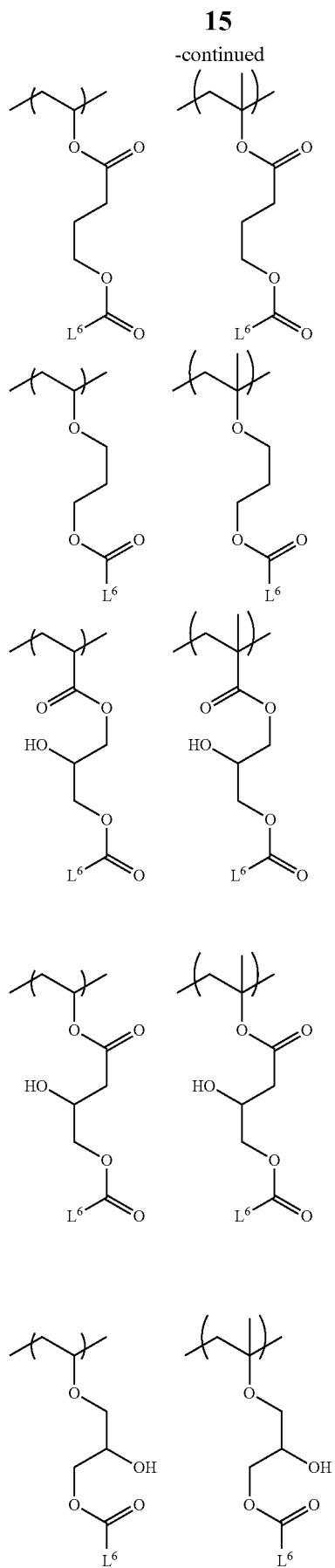
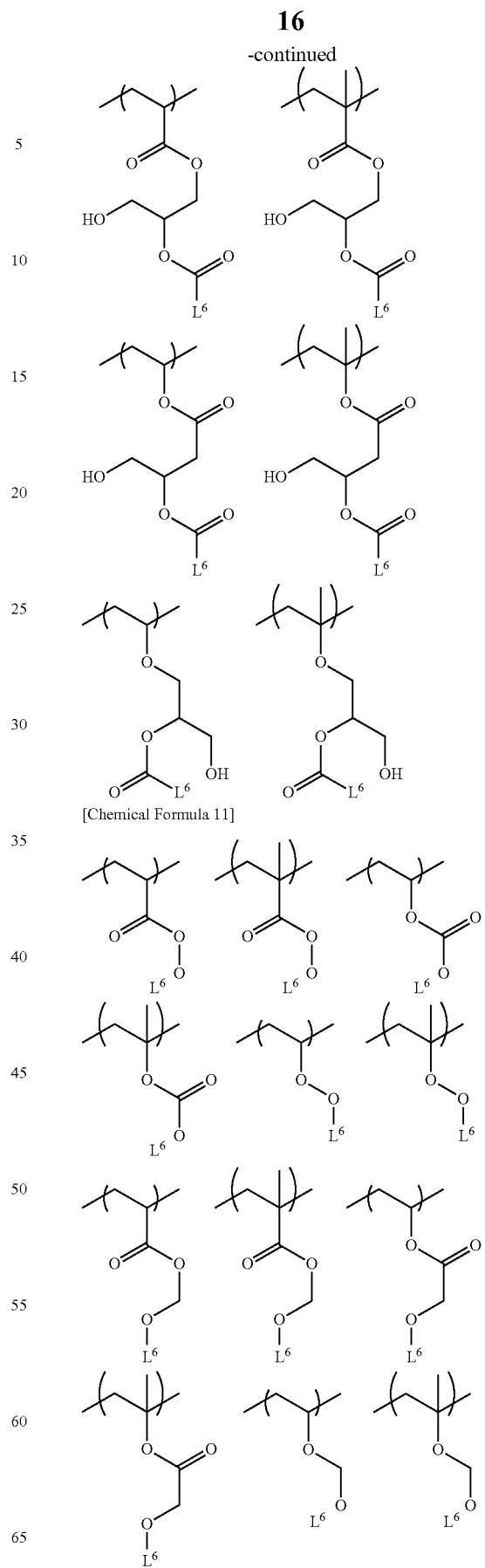
[Chemical Formula 11]

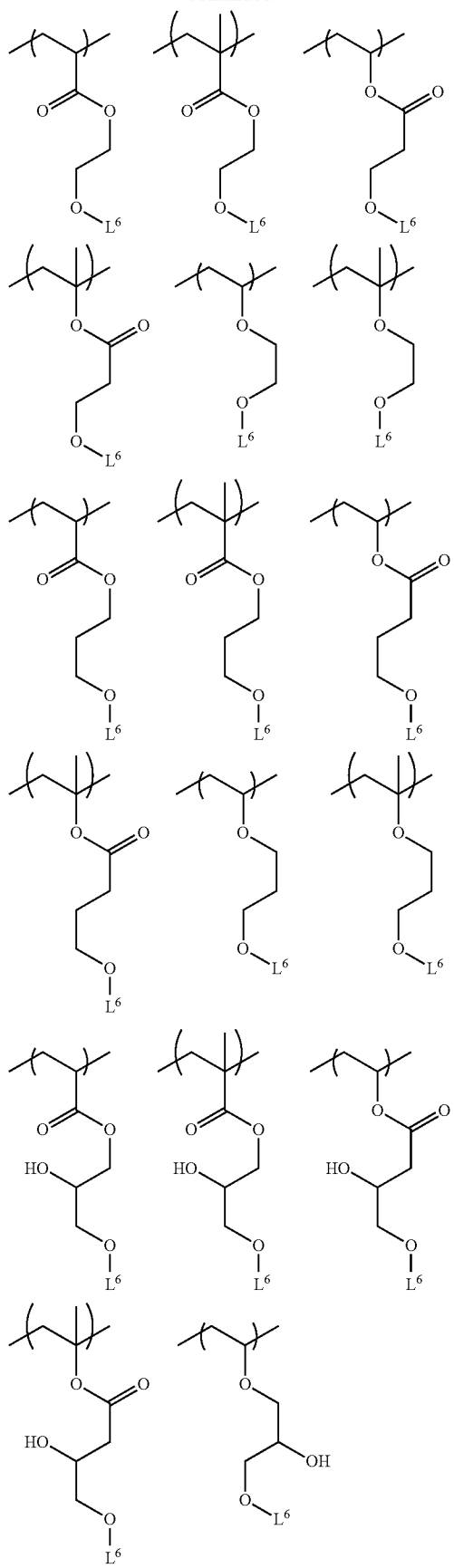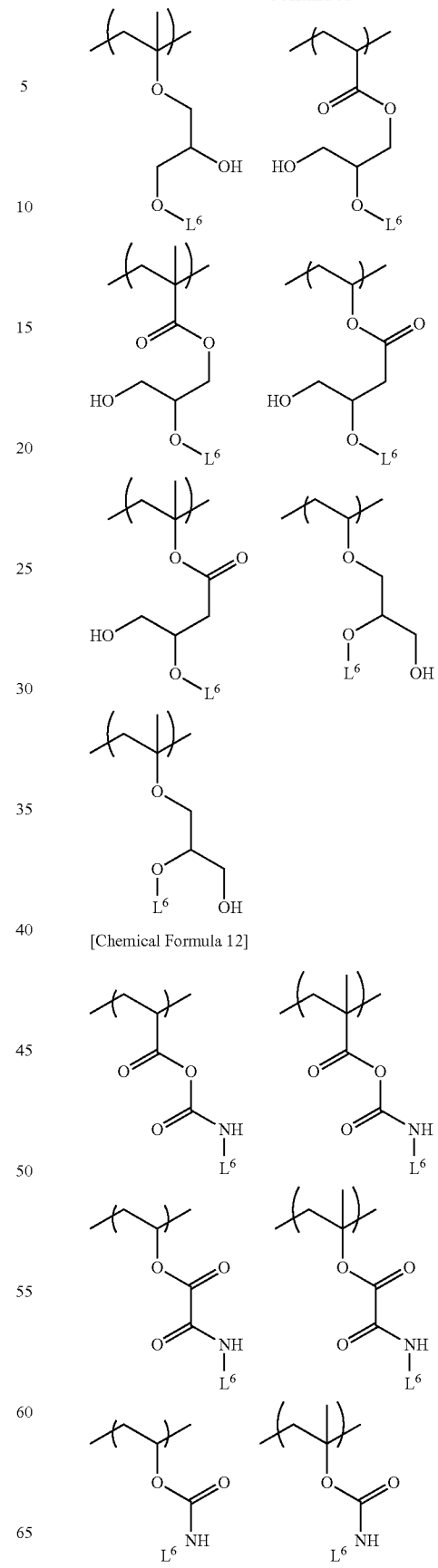
[Chemical Formula 12]

-continued
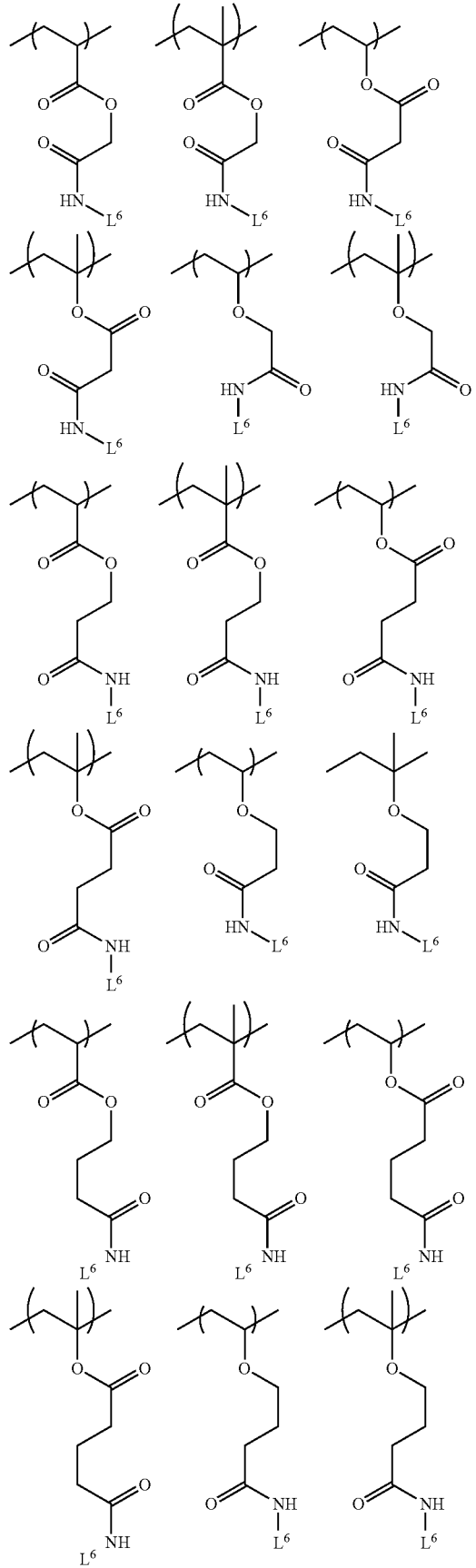
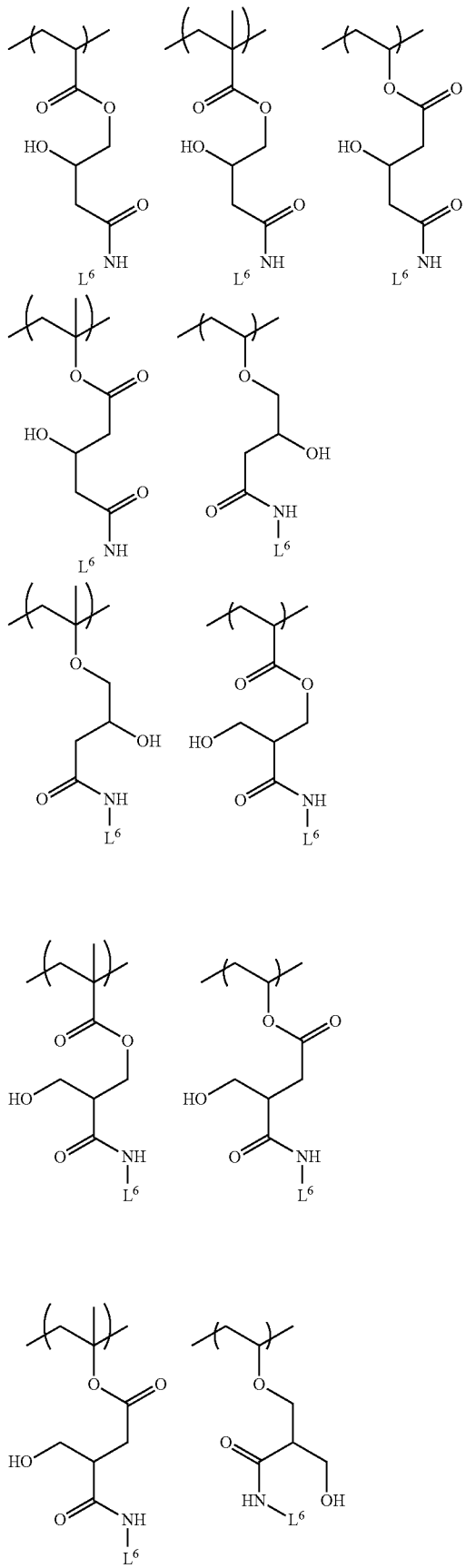

-continued
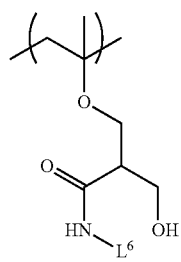
[Chemical Formula 13]
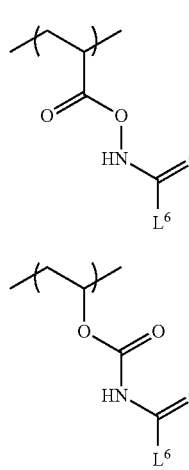
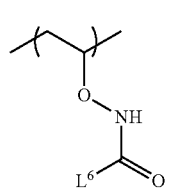
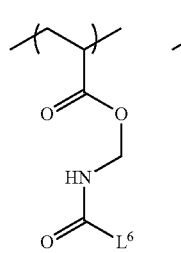
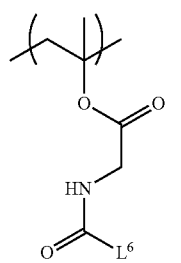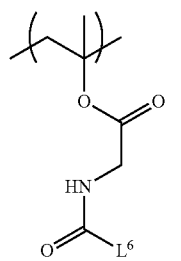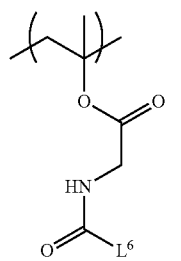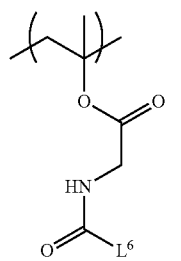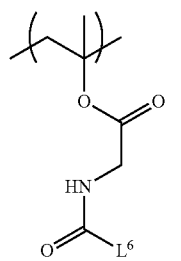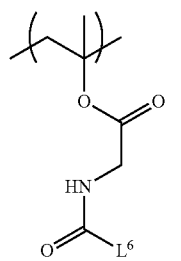
-continued
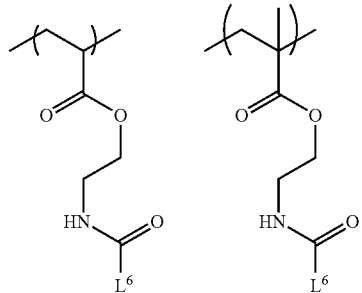
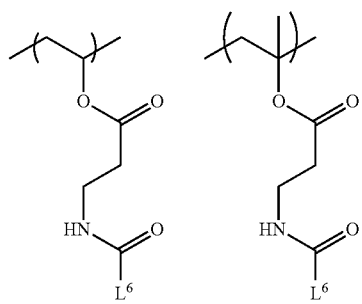
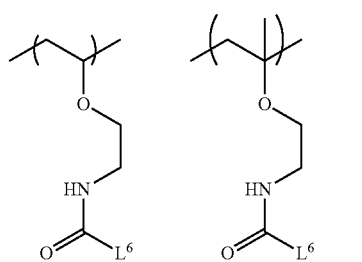
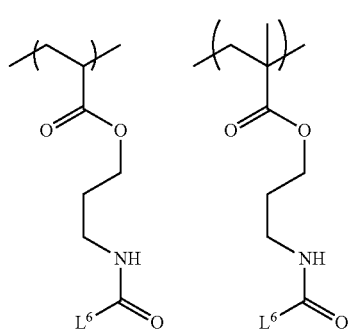
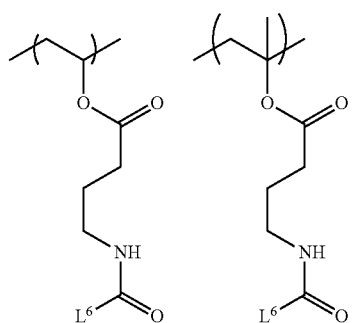

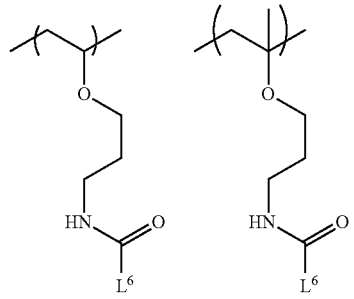
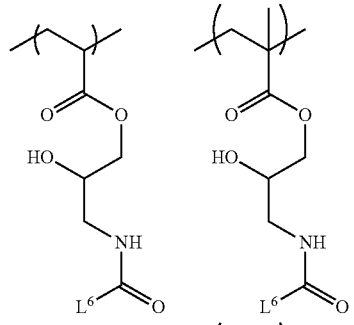
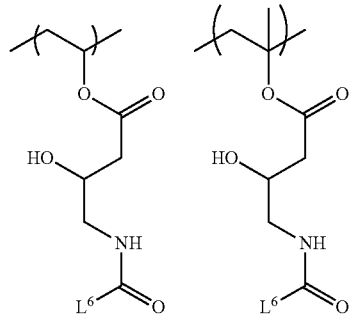
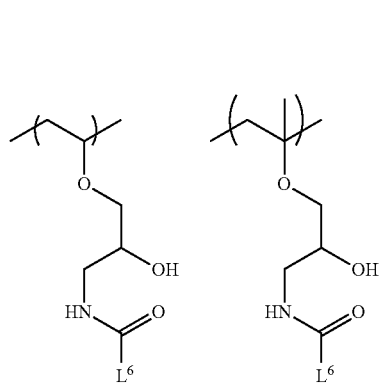
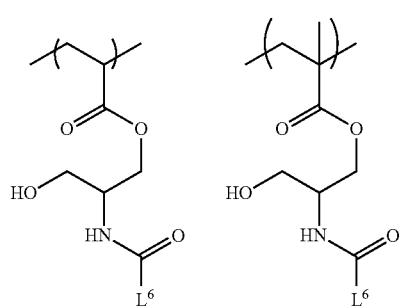
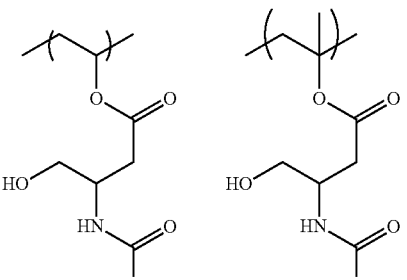
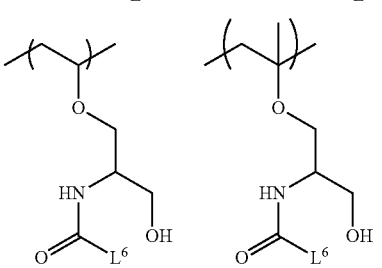
[Chemical Formula 14]
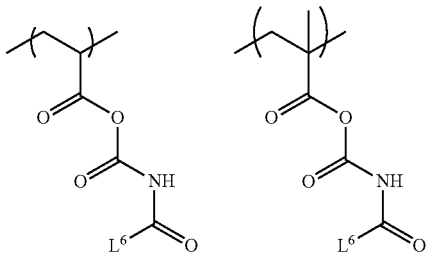
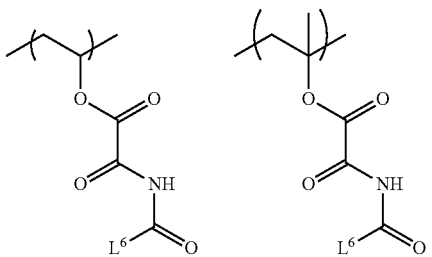
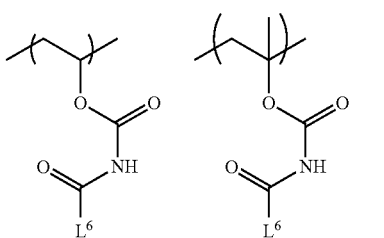
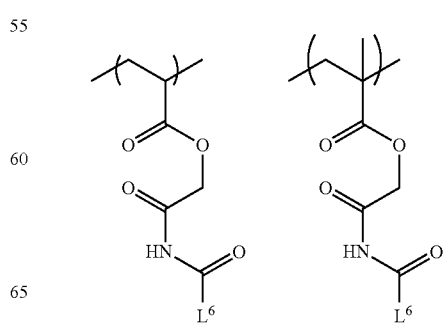

-continued
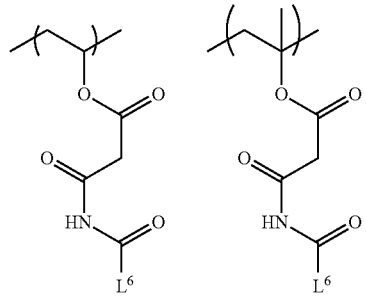
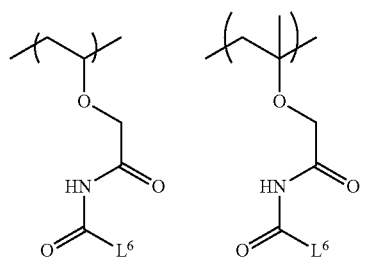
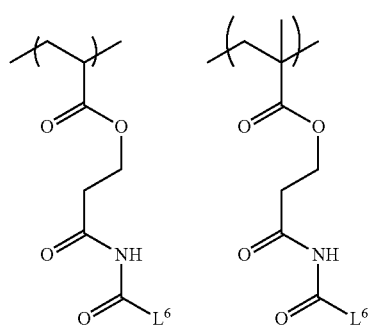
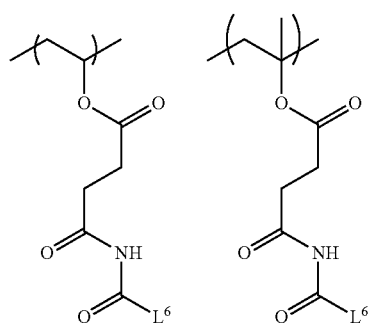
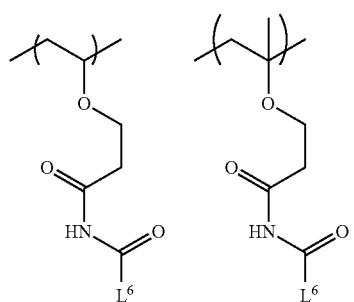
-continued
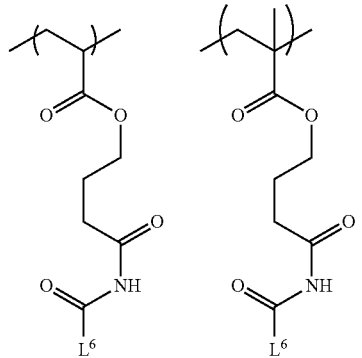
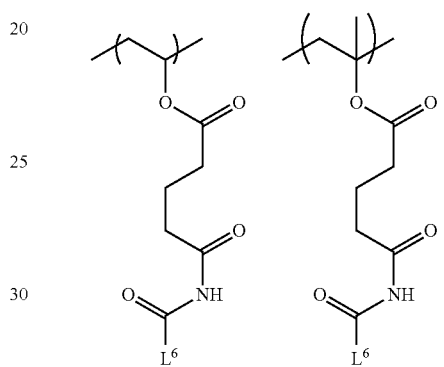
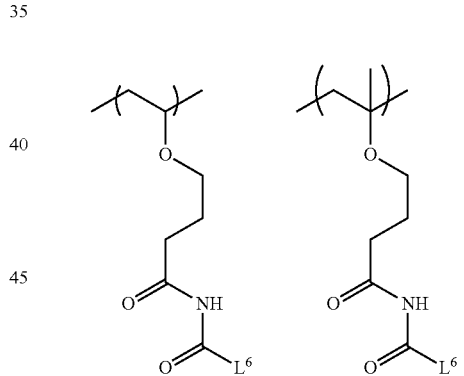
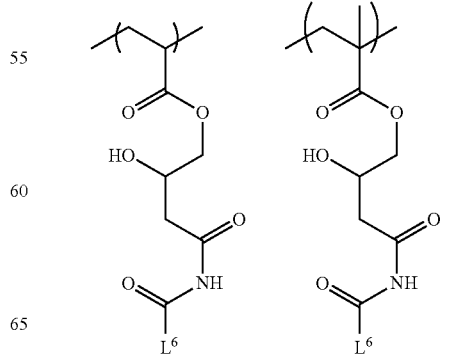

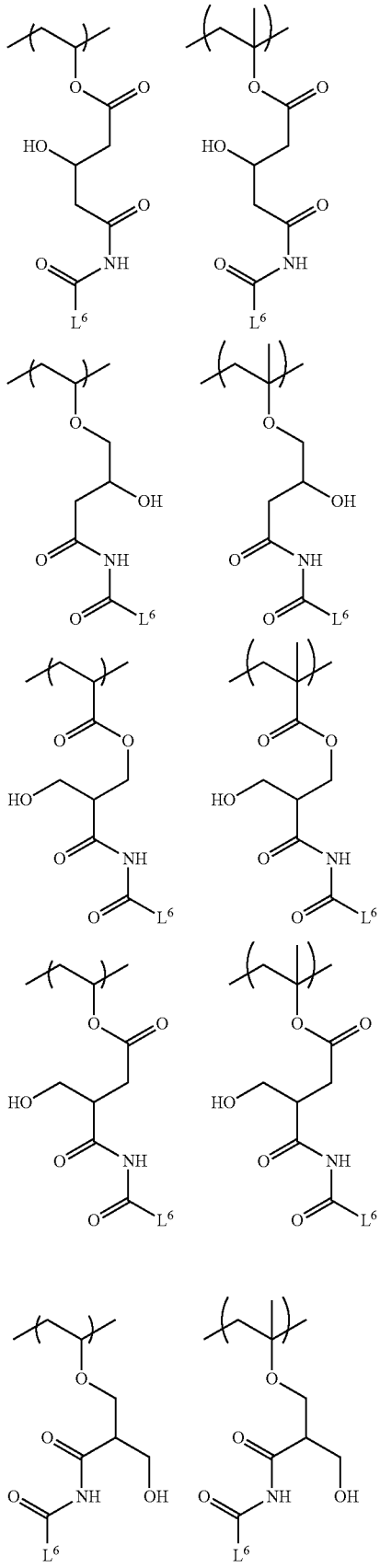
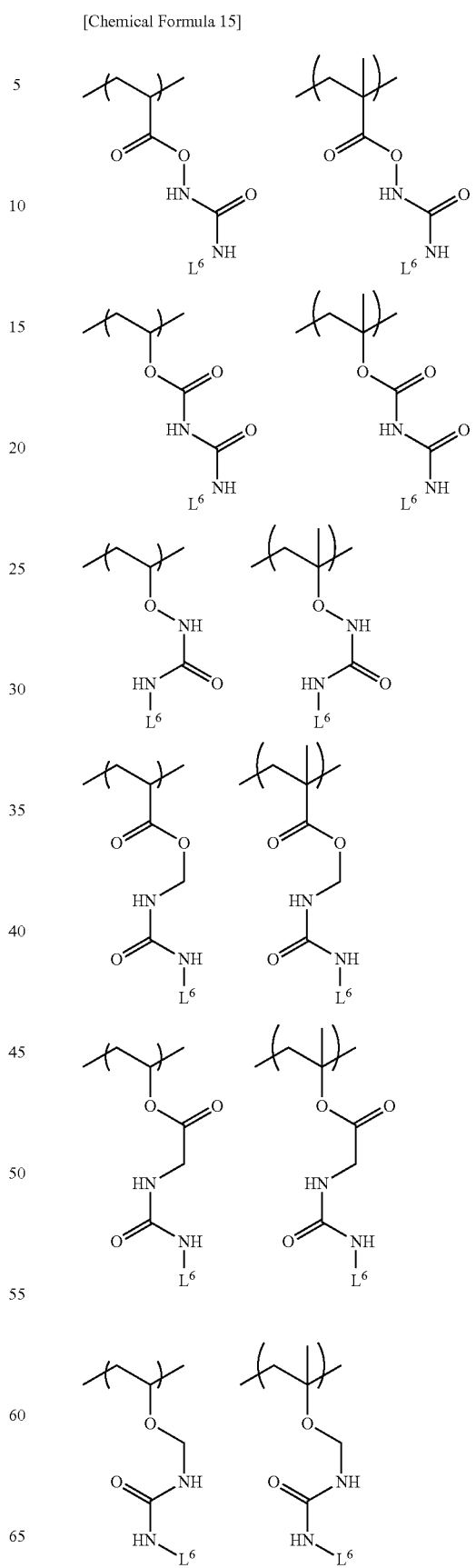

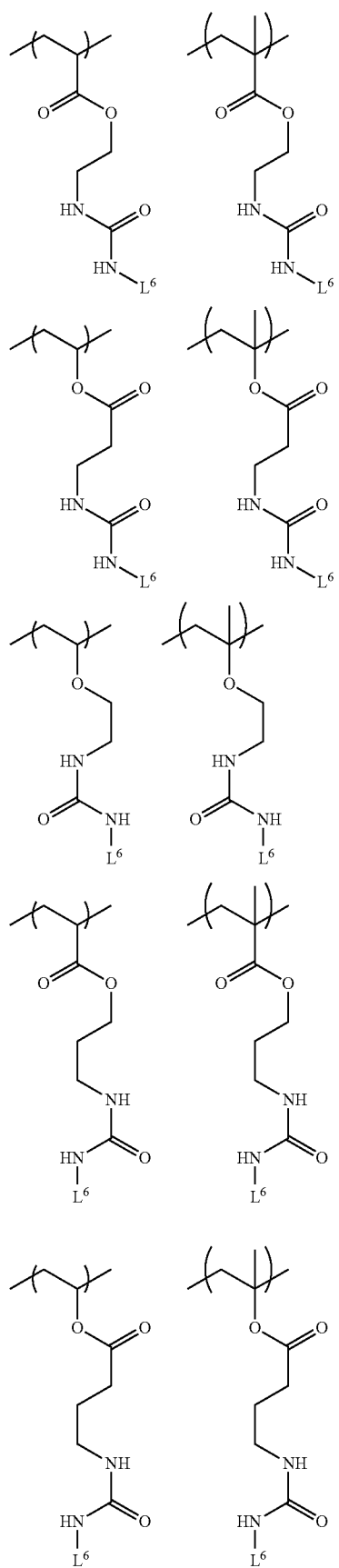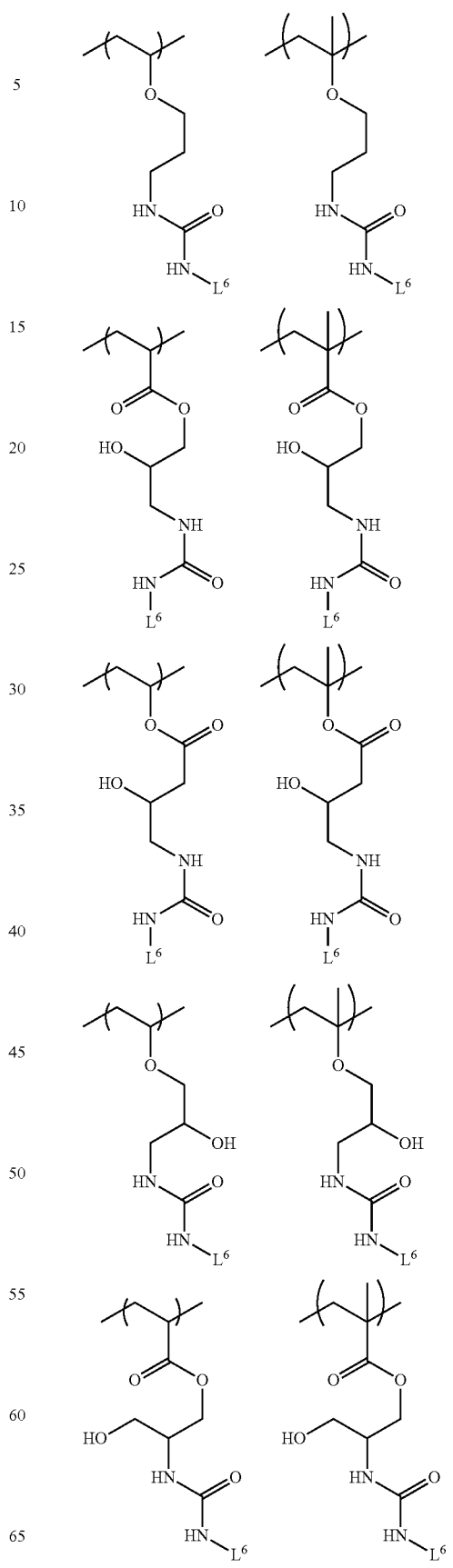

-continued
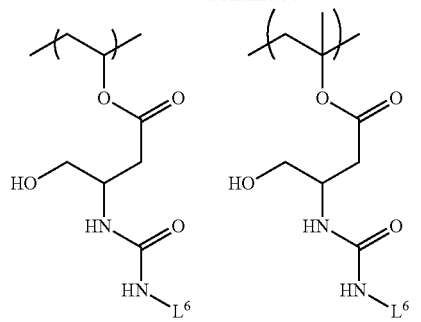
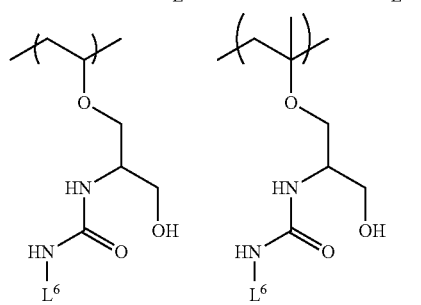
[Chemical Formula 16]
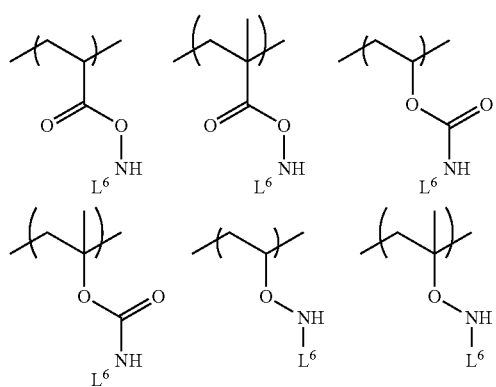
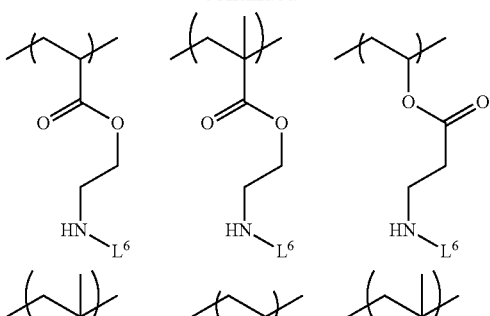
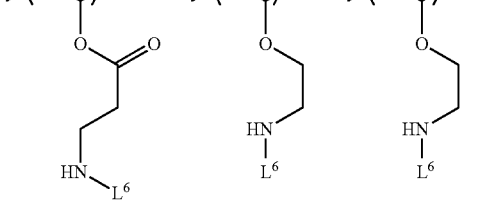
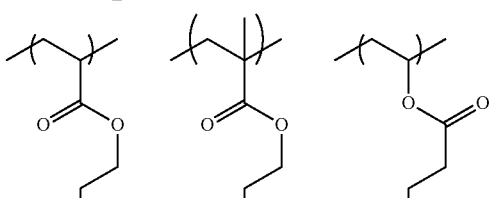
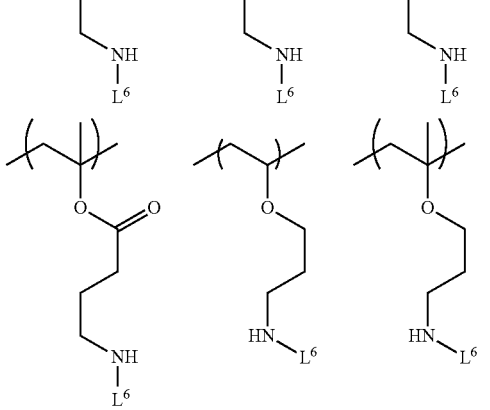
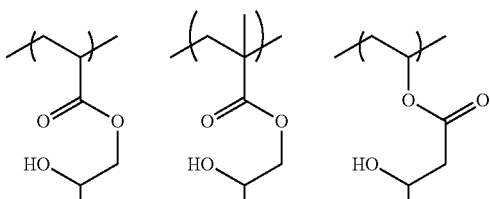
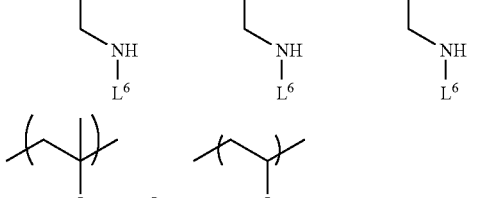
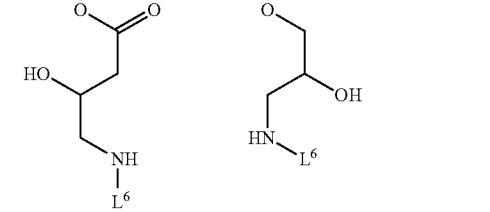

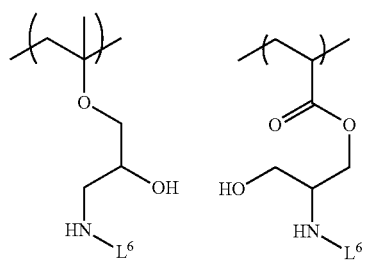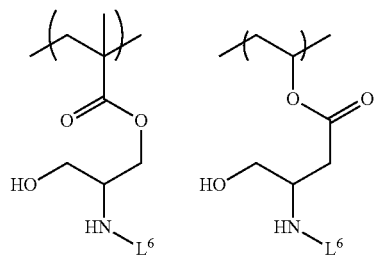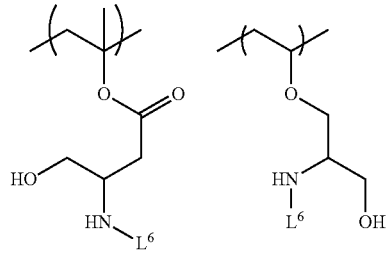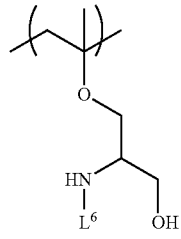
[Chemical Formula 17]
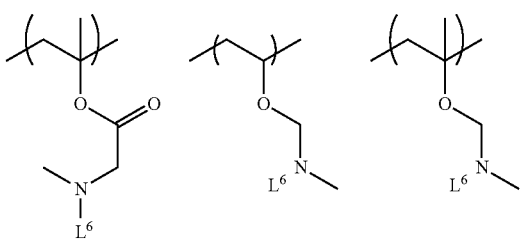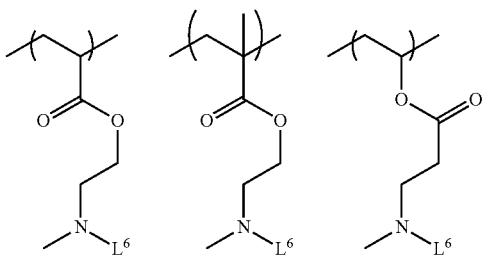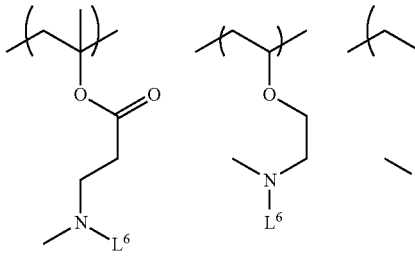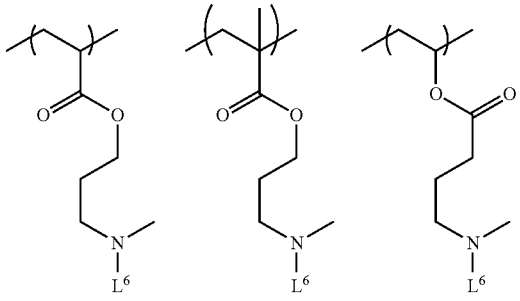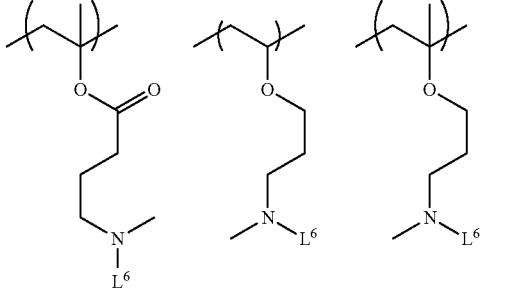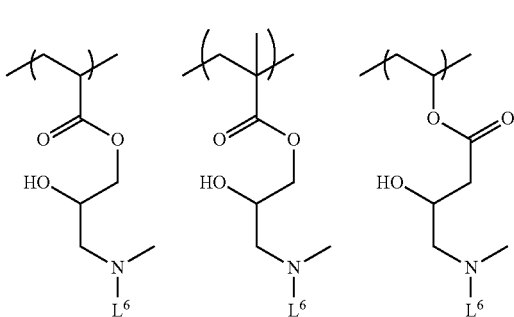

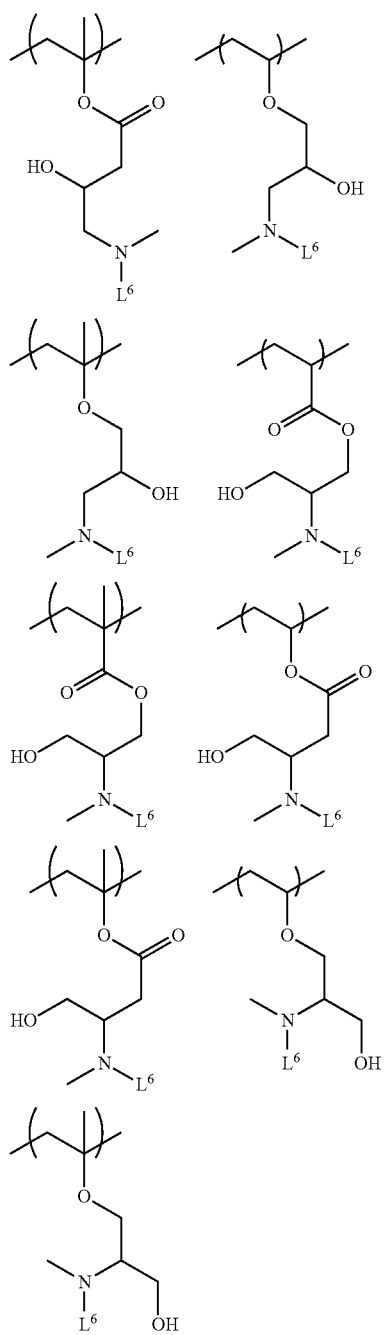
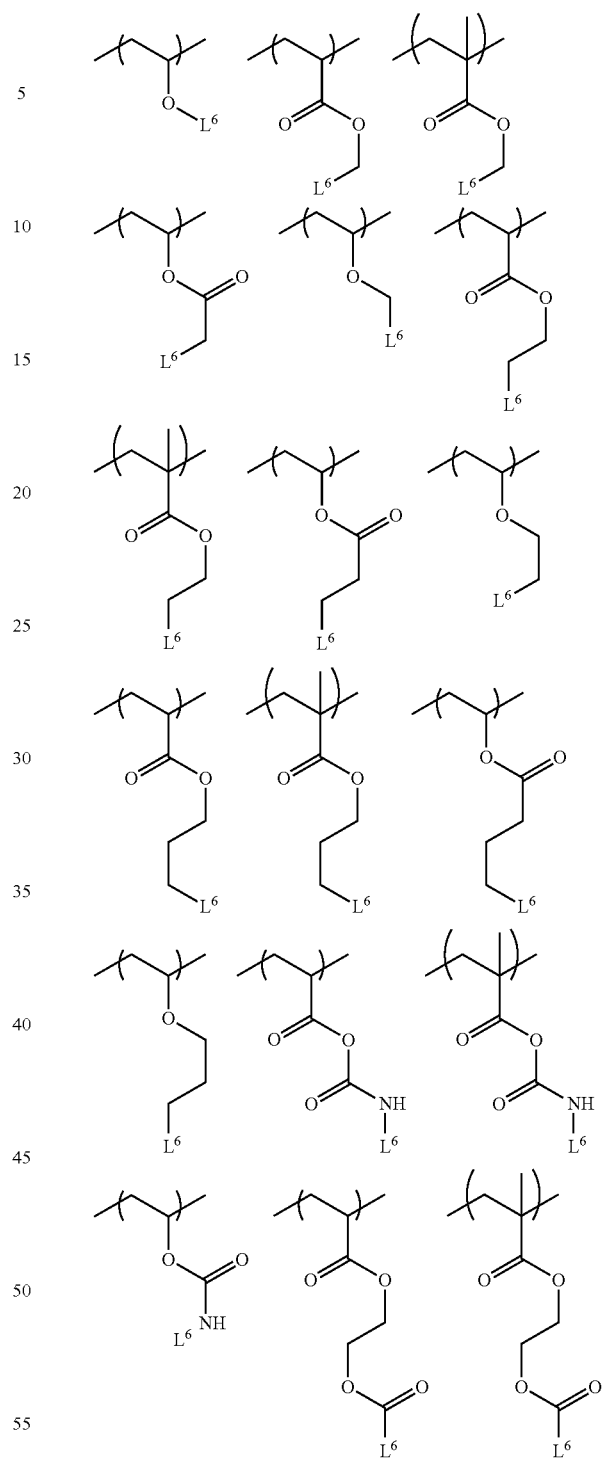
Combination of R, $L^1$, $L^2$, and $L^3$ in the formula (1) is preferably as follows.
[Chemical Formula 18]
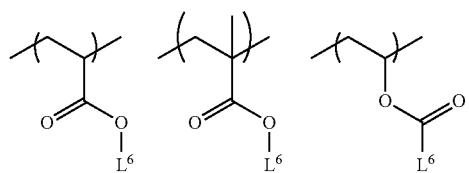
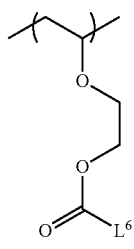

[Chemical Formula 19]
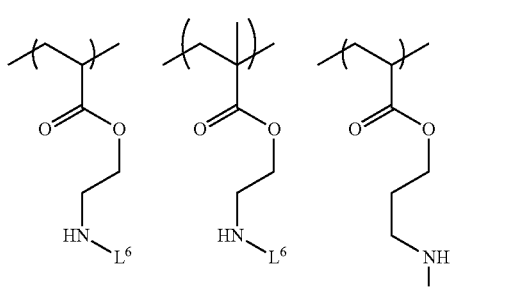
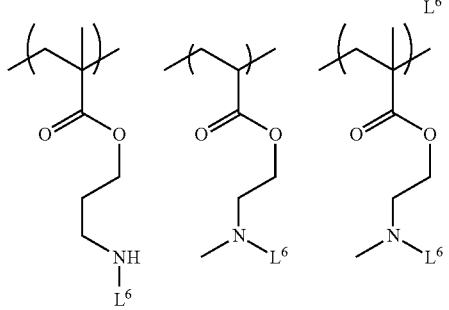
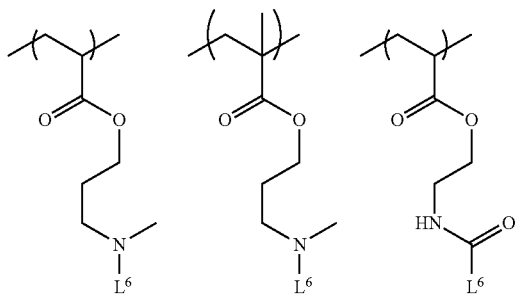
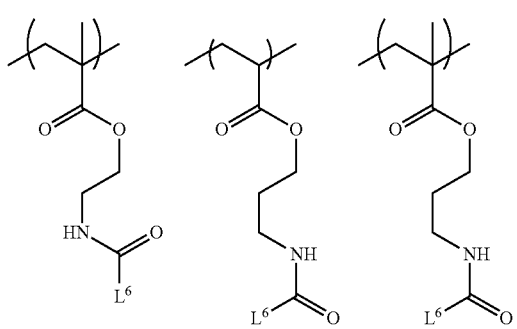
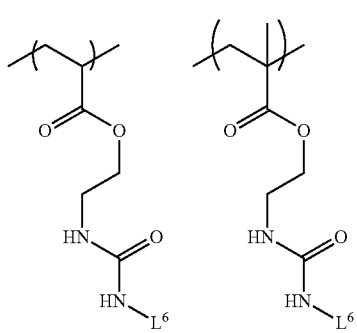
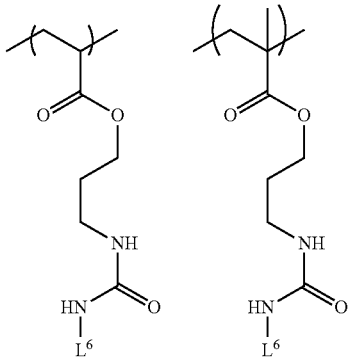
[Chemical Formula 20]
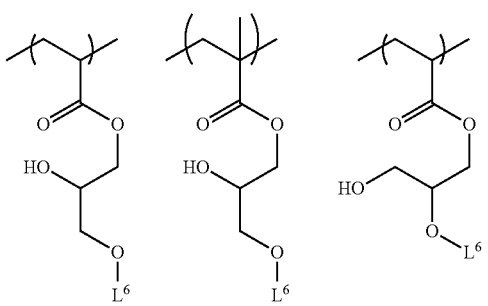
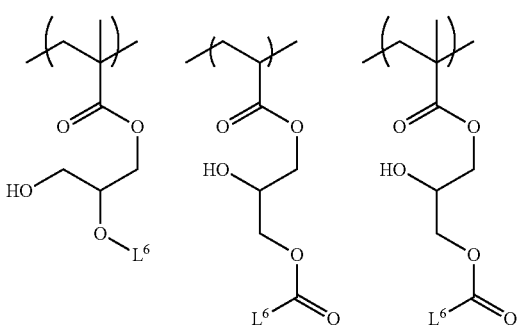
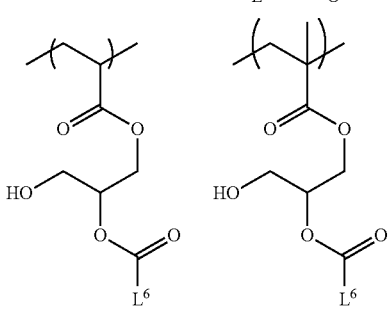
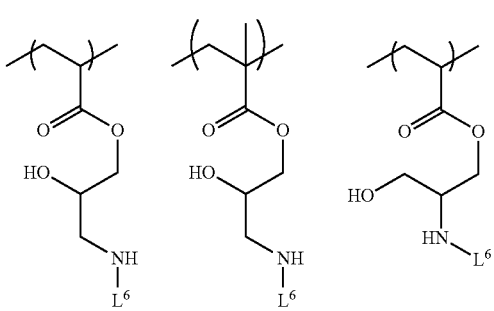

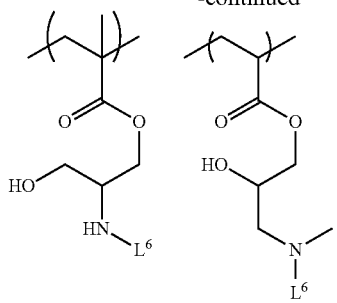
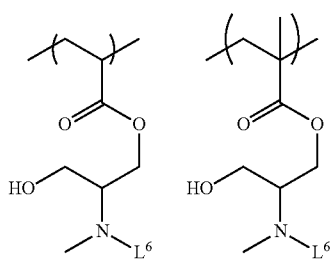
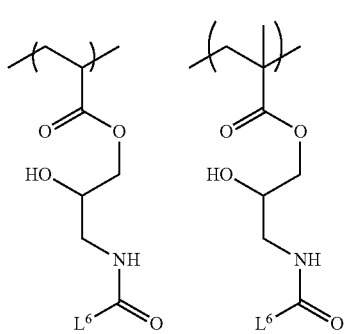
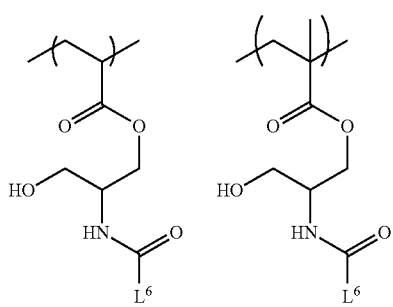
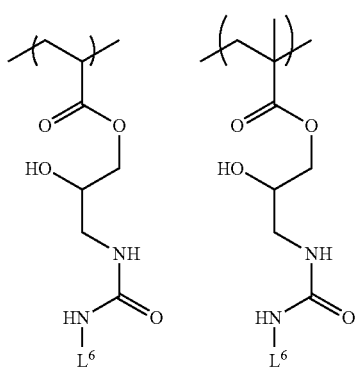

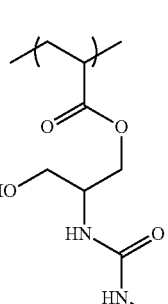

The following is also preferred as combination of R, $L^1$, $L^2$, and $L^3$ in the formula (1):

R is a hydrogen atom, $L^1$, $L^2$, and $L^3$ are each a single bond, and $L^6$ is an alkyl group having 14 or more and 30 or less carbon atoms; or R is a hydrogen atom or a methyl group, $L^1$ is —CO—O—, $L^2$ and $L^3$ are each a single bond, and $L^6$ is an alkyl group having 14 or more and 30 or less carbon atoms.

Combination of R, $L^1$, $L^2$, and $L^3$ in the formula (1) is more preferably as follows.

[Chemical Formula 21]

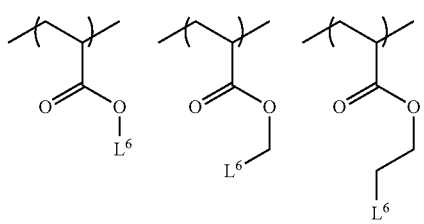

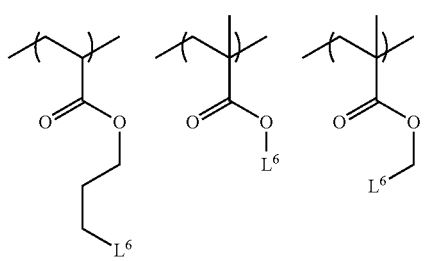

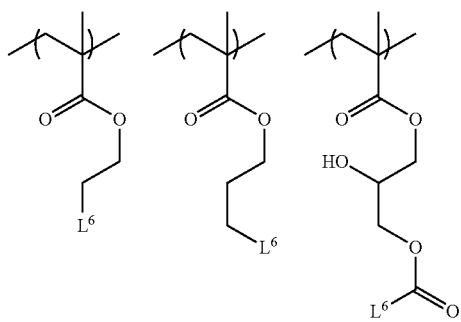

-continued

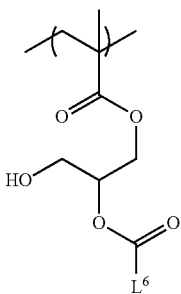

Combination of R, $L^1$, $L^2$, and $L^3$ in the formula (1) is even more preferably as follows.

[Chemical Formula 22]

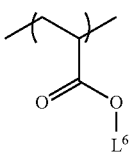

The constitutional unit (B) is preferably a constitutional unit derived from n-hexadecene, a constitutional unit derived from n-octadecene, a constitutional unit derived from n-eicosene, a constitutional unit derived from n-docosene, a constitutional unit derived from n-tetracosene, a constitutional unit derived from n-hexacosene, a constitutional unit derived from n-octacosene, a constitutional unit derived from n-triacontene, a constitutional unit derived from n-dotriacontene, a constitutional unit derived from n-tetradecyl acrylate, a constitutional unit derived from n-pentadecyl acrylate, a constitutional unit derived from n-hexadecyl acrylate, a constitutional unit derived from n-heptadecyl acrylate, a constitutional unit derived from n-octadecyl acrylate, a constitutional unit derived from n-nonadecyl acrylate, a constitutional unit derived from n-eicosyl acrylate, a constitutional unit derived from n-heneicosyl acrylate, a constitutional unit derived from n-docosyl acrylate, a constitutional unit derived from n-tricosyl acrylate, a constitutional unit derived from n-tetracosyl acrylate, a constitutional unit derived from n-pentacosyl acrylate, a constitutional unit derived from n-hexacosyl acrylate, a constitutional unit derived from n-heptacosyl acrylate, a constitutional unit derived from n-octacosyl acrylate, a constitutional unit derived from n-nonacosyl acrylate, a constitutional unit derived from n-triacontyl acrylate, a constitutional unit derived from n-tetradecyl methacrylate, a constitutional unit derived from n-pentadecyl methacrylate, a constitutional unit derived from n-hexadecyl methacrylate, a constitutional unit derived from n-heptadecyl methacrylate, a constitutional unit derived from n-octadecyl methacrylate, a constitutional unit derived from n-nonadecyl methacrylate, a constitutional unit derived from n-eicosyl methacrylate, a constitutional unit derived from n-heneicosyl methacrylate, a constitutional unit derived from n-docosyl methacrylate, a constitutional unit derived from n-tricosyl methacrylate, a constitutional unit derived from n-tetracosyl methacrylate, a constitutional unit derived from n-pentacosyl methacrylate, a constitutional unit derived from n-hexacosyl methacrylate, a constitutional unit derived from n-heptacosyl methacrylate, a constitutional unit derived from n-octacosyl methacrylate, a constitutional unit derived from n-nonacosyl methacrylate, a constitutional unit derived from n-triacontyl methacrylate, a constitutional unit derived from n-vinyl tetradecylate, a constitutional unit derived from n-vinyl hexadecylate, a constitutional unit derived from n-vinyl octadecylate, a constitutional unit derived from n-vinyl eicosylate, a constitutional unit derived from n-vinyl docosylate, a constitutional unit derived from n-tetradecyl vinyl ether, a constitutional unit derived from n-hexadecyl vinyl ether, a constitutional unit derived from n-octadecyl vinyl ether, a constitutional unit derived from n-eicosyl vinyl ether, or a constitutional unit derived from n-docosyl vinyl ether.

The polymer (1) may include two or more types of the constitutional unit (B), and, for example, may be a polymer including a constitutional unit derived from n-eicosyl acrylate and a constitutional unit derived from n-octadecyl acrylate.

It is preferable that the polymer (1) be a polymer including a constitutional unit (A) derived from ethylene for imparting good shape retention to a molded article comprising the polymer (1) and good formability to the polymer (1) at temperatures equal to or higher than the melting peak temperature of the polymer (1). The constitutional unit (A) is a constitutional unit obtained by polymerization of ethylene, and the constitutional unit (A) may be forming a branched structure in the polymer.

The polymer (1) is preferably a polymer including the constitutional unit (B) represented by the formula (1) and the constitutional unit (A) derived from ethylene.

The polymer (1) may include at least one constitutional unit (C) selected from the group consisting of a constitutional unit represented by the following formula (2) and a constitutional unit represented by the following formula (3).

[Chemical Formula 23]

formula (2)

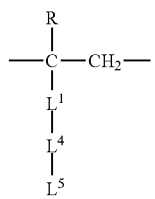

In the formula (2),
R represents a hydrogen atom or a methyl group;
$L^1$ represents a single bond, —CO—O—, —O—CO—, or —O—;
$L^4$ represents an alkylene group having one or more and eight or less carbon atoms;
$L^5$ represents a hydrogen atom, an epoxy group, —CH(OH)—$CH_2$OH, a carboxy group, a hydroxy group, an amino group, or an alkylamino group having one or more and four or less carbon atoms; and the left side and right side of each of the horizontal chemical formulas for describing the chemical structure of $L^1$ correspond to the upper side of the formula (2) and the lower side of the formula (2), respectively.

[Chemical Formula 24]

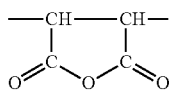

formula (3)

In the formula (2), R is preferably a hydrogen atom.

In the formula (2), $L^1$ is preferably —CO—O—, —O—CO—, or —O—, more preferably —CO—O— or —O—CO—, and even more preferably —CO—O—.

Examples of the alkylene group having one or more and eight or less carbon atoms as $L^4$ in the formula (2) include a methylene group, an ethylene group, an n-propylene group, a 1-methylethylene group, an n-butylene group, a 1,2-dimethylethylene group, a 1,1-dimethylethylene group, a 2,2-dimethylethylene group, an n-pentylene group, an n-hexylene group, an n-heptalene group, an n-octylene group, and a 2-ethyl-n-hexylene group.

$L^4$ is preferably a methylene group, an ethylene group, or an n-propylene group, and more preferably a methylene group.

Examples of the alkylamino group having one or more and four or less carbon atoms as $L^5$ in the formula (2) include a methylamino group, an ethylamino group, a propylamino group, a butylamino group, a dimethylamino group, and a diethylamino group.

In the formula (2), $L^5$ is preferably a hydrogen atom, an epoxy group, or —CH(OH)—CH$_2$OH, and more preferably a hydrogen atom.

Examples of combination of R, $L^1$, $L^4$, and $L^5$ in the formula (2) include the followings.

[Chemical Formula 25]

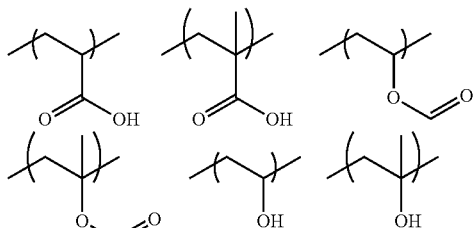

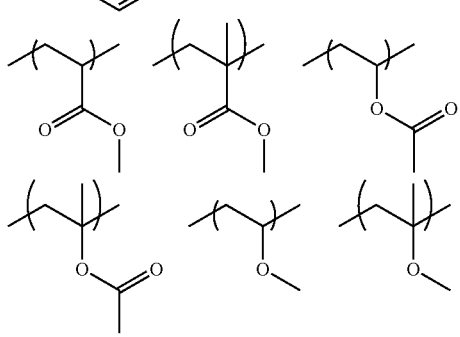

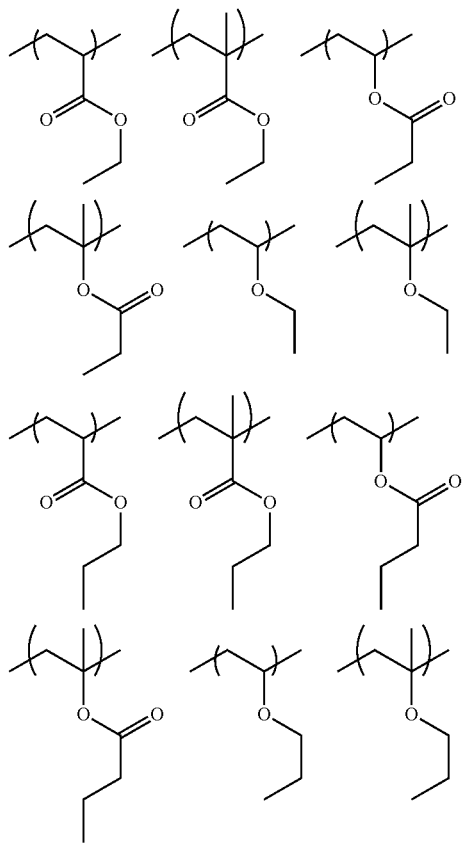

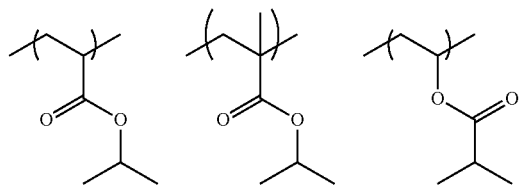

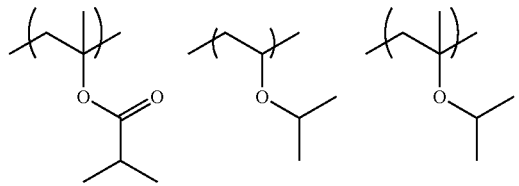

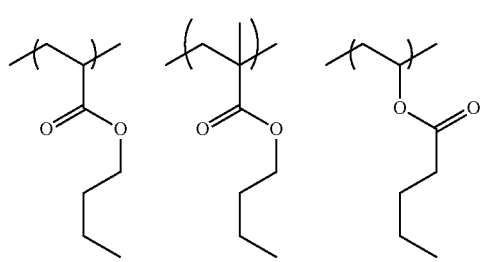

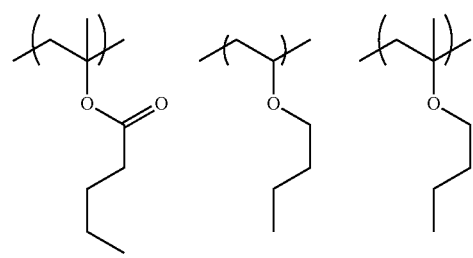
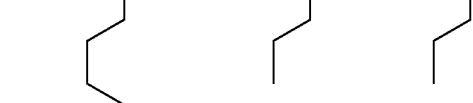
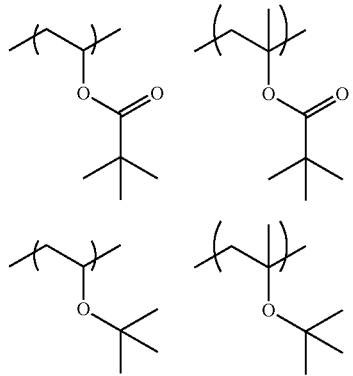
[Chemical Formula 26]
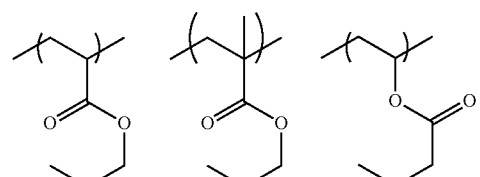
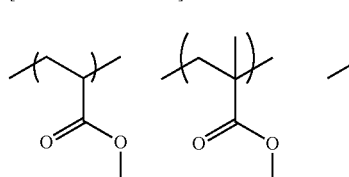
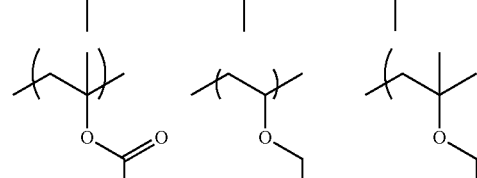
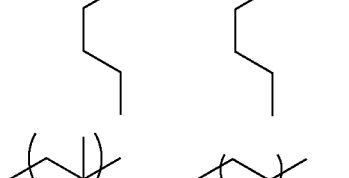
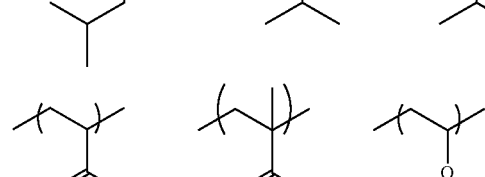
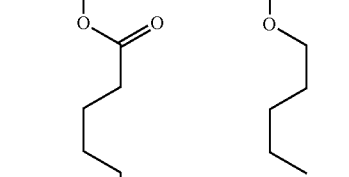
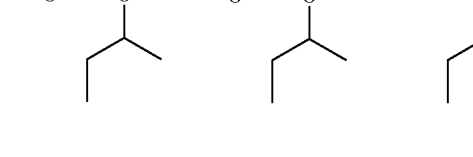
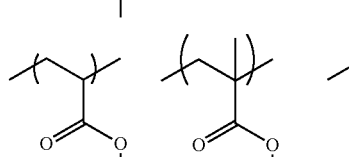
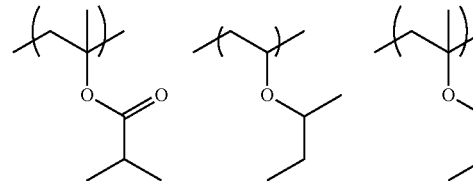
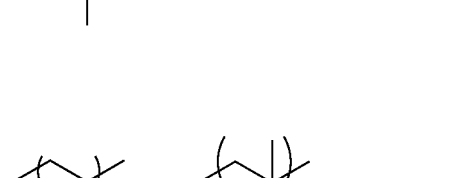
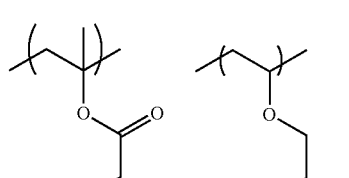
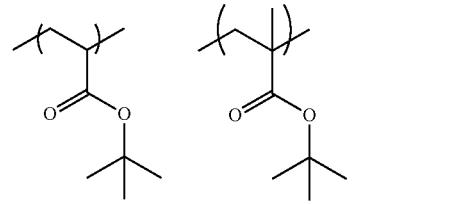
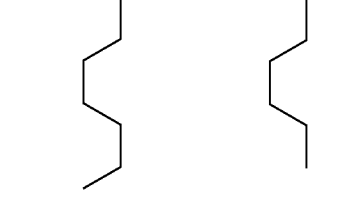

-continued
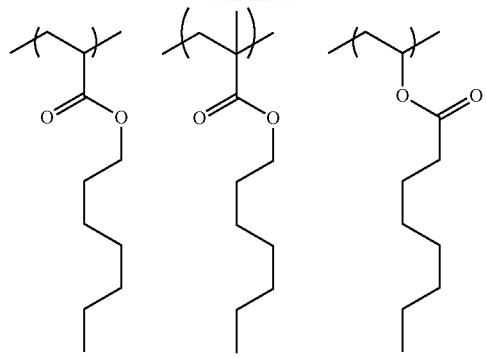
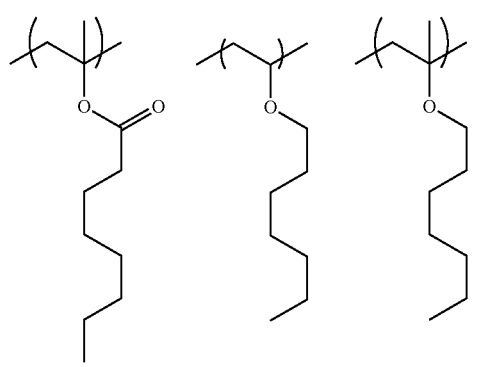
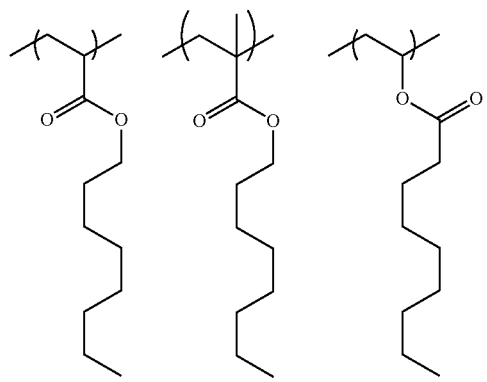
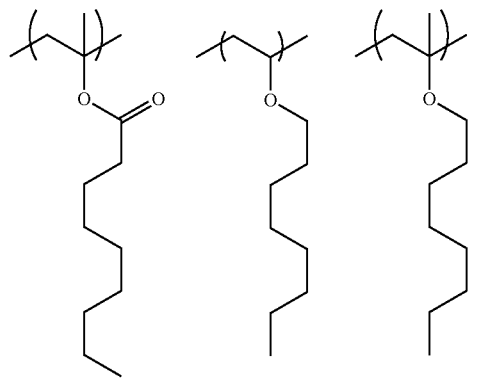
-continued
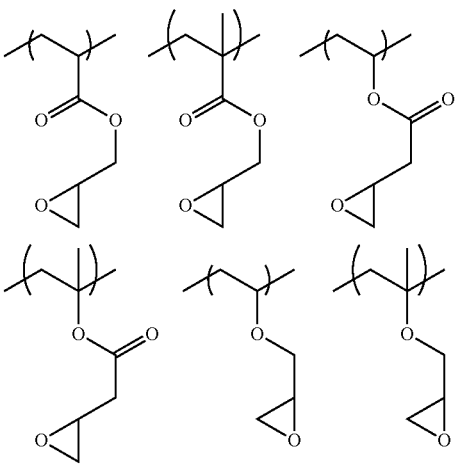
[Chemical Formula 27]
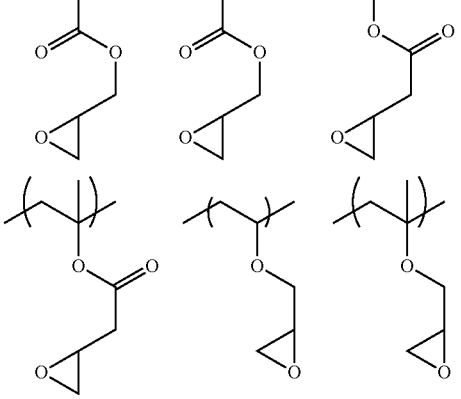
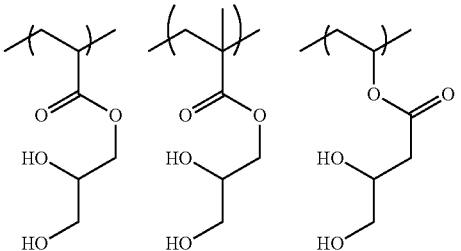

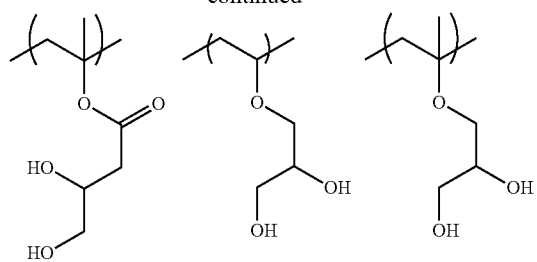
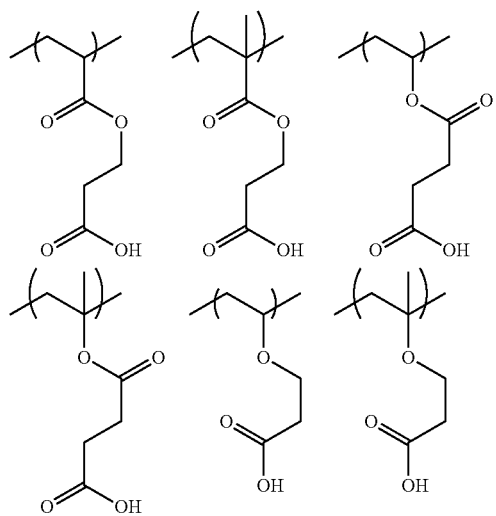
[Chemical Formula 28]
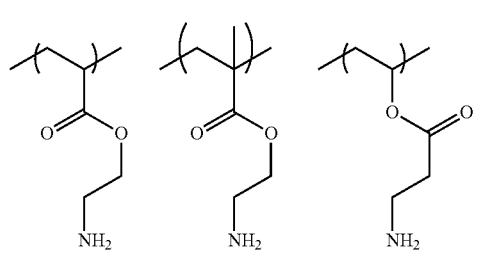
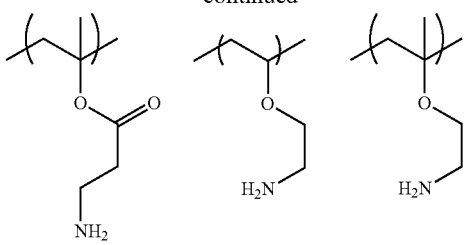
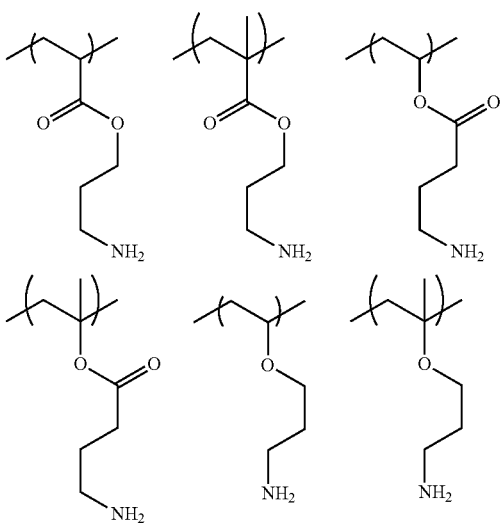
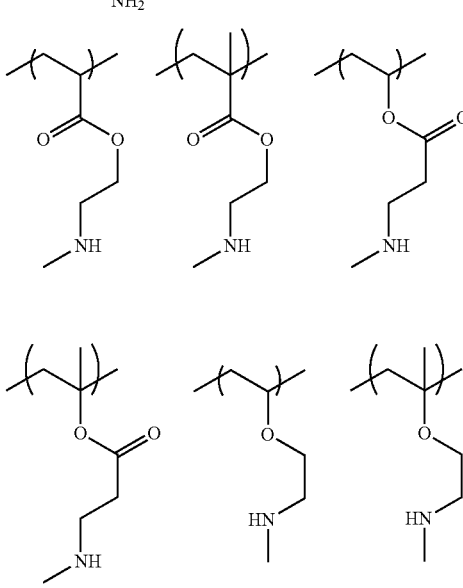
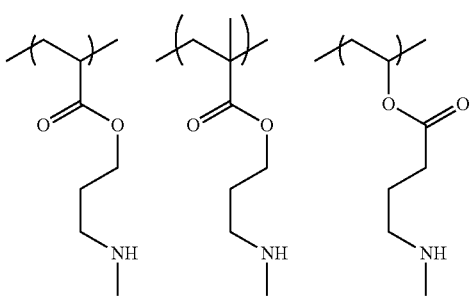

-continued
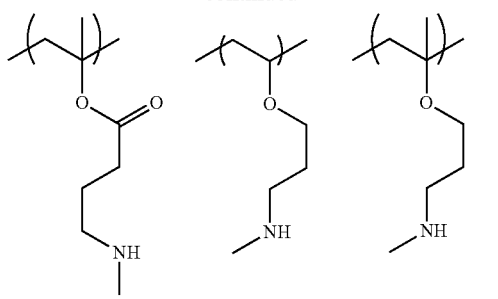
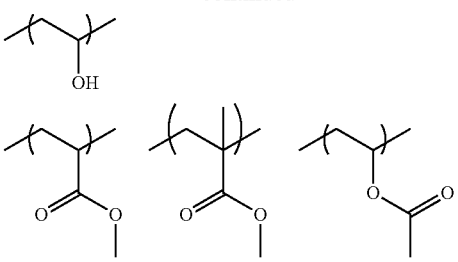
-continued
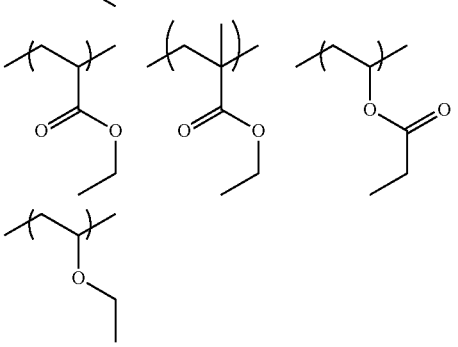
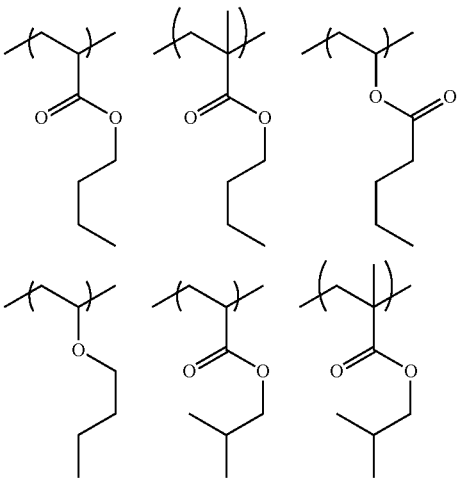
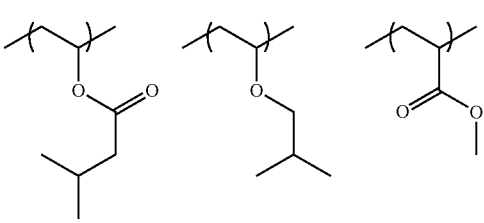
Combination of R, $L^1$, $L^4$, and $L^5$ in the formula (2) is preferably as follows.
[Chemical Formula 29]
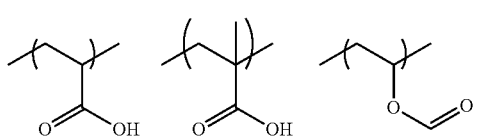
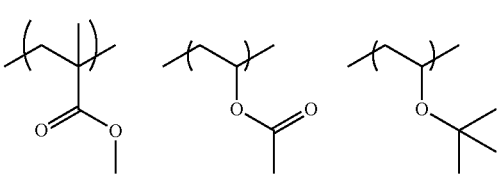

[Chemical Formula 30]
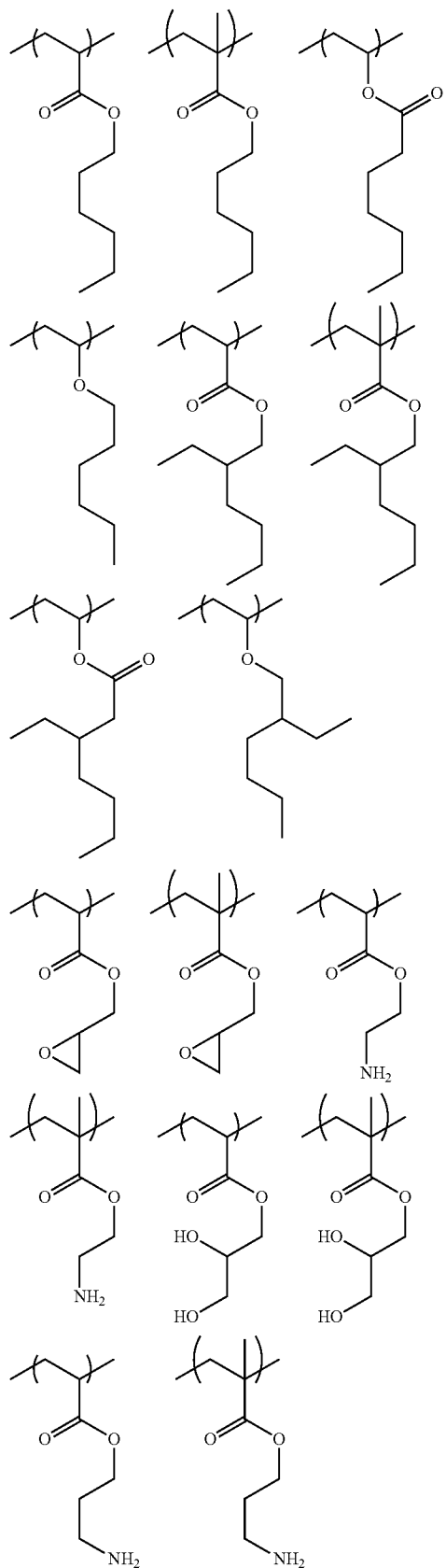
[Chemical Formula 31]
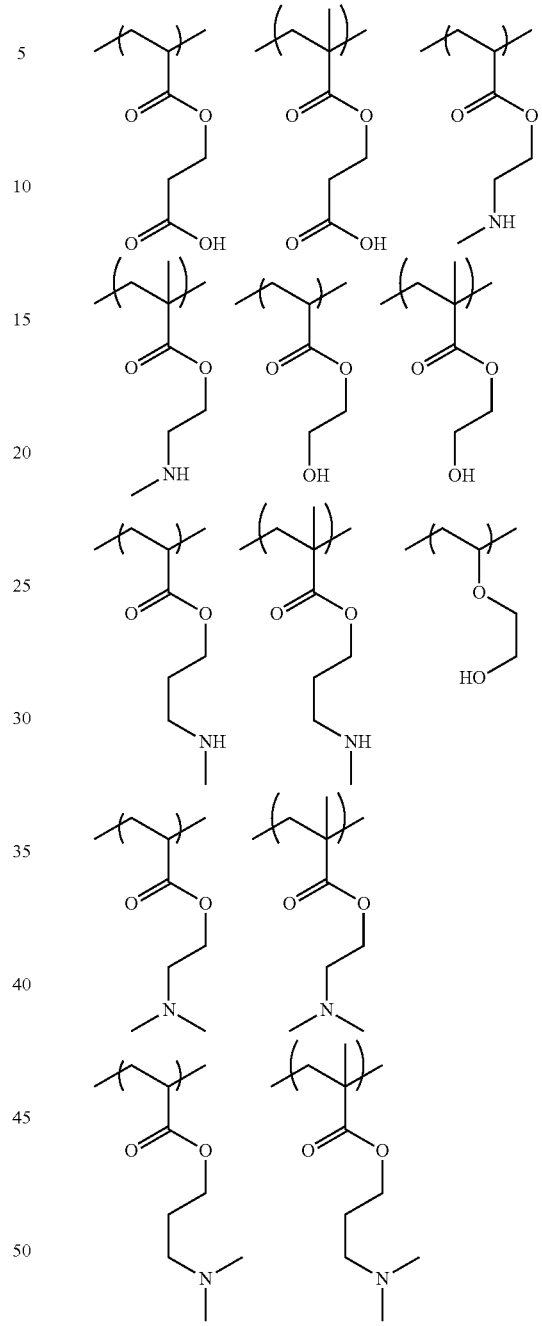
Combination of R, $L^1$, $L^4$, and $L^5$ in the formula (2) is even more preferably as follows.
[Chemical Formula 32]
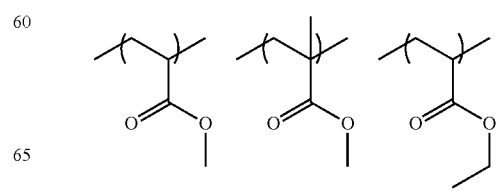

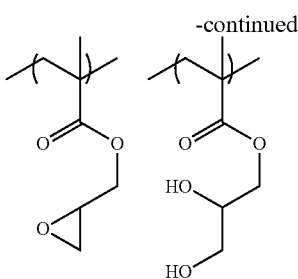

Combination of R, $L^1$, $L^4$, and $L^5$ in the formula (2) is even more preferably as follows.

[Chemical Formula 33]

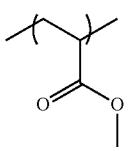

Examples of the constitutional unit represented by the formula (2) include a constitutional unit derived from propylene, a constitutional unit derived from butene, a constitutional unit derived from 1-pentene, a constitutional unit derived from 1-hexene, a constitutional unit derived from 1-heptene, a constitutional unit derived from 1-octene, a constitutional unit derived from acrylic acid, a constitutional unit derived from methacrylic acid, a constitutional unit derived from vinyl alcohol, a constitutional unit derived from methyl acrylate, a constitutional unit derived from ethyl acrylate, a constitutional unit derived from n-propyl acrylate, a constitutional unit derived from isopropyl acrylate, a constitutional unit derived from n-butyl acrylate, a constitutional unit derived from isobutyl acrylate, a constitutional unit derived from sec-butyl acrylate, a constitutional unit derived from tert-butyl acrylate, a constitutional unit derived from methyl methacrylate, a constitutional unit derived from ethyl methacrylate, a constitutional unit derived from n-propyl methacrylate, a constitutional unit derived from isopropyl methacrylate, a constitutional unit derived from n-butyl methacrylate, a constitutional unit derived from isobutyl methacrylate, a constitutional unit derived from sec-butyl methacrylate, a constitutional unit derived from tert-butyl methacrylate, a constitutional unit derived from vinyl formate, a constitutional unit derived from vinyl acetate, a constitutional unit derived from vinyl propionate, a constitutional unit derived from vinyl(n-butyrate), a constitutional unit derived from vinyl(isobutyrate), a constitutional unit derived from methyl vinyl ether, a constitutional unit derived from ethyl vinyl ether, a constitutional unit derived from n-propyl vinyl ether, a constitutional unit derived from isopropyl vinyl ether, a constitutional unit derived from n-butyl vinyl ether, a constitutional unit derived from isobutyl vinyl ether, a constitutional unit derived from sec-butyl vinyl ether, a constitutional unit derived from tert-butyl vinyl ether, a constitutional unit derived from glycidyl acrylate, a constitutional unit derived from glycidyl methacrylate, a constitutional unit derived from 2,3-dihydroxypropyl acrylate, a constitutional unit derived from 2,3-dihydroxypropyl methacrylate, a constitutional unit derived from 3-(dimethylamino)propyl acrylate, and a constitutional unit derived from 3-(dimethylamino) propyl methacrylate.

The constitutional unit represented by the formula (3) is a constitutional unit derived from maleic anhydride.

The polymer (1) may include two or more types of the constitutional unit (C), and, for example, may be a polymer including a constitutional unit derived from methyl acrylate, a constitutional unit derived from ethyl acrylate, and a constitutional unit derived from glycidyl methacrylate.

The polymer (1) is preferably a polymer including the constitutional unit (B) represented by the formula (1).

Examples of the polymer including the constitutional unit (B) represented by the formula (1) include:

a polymer (1) consisting of the constitutional unit (B);

a polymer (1) including the constitutional unit (B) and the constitutional unit (A);

a polymer (1) including the constitutional unit (B) and the constitutional unit (C); and a polymer (1) including the constitutional unit (B), the constitutional unit (A), and the constitutional unit (C).

Examples of the polymer (1) consisting of the constitutional unit (B) include:

a polymer consisting of a constitutional unit (B) represented by the formula (1) in which R is a hydrogen atom, $L^1$, $L^2$, and $L^3$ are each a single bond, and $L^6$ is an alkyl group having 14 or more and 30 or less carbon atoms; and a polymer consisting of a constitutional unit (B) represented by the formula (1) in which R is a hydrogen atom or a methyl group, $L^1$ is —CO—O—, $L^2$ and $L^3$ are each a single bond, and $L^6$ is an alkyl group having 14 or more and 30 or less carbon atoms.

Examples of the polymer (1) including the constitutional unit (B) and the constitutional unit (A) include:

a polymer including a constitutional unit (B) represented by the formula (1) in which R is a hydrogen atom, $L^1$, $L^2$, and $L^3$ are each a single bond, and $L^6$ is an alkyl group having 14 or more and 30 or less carbon atoms, and the constitutional unit (A), wherein the proportion of the number of the constitutional unit (A) and the constitutional unit (B) in total is 90% or more, with respect to 100% of the total number of all constitutional units included in the polymer, and a polymer including a constitutional unit (B) in which R is a hydrogen atom or a methyl group, $L^1$ is —CO—O—, $L^2$ and $L^3$ are each a single bond, and $L^6$ is an alkyl group having 14 or more and 30 or less carbon atoms, the constitutional unit (A), and optionally including the constitutional unit (C), wherein the proportion of the number of the constitutional unit (A) and the constitutional unit (B) in total is 90% or more, with respect to 100% of the total number of all constitutional units included in the polymer.

It is preferable for increase of ΔH that the polymer (1) be a polymer such that the proportion of the number of the constitutional unit (B) is more than 50% and 80% or less, with respect to 100% of the total number of the constitutional unit (B) and the constitutional unit (A) included in the polymer.

It is preferable for formability that the polymer (1) be a polymer such that the proportion of the number of the constitutional unit (B) is 10% or more and 50% or less, with respect to 100% of the total number of the constitutional unit (B) and the constitutional unit (A) included in the polymer.

Examples of the polymer (1) including the constitutional unit (B) and the constitutional unit (C) include:

a polymer including a constitutional unit (B) represented by the formula (1) in which R is a hydrogen atom or a methyl group, $L^1$ is —CO—O—, $L^2$ and $L^3$ are each a single bond, and $L^6$ is an alkyl group having 14 or more and 30 or less carbon atoms, and a constitutional unit (C) represented by the formula (2) in which R is a hydrogen atom or a methyl group, $L^1$ is —CO—O—, $L^4$ is a methylene group, and $L^5$ is a hydrogen atom. In this case, a polymer is preferred such that the proportion of the number of the constitutional unit (B) is 80% or more, with respect to 100% of the total number of the constitutional unit (B) and the constitutional unit (C) included in the polymer.

In the polymer (1), the proportion of the number of the constitutional unit (A) is 0% or more and 99% or less and the proportion of the number of the constitutional unit (B) and the constitutional unit (C) in total is 1% or more and 100% or less, with respect to 100% of the total number of the constitutional unit (A), the constitutional unit (B), and the constitutional unit (C); and the proportion of the number of the constitutional unit (B) is 1% or more and 100% or less and the proportion of the number of the constitutional unit (C) is 0% or more and 99% or less, with respect to 100% of the total number of the constitutional unit (B) and the constitutional unit (C).

The proportion of the number of the constitutional unit (A) in the polymer (1) is preferably 70% or more and 99% or less, more preferably 80% or more and 97.5% or less, and even more preferably 85% or more and 92.5% or less, with respect to 100% of the total number of the constitutional unit (A), the constitutional unit (B), and the constitutional unit (C), for imparting good shape retention to the molded article containing the polymer (1). The proportion of the number of the constitutional unit (B) and the constitutional unit (C) in total is preferably 1% or more and 30% or less, more preferably 2.5% or more and 20% or less, and even more preferably 7.5% or more and 15% or less, with respect to 100% of the total number of the constitutional unit (A), the constitutional unit (B), and the constitutional unit (C), for imparting good shape retention to the molded article containing the polymer (1).

The proportion of the number of the constitutional unit (B) in the polymer (1) is 1% or more and 100% or less, with respect to 100% of the total number of the constitutional unit (B) and the constitutional unit (C), and is preferably 60% or more and 100% or less, and more preferably 80% or more and 100% or less, for imparting good heat storage performance to the molded article containing the polymer (1). The proportion of the number of the constitutional unit (C) in the polymer (1) is 0% or more and 99% or less, with respect to 100% of the total number of the constitutional unit (B) and the constitutional unit (C), and is preferably 0% or more and 40% or less, and more preferably 0% or more and 20% or less, for imparting good heat storage performance to the molded article containing the polymer (1).

Each of the proportion of the number of the constitutional unit (A), the proportion of the number of the constitutional unit (B), and the proportion of the number of the constitutional unit (C) can be determined from an integrated value for a signal attributed to the corresponding constitutional unit in a $^{13}C$ nuclear magnetic resonance spectrum (hereinafter, referred to as "$^{13}C$-NMR spectrum") or a $^1H$ nuclear magnetic resonance spectrum (hereinafter, referred to as "$^1H$-NMR spectrum") by using a well-known method.

If the polymer (1) is a polymer produced, as described later, by using a method of reacting a polymer including at least one constitutional unit (C) selected from the group consisting of the constitutional unit represented by the above formula (2) and the constitutional unit represented by the above formula (3), and optionally including the constitutional unit (A) derived from ethylene (hereinafter, referred to as "precursor polymer (1)") and at least two compounds (α) described later, each of the proportion of the number of the constitutional unit (A), the proportion of the number of the constitutional unit (B), and the proportion of the number of the constitutional unit (C) can be determined, for example, in the following manner.

If the precursor polymer (1) includes the constitutional unit (A) derived from ethylene, the proportions of the number of the constitutional unit (A) and the constitutional unit (C) included in the precursor polymer (1) are first determined. In determining from a $^{13}C$-NMR spectrum, for example, the proportions of the number of dyads of the constitutional unit (A) and the constitutional unit (C) (AA, AC, CC) are determined from the spectrum, and substituted into the following formula to determine the proportions of the number of the constitutional unit (A) and the constitutional unit (C). Here, AA represents a constitutional unit (A)-constitutional unit (A) dyad, AC represents a constitutional unit (A)-constitutional unit (C) dyad, and CC represents a constitutional unit (C)-constitutional unit (C) dyad.

Proportion of the number of constitutional unit (A)=100−proportion of the number of constitutional unit (C)

$$\text{Proportion of the number of constitutional unit } (C)=100\times(AC/2+CC)/(AA+AC+CC)$$

Because the constitutional unit (B) in the polymer (1) is formed through reaction between the constitutional unit (C) included in the precursor polymer (1) and the compound (α), the conversion rate of the constitutional unit (C) in the reaction is determined in the following manner.

An integrated value for a signal attributed to a specific carbon included in the side chain of the constitutional unit (C) in the precursor polymer (1) (hereinafter, referred to as "integrated value Y") and an integrated value for a signal attributed to a specific carbon included in the side chain of the constitutional unit (B) in the polymer (1) (hereinafter, referred to as "integrated value Z") are substituted into the following formula to determine the conversion rate.

$$\text{Conversion rate}=Z/(Y+Z)$$

The proportion of the number of the constitutional unit (A) included in the polymer (1) is assumed to be identical to the proportion of the number of the constitutional unit (A) included in the precursor polymer (1) because the constitutional unit (A) included in the precursor polymer (1) remains unchanged after the reaction between the precursor polymer (1) and the compound (α). The proportion of the number of the constitutional unit (B) included in the polymer (1) is determined as the product of the proportion of the number of the constitutional unit (C) included in the precursor polymer (1) and the conversion rate. The proportion of the number of the constitutional unit (C) included in the polymer (1) is determined as the difference between the proportion of the number of the constitutional unit (C) included in the precursor polymer (1) and the proportion of the number of the constitutional unit (B) included in the polymer (1).

The precursor polymer (1) can be, in an example, a polymer including at least one constitutional unit (C) selected from the group consisting of the constitutional unit represented by the above formula (2) and the constitutional unit represented by the above formula (3), provided that $L^1$ in the formula (2) is —CO—O—, —O—CO—, or —O—.

Examples of production methods for the polymer (1) include: a method of reacting the precursor polymer (1) and at least two compounds (hereinafter, referred to as "compounds (α)") selected from the group consisting of alcohol including an alkyl group having 14 or more and 30 or less carbon atoms, amine including an alkyl group having 14 or more and 30 or less carbon atoms, alkyl halide including an alkyl group having 14 or more and 30 or less carbon atoms, carboxylic acid including an alkyl group having 14 or more and 30 or less carbon atoms, carboxamide including an alkyl group having 14 or more and 30 or less carbon atoms, carboxylic acid halide including an alkyl group having 14 or more and 30 or less carbon atoms, carbamic acid including an alkyl group having 14 or more and 30 or less carbon atoms, alkylurea including an alkyl group having 14 or more and 30 or less carbon atoms, and isocyanate including an alkyl group having 14 or more and 30 or less carbon atoms; a method of polymerizing a monomer to serve as a raw material of the constitutional unit (B); and a method of copolymerizing ethylene and a monomer to serve as a raw material of the constitutional unit (B). The alkyl group of each of the compounds (α) may be, for example, a linear alkyl group or a branched alkyl group, though it is preferable that the alkyl group be a linear alkyl group. It is preferable that the contents of the two or more kinds of compounds (α) be each 20 mol % or more with respect to 100 mol % of the total amount of the compounds (α) used in the method of reacting the precursor polymer (1) and the compounds (cx).

The precursor polymer (1) is a raw material for production of the polymer (1), and the precursor polymer (1) does not include the constitutional unit (B) represented by the formula (1). The precursor polymer (1) may include a constitutional unit corresponding to none of the constitutional unit (A), the constitutional unit (B), and the constitutional unit (C).

In the precursor polymer (1), preferably, the proportion of the number of the constitutional unit (A) is 0% or more and 99% or less and the proportion of the number of the constitutional unit (C) in total is 1% or more and 100% or less, with respect to 100% of the total number of the constitutional unit (A) and the constitutional unit (C). More preferably, the proportion of the number of the constitutional unit (A) is 70% or more and 99% or less and the proportion of the number of the constitutional unit (C) in total is 1% or more and 30% or less.

Examples of methods for forming the constitutional unit (B) in the polymer (1) include: a method of reacting the constitutional unit (C) included in the precursor polymer (1) and the compound (α); a method of polymerizing a monomer to serve as a raw material of the constitutional unit (B); or a method of copolymerizing ethylene and a monomer to serve as a raw material of the constitutional unit (B). It is preferable that the alkyl group of the compound (α) be a linear alkyl group. A polymerization initiator such as an azo compound may be used in the methods of polymerizing a monomer. Examples of the azo compound include azobisisobutyronitrile.

Examples of the precursor polymer (1) include acrylic acid polymer, methacrylic acid polymer, vinyl alcohol polymer, methyl acrylate polymer, ethyl acrylate polymer, n-propyl acrylate polymer, n-butyl acrylate polymer, methyl methacrylate polymer, ethyl methacrylate polymer, n-propyl methacrylate polymer, n-butyl methacrylate polymer, vinyl formate polymer, vinyl acetate polymer, vinyl propionate polymer, vinyl(n-butyrate) polymer, methyl vinyl ether polymer, ethyl vinyl ether polymer, n-propyl vinyl ether polymer, n-butyl vinyl ether polymer, maleic anhydride polymer, glycidyl acrylate polymer, glycidyl methacrylate polymer, 3-(dimethylamino)propyl acrylate polymer, 3-(dimethylamino)propyl methacrylate polymer, ethylene-acrylic acid copolymer, ethylene-methacrylic acid copolymer, ethylene-vinyl alcohol copolymer, ethylene-methyl acrylate copolymer, ethylene-ethyl acrylate copolymer, ethylene-n-propyl acrylate copolymer, ethylene-n-butyl acrylate copolymer, ethylene-methyl methacrylate copolymer, ethylene-ethyl methacrylate copolymer, ethylene-n-propyl methacrylate copolymer, ethylene-n-butyl methacrylate copolymer, ethylene-vinyl formate copolymer, ethylene-vinyl acetate copolymer, ethylene-vinyl propionate copolymer, ethylene-vinyl(n-butyrate) copolymer, ethylene-methyl vinyl ether copolymer, ethylene-ethyl vinyl ether copolymer, ethylene-n-propyl vinyl ether copolymer, ethylene-n-butyl vinyl ether copolymer, ethylene-maleic anhydride copolymer, ethylene-glycidyl acrylate copolymer, ethylene-glycidyl methacrylate copolymer, ethylene-3-(dimethylamino)propyl acrylate copolymer, and ethylene-3-(dimethylamino)propyl methacrylate copolymer.

Examples of the alcohol including a linear alkyl group having 14 or more and 30 or less carbon atoms include n-tetradecyl alcohol, n-pentadecyl alcohol, n-hexadecyl alcohol, n-heptadecyl alcohol, n-octadecyl alcohol, n-nonadecyl alcohol, n-eicosyl alcohol, n-heneicosyl alcohol, n-docosyl alcohol, n-tricosyl alcohol, n-tetracosyl alcohol, n-pentacosyl alcohol, n-hexacosyl alcohol, n-heptacosyl alcohol, n-octacosyl alcohol, n-nonacosyl alcohol, and n-triacontyl alcohol.

Examples of the alcohol including a branched alkyl group having 14 or more and 30 or less carbon atoms include isotetradecyl alcohol, isopentadecyl alcohol, isohexadecyl alcohol, isoheptadecyl alcohol, isooctadecyl alcohol, isononadecyl alcohol, isoeicosyl alcohol, isoheneicosyl alcohol, isodocosyl alcohol, isotricosyl alcohol, isotetracosyl alcohol, isopentacosyl alcohol, isohexacosyl alcohol, isoheptacosyl alcohol, isooctacosyl alcohol, isononacosyl alcohol, and isotriacontyl alcohol.

Examples of the amine including a linear alkyl group having 14 or more and 30 or less carbon atoms include n-tetradecylamine, n-pentadecylamine, n-hexadecylamine, n-heptadecylamine, n-octadecylamine, n-nonadecylamine, n-eicosylamine, n-heneicosylamine, n-docosylamine, n-tricosylamine, n-tetracosylamine, n-pentacosylamine, n-hexacosylamine, n-heptacosylamine, n-octacosylamine, n-nonacosylamine, and n-triacontylamine.

Examples of the amine including a branched alkyl group having 14 or more and 30 or less carbon atoms include isotetradecylamine, isopentadecylamine, isohexadecylamine, isoheptadecylamine, isooctadecylamine, isononadecylamine, isoeicosylamine, isoheneicosylamine, isodocosylamine, isotricosylamine, isotetracosylamine, isopentacosylamine, isohexacosylamine, isoheptacosylamine, isooctacosylamine, isononacosylamine, and isotriacontylamine.

Examples of the alkyl halide including a linear alkyl group having 14 or more and 30 or less carbon atoms include n-tetradecyl iodide, n-pentadecyl iodide, n-hexadecyl iodide, n-heptadecyl iodide, n-octadecyl iodide, n-nonadecyl iodide, n-eicosyl iodide, n-heneicosyl iodide, n-docosyl iodide, n-tricosyl iodide, n-tetracosyl iodide, n-pentacosyl iodide, n-hexacosyl iodide, n-heptacosyl iodide, n-octacosyl iodide, n-nonacosyl iodide, and n-triacontyl iodide.

Examples of the alkyl halide including a branched alkyl group having 14 or more and 30 or less carbon atoms include isotetradecyl iodide, isopentadecyl iodide, isohexadecyl iodide, isoheptadecyl iodide, isooctadecyl iodide, isononadecyl iodide, isoeicosyl iodide, isoheneicosyl iodide, isodocosyl iodide, isotricosyl iodide, isotetracosyl iodide, isopentacosyl iodide, isohexacosyl iodide, isoheptacosyl iodide, isooctacosyl iodide, isononacosyl iodide, and isotriacontyl iodide.

Examples of the carboxylic acid including a linear alkyl group having 14 or more and 30 or less carbon atoms include n-tetradecanoic acid, n-pentadecanoic acid, n-hexadecanoic acid, n-heptadecanoic acid, n-octadecanoic acid, n-nonadecanoic acid, n-eicosanoic acid, n-heneicosanoic acid, n-docosanoic acid, n-tricosanoic acid, n-tetracosanoic acid, n-pentacosanoic acid, n-hexacosanoic acid, n-heptacosanoic acid, n-octacosanoic acid, n-nonacosanoic acid, and n-triacontanoic acid.

Examples of the carboxylic acid including a branched alkyl group having 14 or more and 30 or less carbon atoms include isotetradecanoic acid, isopentadecanoic acid, isohexadecanoic acid, isoheptadecanoic acid, isooctadecanoic acid, isononadecanoic acid, isoeicosanoic acid, isoheneicosanoic acid, isodocosanoic acid, isotricosanoic acid, isotetracosanoic acid, isopentacosanoic acid, isohexacosanoic acid, isoheptacosanoic acid, isooctacosanoic acid, isononacosanoic acid, and isotriacontanoic acid.

Examples of the carboxamide including a linear alkyl group having 14 or more and 30 or less carbon atoms include n-tetradecanamide, n-pentadecanamide, n-hexadecanamide, n-heptadecanamide, n-octadecanamide, n-nonadecanamide, n-eicosanamide, n-heneicosanamide, n-docosanamide, n-tricosanamide, n-tetracosanamide, n-pentacosanamide, n-hexacosanamide, n-heptacosanamide, n-octacosanamide, n-nonacosanamide, and n-triacontanamide.

Examples of the carboxamide including a branched alkyl group having 14 or more and 30 or less carbon atoms include isotetradecanamide, isopentadecanamide, isohexadecanamide, isoheptadecanamide, isooctadecanamide, isononadecanamide, isoeicosanamide, isoheneicosanamide, isodocosanamide, isotricosanamide, isotetracosanamide, isopentacosanamide, isohexacosanamide, isoheptacosanamide, isooctacosanamide, isononacosanamide, and isotriacontanamide.

Examples of the carboxylic acid halide including a linear alkyl group having 14 or more and 30 or less carbon atoms include n-tetradecanoic acid chloride, n-pentadecanoic acid chloride, n-hexadecanoic acid chloride, n-heptadecanoic acid chloride, n-octadecanoic acid chloride, n-nonadecanoic acid chloride, n-eicosanoic acid chloride, n-heneicosanoic acid chloride, n-docosanoic acid chloride, n-tricosanoic acid chloride, n-tetracosanoic acid chloride, n-pentacosanoic acid chloride, n-hexacosanoic acid chloride, n-heptacosanoic acid chloride, n-octacosanoic acid chloride, n-nonacosanoic acid chloride, and n-triacontanoic acid chloride.

Examples of the carboxylic acid halide including a branched alkyl group having 14 or more and 30 or less carbon atoms include isotetradecanoic acid chloride, isopentadecanoic acid chloride, isohexadecanoic acid chloride, isoheptadecanoic acid chloride, isooctadecanoic acid chloride, isononadecanoic acid chloride, isoeicosanoic acid chloride, isoheneicosanoic acid chloride, isodocosanoic acid chloride, isotricosanoic acid chloride, isotetracosanoic acid chloride, isopentacosanoic acid chloride, isohexacosanoic acid chloride, isoheptacosanoic acid chloride, isooctacosanoic acid chloride, isononacosanoic acid chloride, and isotriacontanoic acid chloride.

Examples of the carbamic acid including a linear alkyl group having 14 or more and 30 or less carbon atoms include n-tetradecylcarbamic acid, n-pentadecylcarbamic acid, n-hexadecylcarbamic acid, n-heptadecylcarbamic acid, n-octadecylcarbamic acid, n-nonadecylcarbamic acid, n-eicosylcarbamic acid, n-heneicosylcarbamic acid, n-docosylcarbamic acid, n-tricosylcarbamic acid, n-tetracosylcarbamic acid, n-pentacosylcarbamic acid, n-hexacosylcarbamic acid, n-heptacosylcarbamic acid, n-octacosylcarbamic acid, n-nonacosylcarbamic acid, and n-triacontylcarbamic acid.

Examples of the carbamic acid including a branched alkyl group having 14 or more and 30 or less carbon atoms include isotetradecylcarbamic acid, isopentadecylcarbamic acid, isohexadecylcarbamic acid, isoheptadecylcarbamic acid, isooctadecylcarbamic acid, isononadecylcarbamic acid, isoeicosylcarbamic acid, isoheneicosylcarbamic acid, isodocosylcarbamic acid, isotricosylcarbamic acid, isotetracosylcarbamic acid, isopentacosylcarbamic acid, isohexacosylcarbamic acid, isoheptacosylcarbamic acid, isooctacosylcarbamic acid, isononacosylcarbamic acid, and isotriacontylcarbamic acid.

Examples of the alkylurea including a linear alkyl group having 14 or more and 30 or less carbon atoms include n-tetradecylurea, n-pentadecylurea, n-hexadecylurea, n-heptadecylurea, n-octadecylurea, n-nonadecylurea, n-eicosylurea, n-heneicosylurea, n-docosylurea, n-tricosylurea, n-tetracosylurea, n-pentacosylurea, n-hexacosylurea, n-heptacosylurea, n-octacosylurea, n-nonacosylurea, and n-triacontylurea.

Examples of the alkylurea including a branched alkyl group having 14 or more and 30 or less carbon atoms include isotetradecylurea, isopentadecylurea, isohexadecylurea, isoheptadecylurea, isooctadecylurea, isononadecylurea, isoeicosylurea, isoheneicosylurea, isodocosylurea, isotricosylurea, isotetracosylurea, isopentacosylurea, isohexacosylurea, isoheptacosylurea, isooctacosylurea, isononacosylurea, and isotriacontylurea.

Examples of the isocyanate including a linear alkyl group having 14 or more and 30 or less carbon atoms include n-tetradecyl isocyanate, n-pentadecyl isocyanate, n-hexadecyl isocyanate, n-heptadecyl isocyanate, n-octadecyl isocyanate, n-nonadecyl isocyanate, n-eicosyl isocyanate, n-heneicosyl isocyanate, n-docosyl isocyanate, n-tricosyl isocyanate, n-tetracosyl isocyanate, n-pentacosyl isocyanate, n-hexacosyl isocyanate, n-heptacosyl isocyanate, n-octacosyl isocyanate, n-nonacosyl isocyanate, and n-triacontyl isocyanate.

Examples of the isocyanate including a branched alkyl group having 14 or more and 30 or less carbon atoms include isotetradecyl isocyanate, isopentadecyl isocyanate, isohexadecyl isocyanate, isoheptadecyl isocyanate, isooctadecyl isocyanate, isononadecyl isocyanate, isoeicosyl isocyanate, isoheneicosyl isocyanate, isodocosyl isocyanate, isotricosyl isocyanate, isotetracosyl isocyanate, isopentacosyl isocyanate, isohexacosyl isocyanate, isoheptacosyl isocyanate, isooctacosyl isocyanate, isononacosyl isocyanate, and isotriacontyl isocyanate.

If the precursor polymer (1) includes the constitutional unit (A) derived from ethylene, the product of reactivity ratios, $r1r2$, where $r1$ represents the reactivity ratio of ethylene to be used as a raw material in production of the precursor polymer (1), and $r2$ represents the reactivity ratio of a monomer to form the constitutional unit (C), is preferably 0.5 or higher and 5.0 or lower, and more preferably 0.5 or higher and 3.0 or lower, for imparting good shape retention to the molded article containing the precursor polymer (1).

The reactivity ratio of ethylene, $r1$, is a value defined as the formula $r1=k11/k12$ in copolymerizing ethylene and a monomer to form the constitutional unit (C), where $k11$ represents the reaction rate of ethylene to bond to a polymer including the constitutional unit (A) at an end, and $k12$ represents the reaction rate of the monomer to form the constitutional unit (C) to bond to the polymer including the constitutional unit (A) at an end. The reactivity ratio, r1, is an index indicative of which of ethylene and a monomer to form the constitutional unit (C) a polymer including the constitutional unit (A) at an end is more reactive with in copolymerizing ethylene and a monomer to form the constitutional unit (C). Higher r1 indicates that the polymer including the constitutional unit (A) at an end is more reactive with ethylene, and a chain of the constitutional unit (A) is likely to be generated.

The reactivity ratio of a monomer to form the constitutional unit (C), r2, is a value defined as r2=k22/k21 in copolymerizing ethylene and a monomer to form the constitutional unit (C), where k21 represents the reaction rate of ethylene to bond to a polymer including the constitutional unit (C) at an end, and k22 represents the reaction rate of the monomer to form the constitutional unit (C) to bond to the polymer including the constitutional unit (C) at an end. The reactivity ratio, r2, is an index indicative of which of ethylene and a monomer to form the constitutional unit (C) a polymer including the constitutional unit (C) at an end is more reactive with in copolymerizing ethylene and a monomer to form the constitutional unit (C). Higher r2 indicates that the polymer including the constitutional unit (C) at an end is more reactive with the monomer to form the constitutional unit (C), and a chain of the constitutional unit (C) is likely to be generated.

The product of the reactivity ratios, r1r2, is calculated by using a method described in the literature "Kakugo, M.; Naito, Y.; Mizunuma, K.; Miyatake, T. Macromolecules, 1982, 15, 1150". In the present invention, the product of the reactivity ratios, r1r2, is obtained by substituting the proportions of the number of dyads of the constitutional unit (A) and the constitutional unit (C), namely, AA, AC, and CC, calculated from a $^{13}C$ nuclear magnetic resonance spectrum for the precursor polymer (1) into the following formula.

$$r1r2=AA[CC/(AC/2)^2]$$

The product of the reactivity ratios, r1r2, is an index indicative of the monomer chain distribution of a copolymer. The monomer chain distribution of a copolymer has higher randomness as the r1r2 is closer to 1, and the monomer chain distribution of a copolymer has a higher degree of alternating copolymerization character as the r1r2 is closer to 0, and the monomer chain distribution of a copolymer has a higher degree of block copolymerization character as the r1r2 is larger beyond 1.

The melt flow rate (MFR) of the precursor polymer (1) as measured in accordance with JIS K7210 at a temperature of 190° C. with a load of 21 N is preferably 0.1 g/10 min or higher and 500 g/10 min or lower.

Examples of methods for producing the precursor polymer (1) include a coordination polymerization method, a cationic polymerization method, an anionic polymerization method, and a radical polymerization method, and a radical polymerization method is preferred, and a radical polymerization method under high pressure is more preferred.

The reaction temperature for reacting the precursor polymer (1) and the at least two compounds (α) is typically 40° C. or higher and 250° C. or lower. This reaction may be performed in the presence of a solvent, and examples of the solvent include hexane, heptane, octane, nonane, decane, toluene, and xylene. If any byproduct is generated in this reaction, the reaction may be performed while the byproduct is distilled off under reduced pressure to promote the reaction, or performed while the byproduct is azeotroped with the solvent, the volatilized byproduct and the solvent are cooled, the distillate containing the byproduct and the solvent is separated into a byproduct layer and a solvent layer, and only the recovered solvent is returned as a reflux solution into the reaction system.

The reaction between the precursor polymer (1) and the at least two compounds (α) may be performed while the precursor polymer (1) and the compounds (α) are melt-kneaded together. If any byproduct is generated in reacting the precursor polymer (1) and the compound (α) with melt-kneading, the reaction may be performed while the byproduct is distilled off under reduced pressure to promote the reaction. Examples of the melt-kneading apparatus for the melt-kneading include apparatuses including a single-screw extruder, a twin-screw extruder, and a Banbury mixer. The temperature of the melt-kneading apparatus is preferably 100° C. or higher and 250° C. or lower.

In reacting the precursor polymer (1) and the at least two compounds (α), a catalyst may be added to promote the reaction. Examples of the catalyst include alkali metal salts and group 4 metal complexes. Examples of alkali metal salts include alkali metal hydroxides such as lithium hydroxide, sodium hydroxide, and potassium hydroxide; and alkali metal alkoxides such as lithium methoxide and sodium methoxide. Examples of group 4 metal complexes include tetra(isopropyl) orthotitanate, tetra(n-butyl) orthotitanate, and tetraoctadecyl orthotitanate. It is preferable that the loading of the catalyst be 0.01 parts by weight or more and 50 parts by weight or less with respect to 100 parts by weight of the total amount of the precursor polymer (1) and the at least two compounds (α) to be used for the reaction, and the loading is more preferably 0.01 parts by weight or more and 5 parts by weight or less.

The polymer (1) preferably includes the constitutional unit (A) derived from ethylene for imparting good shape retention to the molded article comprising the polymer (1) and imparting good formability to the polymer at temperatures equal to or higher than the melting peak temperature of the polymer (1). More preferably, the constitutional unit (A) derived from ethylene is forming a branched structure in the polymer for imparting good blow moldability and good foam moldability to the polymer (1), and, even more preferably, the branched structure is a long chain branched structure to a degree allowing polymer chains in the branched structure to tangle together.

The ratio defined for the polymer (1) as the following formula (I), A, is preferably 0.95 or lower, more preferably 0.90 or lower, and even more preferably 0.80 or lower:

$$A=\alpha_1/\alpha_0 \quad (I)$$

In the formula (I), $\alpha_1$ represents a value obtained by using a method including: measuring the absolute molecular weight and intrinsic viscosity of a polymer through gel permeation chromatography with an apparatus including a light scattering detector and a viscosity detector, plotting measurements in a manner such that logarithms of the absolute molecular weight are plotted on an abscissa and logarithms of the intrinsic viscosity are plotted on an ordinate; and performing least squares approximation for the logarithms of the absolute molecular weight and the logarithms of the intrinsic viscosity by using a formula (I-I) within the range of the logarithm of the weight-average molecular weight of the polymer or more and the logarithm of the z-average molecular weight of the polymer or less along the abscissa to derive the slope of the line representing the formula (I-I) as $\alpha_1$:

$$\log[\eta_1] = \alpha_1 \log M_1 + \log K_1 \quad \text{(I-I)}$$

wherein $[\eta_1]$ represents the intrinsic viscosity (unit: dl/g) of the polymer, $M_1$ represents the absolute molecular weight of the polymer, and $K_1$ represents a constant.

In the formula (I), $\alpha_0$ represents a value obtained by using a method including: measuring the absolute molecular weight and intrinsic viscosity of Polyethylene Standard Reference Material 1475a (produced by National Institute of Standards and Technology) through gel permeation chromatography with an apparatus including a light scattering detector and a viscosity detector, plotting measurements in a manner such that logarithms of the absolute molecular weight are plotted on an abscissa and logarithms of the intrinsic viscosity are plotted on an ordinate; and performing least squares approximation for the logarithms of the absolute molecular weight and the logarithms of the intrinsic viscosity by using a formula (I-II) within the range of the logarithm of the weight-average molecular weight of the Polyethylene Standard Reference Material 1475a or more and the logarithm of the z-average molecular weight of the Polyethylene Standard Reference Material 1475a or less along the abscissa to derive the slope of the line representing the formula (I-II) as $\alpha_0$:

$$\log[\eta_0] = \alpha_0 \log M_0 + \log K_0 \quad \text{(I-II)}$$

wherein $[\eta_0]$ represents the intrinsic viscosity (unit: dl/g) of the Polyethylene Standard Reference Material 1475a, $M_0$ represents the absolute molecular weight of the Polyethylene Standard Reference Material 1475a, and $K_0$ represents a constant. Here, in measurement of absolute molecular weight and intrinsic viscosity for the polymer and the Polyethylene Standard Reference Material 1475a by gel permeation chromatography, the mobile phase is ortho-dichlorobenzene and the measurement temperature is 155° C.

In determining absolute molecular weight from data acquired with the light scattering detector and determining intrinsic viscosity ($[\eta]$) with the viscosity detector, calculation is made by using the data processing software OmniSEC (version 4.7) from Malvem Instruments Limited with reference to the literature "Size Exclusion Chromatography, Springer (1999)".

The Polyethylene Standard Reference Material 1475a (produced by National Institute of Standards and Technology) is an unbranched high-density polyethylene. Each of the formula (I-I) and the formula (I-II), which is called "Mark-Hauwink-Sakurada equation", represents the correlation between the intrinsic viscosity and molecular weight of a polymer, and the smaller the $\alpha_1$, the larger the number of tangling polymer chains in a branched structure. Since no branched structure is formed in the Polyethylene Standard Reference Material 1475a, tangling of polymer chains in a branched structure is not generated. The smaller the A, which is the ratio of $\alpha_1$ to $\alpha_0$ of the Polyethylene Standard Reference Material 1475a, the larger the fraction of a long chain branched structure formed by the constitutional unit (A) in a polymer.

The weight-average molecular weight of the polymer (1) as measured through gel permeation chromatography with an apparatus including a light scattering detector is preferably 10000 to 1000000, more preferably 50000 to 750000, and even more preferably 100000 to 500000.

In measurement of the weight-average molecular weight of the polymer (1) through gel permeation chromatography, the mobile phase is ortho-dichlorobenzene, and the measurement temperature is 155° C.

For a more reduced load of extrusion in molding, the flow activation energy ($E_a$) of the polymer (1) is preferably 40 kJ/mol or higher, more preferably 50 kJ/mol or higher, and even more preferably 60 kJ/mol or higher. For imparting good appearance to a molded article to be obtained by extrusion, $E_a$ is preferably 100 kJ/mol or lower, more preferably 90 kJ/mol or lower, and even more preferably 80 kJ/mol or lower. The magnitude of $E_a$ primarily depends on the number of long chain branches in a polymer. A polymer including a larger number of long chain branches has higher $E_a$.

The flow activation energy ($E_a$) is determined in the following manner. First, three or more temperatures including 170° C. are selected from temperatures of 90° C., 110° C., 130° C., 150° C., and 170° C., and a melt complex viscosity-angular frequency curve is determined for a polymer at each of the temperatures (T, unit: ° C.). The melt complex viscosity-angular frequency curve is a log-log curve with logarithms of melt complex viscosities (unit: Pa·sec) on the ordinate and logarithms of angular frequencies (unit: rad/sec) on the abscissa. Next, angular frequencies and melt complex viscosities in each of the melt complex viscosity-angular frequency curves determined at the temperatures other than 170° C. are multiplied by $a_T$ and $1/a_T$, respectively, so that each of the melt complex viscosity-angular frequency curves fits just to the melt complex viscosity-angular frequency curve at 170° C. $a_T$ is a value appropriately determined so that a melt complex viscosity-angular frequency curves determined at a temperature other than 170° C. fits just to the melt complex viscosity-angular frequency curve at 170° C.

The $a_T$ is a value commonly referred to as "shift factor" and varies depending on the temperature to determine a melt complex viscosity-angular frequency curve.

Subsequently, $[\ln(a_T)]$ and $[1/(T+273.16)]$ are determined for each temperature (T), and $[\ln(a_T)]$ and $[1/(T+273.16)]$ are subjected to least squares approximation by using the following formula (II) to determine the slope, m, of the line representing the formula (II). The m is substituted into the following formula (III) to determine $E_a$.

$$\ln(a_T) = m(1/(T+273.16)) + n \quad \text{(II)}$$

$$E_a = |0.008314 \times m| \quad \text{(III)}$$

$a_T$: shift factor
$E_a$: flow activation energy (unit: kJ/mol)
T: temperature (unit: ° C.)

Commercially available calculation software may be used for the calculation, and examples of the calculation software include Ochestrator produced by TA Instruments, Inc.

The above method is based on the following principle.

It is known that melt complex viscosity-angular frequency curves (log-log curves) determined at different temperatures fit just to one parent curve (referred to as "master curve") by translation of specific distances, and this is termed "temperature-time superposition principle". The distance of translation, termed "shift factor", is a value depending on temperature, and the temperature dependence of the shift factor is known to be represented by the above formulas (II) and (III), and the formulas (II) and (II) are each called "Arrhenius-type equation".

The correlation coefficient in least squares approximation of [ln($a_T$)] and [1/(T+273.16)] by using the above formula (II) is controlled to be 0.9 or higher.

The determination of melt complex viscosity-angular frequency curves is performed by using a viscoelastometer (e.g., ARES, produced by TA Instruments, Inc.) typically under conditions of geometry: parallel plates, plate diameter: 25 mm, plate interval: 1.2 to 2 mm, strain: 5%, angular frequency: 0.1 to 100 rad/sec. The determination is performed under nitrogen atmosphere. It is preferable to blend in advance a proper quantity (e.g., 1000 ppm by weight) of an antioxidant to a measurement sample.

The elongational viscosity nonlinear index, k, of the polymer (1), as an indicator of intensity of strain hardening, is preferably 0.85 or higher, more preferably 0.90 or higher, and even more preferably 0.95 or higher, for excellent formability such as reduced neck-in or reduced unevenness of thickness in a resulting film in T-die film processing, and less foam-breaking in foam molding. The strain hardening of a polymer is a phenomenon that the elongational viscosity of the polymer drastically increases when strain applied to the polymer exceeds a certain amount of strain. It is preferable for ease of formation of the polymer (1) or a resin composition of the present invention containing the polymer (1) into a desired shape that the index, k, be 2.00 or lower, and the index is more preferably 1.50 or lower, even more preferably 1.40 or lower, furthermore preferably 1.30 or lower, and particularly preferably 1.20 or lower.

The elongational viscosity nonlinear index, k, is determined in the following manner.

Determined are viscosity, $\eta_E 1(t)$, at each elongation time, t, during uniaxially elongating a polymer at a temperature of 110° C. and a strain rate of 1 sec$^{-1}$, and viscosity, $\eta_E 0.1(t)$, at each elongation time, t, during uniaxially elongating the polymer at a temperature of 110° C. and a strain rate of 0.1 sec$^{-1}$. The $\eta_E 1(t)$ and the $\eta_E 0.1(t)$ at the same, arbitrary elongation time, t, are substituted into the following formula to determine $\alpha(t)$.

$$\alpha(t) = \eta_E 1(t) / \eta_E 0.1(t)$$

Logarithms of $\alpha(t)$ (ln($\alpha(t)$)) are plotted against elongation time, t, and ln($\alpha(t)$) and t within the range of t from 2.0 seconds to 2.5 seconds are subjected to least squares approximation by using the following formula. The slope of the line representing the following formula is k.

$$\ln(\alpha(t)) = kt$$

Employed is k for the case that the correlation function, r2, used in least squares approximation based on the above formula is 0.9 or higher.

The measurement of viscosity in uniaxial elongation is performed by using a viscoelastometer (e.g., ARES, produced by TA Instruments, Inc.) under nitrogen atmosphere.

In measurement of elongational viscosity, polymers including a long chain branch have a tendency to undergo drastic increase of elongational viscosity beyond the linear regime in a high-strain region, what is called "strain hardening property". The logarithm of $\alpha(t)$ (ln($\alpha(t)$)) is known to increase in proportion to ln(1/$l_0$) for polymers having the strain hardening property (here, $l_0$ and 1 respectively represent the lengths of a sample at elongation times of 0 and t) [reference: Kiyohito Koyama, Osamu Ishizuka; Journal of Fiber Science and Technology, 37, T-258 (1981)]. For polymers having no strain hardening property, $\alpha(t)$ is 1 at any elongation time, and the slope, k, of a line obtained by plotting the logarithm of $\alpha(t)$ (ln($\alpha(t)$)) against elongation time is 0. For polymers having the strain hardening property, the slope, k, of the line plot is not 0, particularly in a high-strain region. In the present invention, k is defined as the slope of a line obtained by plotting the logarithm of the nonlinear parameter $\alpha(t)$ (ln($\alpha(t)$)) as a parameter indicative of the degree of the strain hardening property, against elongation time.

The polymer (1) may be forming a mixture with the compound ($\alpha$) left unreacted, or with a catalyst added to promote the reaction. It is preferable for preventing the polymer from adhering to a substrate of glass, metal, or another material that the content of the compound ($\alpha$) left unreacted in the mixture be less than 3 parts by weight with respect to 100 parts by weight of the polymer.

The polymer (1) may be a crosslinked polymer, or an uncrosslinked polymer.

In one mode, the polymer (1) is an uncrosslinked polymer (hereinafter, referred to as "polymer ($\alpha$)").

The polymer ($\alpha$) has a gel fraction, which is described later, of less than 20 wt %.

It is preferable that the proportion of the number of the constitutional unit (A), the constitutional unit (B), and the constitutional unit (C) in total in the polymer ($\alpha$) be 90% or more with respect to 100% of the total number of all constitutional units included in the polymer, and the proportion of the number is more preferably 95% or more, and even more preferably 100%.

<Crosslinked Polymer>

In one mode, the polymer (1) is crosslinked. Specifically, at least a part of molecules of the polymer (1) are linked together via intermolecular covalent bonding.

Examples of methods for crosslinking the polymer (1) include a method of crosslinking through irradiation with ionizing radiation and a method of crosslinking with an organic peroxide.

In crosslinking through irradiating the polymer (1) with ionizing radiation, the polymer ($\alpha$) molded into a desired shape in advance is typically irradiated with ionizing radiation. Any known method is used for molding, and extrusion, injection molding, and press molding are preferred. The molded article to be irradiated with ionizing radiation may be a molded article containing the polymer (1) as the only resin component, or a molded article containing the polymer (1) and a polymer different from the polymer (1). In the latter case, examples of the polymer different from the polymer (1) include a polymer (2) described later. In the case that the molded article contains the polymer according to the present invention and the polymer (2), it is preferable that the content of the polymer (1) be 30 wt % or more and 99 wt % or less, with respect to 100 wt % of the total amount of the polymer (1) and the polymer (2).

Examples of ionizing radiation include $\alpha$-rays, $\beta$-rays, $\gamma$-rays, electron beams, neutron beams, and X-rays, and $\gamma$-rays from cobalt-60 and electron beams are preferred. In the case that the molded article containing the polymer is in the form of a sheet, at least one surface of the molded article in the form of a sheet can be suitably irradiated with ionizing radiation.

Irradiation with ionizing radiation is performed by using a known ionizing radiation irradiator, and the dose is typically 5 to 300 kGy, and preferably 10 to 150 kGy. The polymer according to the present invention can attain a higher degree of crosslinking with a dose lower than those in typical cases.

In obtaining the polymer (1) crosslinked through irradiation with ionizing radiation, a higher degree of crosslinking is achieved for the polymer (1) if the molded article to be irradiated with ionizing radiation contains a crosslinking aid.

The crosslinking aid is for the purpose of increasing the degree of crosslinking of the polymer (1) to improve the mechanical properties, and a compound including a plurality of double bonds in the molecule is preferably used. Examples of the crosslinking aid include N,N'-m-phenylene bismaleimide, toluylene bismaleimide, triallyl isocyanurate, triallyl cyanurate, p-quinone dioxime, nitrobenzene, diphenylguanidine, divinylbenzene, ethylene glycol dimethacrylate, polyethylene glycol dimethacrylate, trimethylolpropane trimethacrylate, trimethylolpropane triacrylate, and allyl methacrylate. More than one of these crosslinking aids may be used in combination.

It is preferable that the loading of the crosslinking aid be 0.01 to 4.0 parts by weight with respect to 100 parts by weight of the total weight of the polymer (1) and the polymer different from the polymer (1) contained in the molded article to be irradiated with ionizing radiation, and it is more preferable that the loading of the crosslinking aid be 0.05 to 2.0 parts by weight.

Examples of the method of crosslinking with an organic peroxide include a method of crosslinking of the polymer (α) by subjecting a resin composition containing the polymer (α) and an organic peroxide to a known molding method involving heating. Examples of the known molding method involving heating include extrusion, injection molding, and press molding. The resin composition containing the polymer (α) and an organic peroxide may contain the polymer according to the present invention as the only resin component, or contain the polymer according to the present invention and a polymer different from the polymer.

In the case that the resin composition containing the polymer (α) and an organic peroxide contains a polymer different from the polymer (1), examples of the polymer different from the polymer (1) include a polymer (2) described later, and it is preferable that the content of the polymer according to the present invention be 30 wt % or more and 99 wt % or less with respect to 100 wt % of the total amount of the polymer (1) and the polymer (2).

In crosslinking with an organic peroxide, an organic peroxide having a decomposition temperature equal to or higher than the fluidizing temperature of the resin component contained in the composition containing the polymer (α) and an organic peroxide is suitably used, and preferred examples of the organic peroxide include dicumyl peroxide, 2,5-dimethyl-2,5-di-tert-butylperoxyhexane, 2,5-dimethyl-2,5-di-tert-butylperoxyhexyne, α,α-di-tert-butylperoxyisopropylbenzene, and tert-butylperoxy-2-ethylhexyl carbonate.

The crosslinked polymer (1) may contain a known additive, as necessary. Examples of the additive include flame retardants, antioxidants, weatherproofing agents, lubricants, anti-blocking agents, antistatics, anti-fogging agents, anti-drip agents, pigments, and fillers. These additives can be added through kneading with the polymer before crosslinking.

The gel fraction of the crosslinked polymer (1) is preferably 20 wt % or more, more preferably 40 wt % or more, even more preferably 60 wt % or more, and the most preferably 70 wt % or more. The gel fraction is indicative of the degree of crosslinking of a crosslinked polymer, and a situation that the gel fraction of a polymer is high indicates that the polymer has a higher degree of crosslinked structure and a more robust network structure is formed. If the gel fraction of a polymer is high, the polymer has high shape retention, and is unlikely to deform.

The gel fraction is determined in the following manner. Approximately 500 mg of a polymer and an empty mesh basket fabricated from a metal mesh (mesh size: 400 mesh) are weighed. The mesh basket encapsulating the polymer and 50 mL of xylene (Grade of Guaranteed reagent produced by KANTO CHEMICAL CO., INC., or an equivalent product; mixture of o-, m-, and p-xylenes and ethylbenzene, total weight of o-, m-, and p-xylenes: 85 wt % or more) are introduced into a 100 mL test tube, and subjected to heating extraction at 110° C. for 6 hours. After the extraction, the mesh basket with an extraction residue is removed from the test tube, and dried under reduced pressure by using a vacuum dryer at 80° C. for 8 hours, and the mesh basket with an extraction residue after drying is weighed. The gel weight is calculated from the difference in weight between the mesh basket with an extraction residue after drying and the mesh basket when being empty. The gel fraction (wt %) is calculated on the basis of the following formula.

$$\text{Gel fraction} = (\text{Gel weight}/\text{Weight of measurement sample}) \times 100$$

<Resin Composition>

The resin composition according to the present invention is a resin composition comprising:

the polymer (1); and a polymer (2) which is a polymer whose melting peak temperature or glass transition temperature observed in differential scanning calorimetry is 50° C. or higher and 180° C. or lower, provided that the polymer (2) is different from an excluded polymer defined below, wherein the content of the polymer (1) is 30 wt % or more and 99 wt % or less and a content of the polymer (2) is 1 wt % or more and 70 wt % or less, with respect to 100 wt % of the total amount of the polymer (1) and the polymer (2) (hereinafter, occasionally referred to as "resin composition (1)"). The polymer (1) may consist of two or more kinds of polymers, and the polymer (2) may consist of two or more kinds of polymers.

The excluded polymer is a polymer comprising two or more kinds of constitutional units containing an alkyl group having 14 or more and 30 or less carbon atoms, wherein the proportions of the number of the two or more kinds of constitutional units containing an alkyl group having 14 or more and 30 or less carbon atoms in the excluded polymer are each 20% or more, with respect to 100% of the total number of all constitutional units containing an alkyl group having 14 or more and 30 or less carbon atoms, and an enthalpy of fusion (ΔH) of the excluded polymer observed in a temperature range of 10° C. or higher and lower than 60° C. in differential scanning calorimetry is 30 J/g or more.

The melting peak temperature or glass transition temperature of the polymer (2) observed in differential scanning calorimetry (DSC) is in the range of 50° C. or higher and 180° C. or lower. The melting peak temperature of the polymer (2) is a temperature at a melting peak top determined through analysis of a melting curve acquired in differential scanning calorimetry described later by using a method in accordance with JIS K7121-1987, and a temperature at which heat of fusion absorbed is maximized.

The glass transition temperature of the polymer (2) is an intermediate glass transition temperature determined through analysis of a melting curve acquired in differential scanning calorimetry described later by using a method in accordance with JIS K7121-1987.

[Differential Scanning Calorimetry]

In a differential scanning calorimeter under nitrogen atmosphere, an aluminum pan encapsulating approximately 5 mg of a sample therein is (1) retained at 200° C. for 5 minutes, and then (2) cooled from 200° C. to −50° C. at a rate of 5° C./min, and then (3) retained at −50° C. for 5 minutes, and then (4) warmed from −50° C. to 200° C. at a rate of 5° C./min. A differential scanning calorimetry curve acquired in the calorimetry of the process (4) is defined as a melting curve.

Examples of the polymer (2) having a melting peak temperature in the range of 50° C. or higher and 180° C. or lower include high-density polyethylene (HDPE), high-pressure low-density polyethylene (LDPE), ethylene-α-olefin copolymer, ethylene-vinyl acetate copolymer (EVA), and polypropylene (PP).

Examples of the polymer (2) having a glass transition temperature in the range of 50° C. or higher and 180° C. or lower include cyclic olefin polymer (COP), cyclic olefin copolymer (COC), polystyrene (PS), polyvinyl chloride (PVC), acrylonitrile-styrene copolymer (AS), acrylonitrile-butadiene-styrene copolymer (ABS), polymethyl methacrylate (PMMA), polyvinyl alcohol (PVA), polyethylene terephthalate (PET), polyacrylonitrile (PAN), polyamide 6 (PA6), polyamide 66 (PA66), polycarbonate (PC), polyphenylene sulfide (PPS), and polyether ether ketone (PEEK).

The ethylene-α-olefin copolymer as the polymer (2) is a copolymer including a constitutional unit derived from ethylene and a constitutional unit derived from α-olefin. Examples of the α-olefin include propylene, 1-butene, 1-pentene, 1-hexene, 1-heptene, 1-octene, 4-methyl-1-pentene, and 4-methyl-1-hexene, and the α-olefin may be one of these, or two or more thereof. The α-olefin is preferably an α-olefin having four to eight carbon atoms, and more preferably 1-butene, 1-hexene, or 1-octene.

The density of the high-density polyethylene, high-pressure low-density polyethylene, or ethylene-α-olefin copolymer is 860 kg/m³ or higher and 960 kg/m³ or lower.

Examples of the polypropylene as the polymer (2) include propylene homopolymer, propylene random copolymer described later, and propylene polymer material described later. The content of the constitutional unit derived from propylene in the polypropylene is more than 50 wt % and 100 wt % or less (assuming the total amount of the constitutional units constituting the polypropylene as 100 wt %). It is preferable that the melting peak temperature of the polypropylene be 100° C. or higher.

The propylene random copolymer is a random copolymer including a constitutional unit derived from propylene and at least one constitutional unit selected from the group consisting of a constitutional unit derived from ethylene and a constitutional unit derived from α-olefin. Examples of the propylene random copolymer include propylene-ethylene random copolymer, propylene-ethylene-α-olefin random copolymer, and propylene-α-olefin random copolymer. It is preferable that the α-olefin be an α-olefin having 4 to 10 carbon atoms, and examples of such α-olefin include linear α-olefin such as 1-butene, 1-pentene, 1-hexene, 1-octene, and 1-decene, and branched α-olefin such as 3-methyl-1-butene and 3-methyl-1-pentene. The α-olefin included in the propylene random copolymer may be one α-olefin or two or more kinds of α-olefins.

Examples of methods for producing the propylene homopolymer and propylene random copolymer include polymerization methods including a slurry polymerization method, solution polymerization method, bulk polymerization method, and gas phase polymerization method with a Ziegler-Natta catalyst or a complex catalyst such as a metallocene catalyst and a non-metallocene catalyst.

The propylene polymer material is a polymer material consisting of a propylene homopolymer component (I) and an ethylene copolymer component (II), wherein the ethylene copolymer component (II) includes: at least one constitutional unit selected from the group consisting of a constitutional unit derived from propylene and a constitutional unit derived from α-olefin having four or more carbon atoms; and a constitutional unit derived from ethylene.

Examples of the α-olefin having four or more carbon atoms in the ethylene copolymer component (II) include 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosene, 3-methyl-1-butene, 3-methyl-1-pentene, 4-methyl-1-pentene, 2-ethyl-1l-hexene, and 2,2,4-trimethyl-1-pentene. It is preferable that the α-olefin having four or more carbon atoms be an α-olefin having 4 or more and 20 or less carbon atoms, it is more preferable that the α-olefin having four or more carbon atoms be an α-olefin having 4 or more and 10 or less carbon atoms, and it is even more preferable that the α-olefin having four or more carbon atoms be 1-butene, 1-hexene, or 1-octene. The α-olefin having four or more carbon atoms included in the ethylene copolymer component (II) may be one α-olefin or two or more kinds of α-olefins.

Examples of the ethylene copolymer component (II) include propylene-ethylene copolymer, ethylene-1-butene copolymer, ethylene-1-hexene copolymer, ethylene-1-octene copolymer, propylene-ethylene-1-butene copolymer, propylene-ethylene-1-hexene copolymer, and propylene-ethylene-1-octene copolymer. The ethylene copolymer component (II) may be a random copolymer or a block copolymer.

The propylene polymer material can be produced through multistage polymerization with a polymerization catalyst. For example, the propylene polymer material can be produce in a manner such that the propylene homopolymer component (I) is produced in the former polymerization step, and the ethylene copolymer component (II) is produced in the latter polymerization step.

Examples of the polymerization catalyst for production of the propylene polymer material include the catalysts for production of the propylene homopolymer and the propylene random copolymer.

Examples of polymerization methods in the polymerization steps of production of the propylene polymer material include a bulk polymerization method, solution polymerization method, slurry polymerization method, and gas phase polymerization method. Examples of inert hydrocarbon solvent for a solution polymerization method and slurry polymerization method include propane, butane, isobutane, pentane, hexane, heptane, and octane. Two or more of these polymerization methods may be combined, and these polymerization methods may be in a batch mode or a continuous mode. It is preferable that the polymerization method in production of the propylene polymer material be continuous gas phase polymerization or bulk-gas phase polymerization in which bulk polymerization and gas phase polymerization are sequentially performed.

The polypropylene as the polymer (2) is preferably propylene homopolymer.

In subjecting the resin composition according to the present invention to extrusion, injection molding, vacuum molding, blow molding, or rolling, it is preferable for formability that the melt flow rate (MFR) of the resin composition as measured in accordance with JIS K7210 at a temperature of 230° C. with a load of 2.16 kgf be 0.1 g/10 min or higher and 30 g/10 min or lower.

In forming a fiber from the resin composition according to the present invention through spinning as described later, it is preferable that the melt flow rate (MFR) of the resin composition as measured in accordance with JIS K7210 at a temperature of 230° C. with a load of 2.16 kgf be 1 g/10 min or higher and 100 g/10 min or lower.

The polymer according to the present invention and resin composition according to the present invention comprising the polymer may each contain an additive such as an inorganic filler, an organic filler, an antioxidant, a weatherproofing agent, an UV absorber, a thermal stabilizer, a light stabilizer, an antistatic, a crystal-nucleating agent, a pigment, an adsorbent, a metal chloride, hydrotalcite, an aluminate, a lubricant, and a silicone compound.

In the case that the polymer or resin composition contains an additive, the additive may be blended in advance in one or more raw materials to be used in production of the polymer, or blended after the polymer is produced. In the case that the polymer is produced and an additive is then blended in the polymer, the additive can be blended while the polymer is melt-kneaded.

It is preferable that the blend ratio of the additive be 0.001 parts by weight or more and 10 parts by weight or less with respect to 100 parts by weight of the resin composition according to the present invention to constitute the heat storage layer (1), it is more preferable that the blend ratio of the additive be 0.005 parts by weight or more and 5 parts by weight or less, and it is even more preferable that the blend ratio of the additive be 0.01 parts by weight or more and 1 part by weight or less.

Examples of inorganic fillers include talc, calcium carbonate, and calcined kaolin.

Examples of organic fillers include fibers, wood flours, and cellulose powders.

Examples of antioxidants include phenol-based antioxidants, sulfur-containing antioxidants, phosphorus-containing antioxidants, lactone antioxidants, and vitamin antioxidants.

Examples of UV absorbers include benzotriazole-based UV absorbers, tridiamine-based UV absorbers, anilide UV absorbers, and benzophenone-based UV absorbers.

Examples of light stabilizers include hindered amine light stabilizers and benzoate light stabilizers.

Examples of pigments include titanium dioxide and carbon black.

Examples of adsorbents include metal oxides such as zinc oxide and magnesium oxide.

Examples of metal chlorides include iron chloride and calcium chloride.

Examples of lubricants include fatty acids, higher alcohols, aliphatic amides, and aliphatic esters.

The polymer and resin composition according to the present invention, and a molded article of the polymer or resin composition can be used as a heat storage material.

The heat storage material containing the polymer according to the present invention is excellent in formability and shape retention, and thus the form is arbitrary, and examples thereof include the forms of a sphere, a cuboid (cube), a particle (bead), a cylinder (pellet), a powder, a bar (stick), a needle, a filament (fiber), a strand, a thread, a string, a code, a rope, a plate, a sheet, a membrane (film), a woven fabric, a nonwoven fabric, a box (capsule), and a foam, and any other three-dimensional form, and any form can be selected in accordance with the purpose of use.

The heat storage material in the form of a sphere, a cuboid (cube), a particle (bead), a cylinder (pellet), or a powder may form a core-shell structure in which the polymer according to the present invention is covered with a material different from the polymer according to the present invention, or a core-shell structure in which a material different from the polymer according to the present invention is covered with the polymer according to the present invention. The material different from the polymer according to the present invention is a polymer different from the polymer according to the present invention, a metal, or an inorganic substance except metals.

The heat storage material in the form of a bar (stick), a needle, a filament (fiber), a strand, a thread, a string, a code, or a rope may form a core-sheath structure in which the polymer according to the present invention is covered with a material different from the polymer according to the present invention, or a core-sheath structure in which a material different from the polymer according to the present invention is covered with the polymer according to the present invention.

The heat storage material in the form of a plate, a sheet, a membrane (film), a woven fabric, a nonwoven fabric, a box, or a capsule may form a laminate structure in which both surfaces or one surface are/is covered with a material different from the polymer according to the present invention, or a laminate structure in which both surfaces or one surface of a material different from the polymer according to the present invention are/is covered with the polymer according to the present invention.

The heat storage material in the form of a foam may form a core-shell structure, core-sheath structure, or laminate structure with the heat storage material having a form different from the form of a foam or a material different from the polymer according to the present invention.

The heat storage material can be formed into any three-dimensional form, for example, by extrusion, injection molding, vacuum molding, blow molding, or rolling, and can be subjected to multilayer molding with a material different from the polymer according to the present invention.

<Fiber Containing Polymer>

A fiber containing the polymer according to the present invention can be obtained by spinning a resin composition containing the polymer (1) (hereinafter, occasionally referred to as "resin composition (A)").

The resin composition (A) may contain the polymer (1) as the only polymer component, or contain a polymer different from the polymer (1). In the case that the resin composition (A) contains a polymer different from the polymer (1), examples of the polymer include the polymer (2). In the case that the resin composition (A) contains the polymer (1) and the polymer (2), it is preferable that the content of the polymer (1) be 30 wt % or more and 99 wt % or less and the content of the polymer (2) be 1 wt % or more and 70 wt % or less, with respect to 100 wt % of the total amount of the polymer (1) and the polymer (2).

In the case that the resin composition (A) contains a polymer different from the polymer (1) and the polymer different from the polymer (1) is incompatible with the polymer (1), the phase consisting of the polymer (1) and the phase consisting of the polymer different from the polymer (1) form morphology of sea-island structure, cylinder structure, lamellar structure, co-continuous structure, etc.

The cross-sectional shape of the fiber containing the resin composition (A) may be a circular cross-section, an irregular cross-section such as a polygon or multilobal shape, or a hollow cross-section.

It is preferable for ease in fiber formation that the single yarn fineness of the fiber containing the resin composition (A) be 1 dtex or higher, and it is preferable for the flexibility of the fiber that the single yarn fineness of the fiber containing the resin composition (A) be 20 dtex or lower, though the single yarn fineness is not limited thereto.

Examples of methods for producing the fiber containing the resin composition (A) include dry spinning, wet spinning, and melt spinning, and melt spinning is preferred. Common spinning uses chips containing a resin composition as a raw material, and consists of two steps, namely, a step of spinning and a step of drawing. Examples of spinning methods suitable for the production method for the fiber containing the resin composition (A) include: continuous polymerization/spinning, in which a resin composition is spun continuously after a step of producing a resin composition without forming chips from the resin composition; direct spinning/drawing (spin-drawing), in which a step of spinning and a step of drawing are performed in one step; high-speed spinning, in which a step of drawing is not needed; a POY-DTY method, in which partially-oriented yarn (POY) is obtained and draw textured yarn (DTY) is then obtained in a step of false-twisting; and spun-bonding. These methods are more rationalized methods than the common spinning.

The fiber containing the resin composition (A) can be a composite fiber. Composite fibers are fibers in which two or more fibers consisting of different components are bonded together in single yarn. Examples of the composite fiber include a core-sheath composite fiber, a laminated composite fiber, a splittable composite fiber, and a sea-island composite fiber.

It is preferable for ease in fiber formation that the single yarn fineness of the composite fiber containing the resin composition (A) be 1 dtex or higher, and it is preferable for the flexibility of the fiber that the single yarn fineness of the composite fiber containing the resin composition (A) be 20 dtex or lower, though the single yarn fineness is not limited thereto.

Examples of the structure of the core-sheath composite fiber include core-sheath structure in which the resin composition (A) is covered with a material different from the resin composition (A), and core-sheath structure in which a material different from the resin composition (A) is covered with the resin composition (A), and the structure of the core-sheath composite fiber is preferably core-sheath structure in which the resin composition (A) is covered with a material different from the resin composition (A). The material different from the resin composition (A) is preferably the polymer (2), more preferably polypropylene (PP), polyethylene terephthalate (PET), polytrimethylene terephthalate (PTT), polybutylene terephthalate (PBT), polyamide 6 (PA6), or polyamide 66 (PA66).

It is preferable that the composite fiber with core-sheath structure in which the resin composition (A) is covered with a material different from the resin composition (A) be a composite fiber with a core area fraction of 10% to 90% in a cross-section in the fiber radial direction. It is preferable for temperature control function that the core area fraction be 10% or higher, and it is preferable for fiber strength that the core area fraction be 90% or lower. In the case that the core contains polypropylene, it is preferable for dyeability of the entire of the fiber that the core area fraction be 20% to 50%.

The laminated composite fiber is generally crimped, for example, because of different shrinkage factors, and in the case that the composite fiber is crimped into a spiral, the resin composition (A) may be present in the inner side of the spiral, and the material different from the resin composition (A) may be present in the inner side of the spiral, and preferably the laminated composite fiber is such that the resin composition (A) is present in the inner side of the spiral. The material different from the resin composition (A) is preferably the polymer (2), and more preferably polypropylene (PP), polyethylene terephthalate (PET), polytrimethylene terephthalate (PTT), polybutylene terephthalate (PBT), polyamide 6 (PA6), or polyamide 66 (PA66).

The splittable composite fiber is split/opened through chemical treatment to provide an ultrafine fiber. In the case that the splittable composite fiber consists of a radial fiber at the center and a plurality of wedge-shaped fibers therearound, the resin composition (A) may constitute the radial fiber at the center, and the material different from the resin composition (A) may constitute the radial fiber at the center, and preferably the splittable composite fiber is such that the resin composition (A) constitutes the radial fiber at the center. The material different from the resin composition (A) is preferably the polymer (2), and more preferably polypropylene (PP), polyethylene terephthalate (PET), polytrimethylene terephthalate (PTT), polybutylene terephthalate (PBT), polyamide 6 (PA6), or polyamide 66 (PA66).

The sea-island composite fiber is removed of the fiber of the sea part through chemical treatment to provide an ultrafine fiber consisting of a plurality of fibers of the island part. The resin composition (A) may constitute the fiber of the sea part, and the material different from the resin composition (A) may constitute the fiber of the sea part, and preferably the sea-island composite fiber is such that the resin composition (A) constitutes the fiber of the sea part. The material different from the resin composition (A) is preferably the polymer (2), and more preferably polypropylene (PP), polyethylene terephthalate (PET), polytrimethylene terephthalate (PTT), polybutylene terephthalate (PBT), polyamide 6 (PA6), or polyamide 66 (PA66).

Examples of the form of the fiber containing the resin composition (A) include a filament (multifilament, monofilament) and a short fiber (staple). A filament (multifilament, monofilament) may be directly used, or formed into false-twisted yarn through false-twisting, or formed into combined filament yarn through air-mingling. A short fiber (staple) may be directly used, or formed into spun yarn through spinning, or formed into blended yarn through mixed spinning. A filament and a short fiber may be combined into core-spun yarn, or formed into twisted yarn, twisted union yarn, or covered yarn through twisting.

The fiber containing the resin composition (A) may contain an additive such as an antioxidant, a pigment, a dye, an antibacterial agent, a deodorant, an antistatic agent, a flame retardant, an inert fine particle, a light-absorbing heat-generating material, a hygroscopic heat-generating material, and a far-infrared-emitting heat-generating material. The additive can be added during spinning or after spinning.

A light-absorbing heat-generating fiber containing the resin composition (A) and a light-absorbing heat-generating material is a fiber in which a light-absorbing heat-generating material such as zirconium carbide, which has high efficiency to absorb sunlight at specific wavelengths to convert it into thermal energy, is fixed in the inside or surface of the fiber. When the surface of a cloth consisting of the light-absorbing heat-generating fiber is irradiated with sunlight, the surface temperature of the cloth can be higher than that in the case of a cloth consisting of a fiber containing no light-absorbing heat-generating material.

A hygroscopic heat-generating fiber containing the resin composition (A) and a hygroscopic heat-generating material is a fiber which generates heat of adsorption on absorbing moisture and releases the moisture in a low-humidity environment, exerting an effect to control the temperature and humidity in the clothes.

A far-infrared-emitting fiber containing the resin composition (A) and a far-infrared-emitting material is a fiber in which ceramic or the like having high far-infrared emissivity is fixed in the inside or surface of the fiber, exerting an effect to keep warm by virtue of far-infrared radiation.

The fabric or cloth consisting of the fiber containing the resin composition (A) may be any of woven fabrics, knitted fabrics, and nonwoven fabrics. Examples of the fabric construction include a plane weave, a twill weave, a sateen weave, and their variations, a dobby weave, and a Jacquard weave. Examples of the knitting construction include a weft knitted fabric, a warp knitted fabric, and their variations.

The weight, gauge, and so forth of the fabric or cloth consisting of the fiber containing the resin composition (A) are not limited.

The fabric or cloth consisting of the fiber containing the resin composition (A) may consist only of the fiber containing the resin composition (A), or be mix-woven or mix-knitted with an additional fiber for use. Examples of the additional fiber include: inorganic fibers such as carbon fibers, inorganic fibers, and metal fibers; purified fibers such as Lyocell; regenerated fibers such as rayon, cupra, and polynosic; semi-synthetic fibers such as acetates, triacetates, and promix; synthetic fibers such as acrylic, acrylic fibers, vinylon, vinylidene, polyvinyl chloride, polyethylene, polychlal, aramid, polybutylene terephthalate (PBT), polytrimethylene terephthalate (PTT), polyamide 66 (PA66), and urethane; natural fibers including plant fibers such as cotton, cellulosic fibers, *Cannabis* (flax, ramie, hemp, jute) and animal fibers such as wool, animal hair (e.g., Angora, cashmere, mohair, alpaca, camel), and silk; and bird feathers such as down and feathers. It is preferable that the ratio of the fiber containing the resin composition (A) to be used be 20 wt % to 100 wt %, though the ratio is not limited thereto.

The nonwoven fabric consisting of the fiber containing the resin composition (A) may contain a heat-sealing binder fiber. It is preferable that the heat-sealing binder fiber be, for example, a core-sheath or laminated composite fiber consisting of the resin composition (A) and a material having a melting point different from that of the resin composition (A). The material having a melting point different from that of the resin composition (A) is preferably the polymer (2), and more preferably polypropylene (PP), polyethylene terephthalate (PET), polytrimethylene terephthalate (PTT), polybutylene terephthalate (PBT), polyamide 6 (PA6), or polyamide 66 (PA66).

In the case that the heat-sealing binder fiber is used, it is preferable that the content be 5 to 20 wt % to the entire of the fiber of the nonwoven fabric.

It is preferable for lightness, a soft texture, and fashionability of clothing that the weight and thickness of the nonwoven fabric consisting of the fiber containing the resin composition (A) be 100 g/m² or less and 5 mm or smaller, respectively, and it is more preferable that the weight be 60 g/m² or less.

A production method for the nonwoven fabric consisting of the fiber containing the resin composition (A) typically includes a step of forming a web and a step of bonding a web. Examples of the step of forming a web include a dry method, a wet method, spun-bonding, melt-blowing, and air-laying, and examples of the step of bonding a web include chemical bonding, thermobonding, needle-punching, and hydroentangling.

The fabric or cloth consisting of the fiber containing the resin composition (A) has temperature control function, which allows the fabric or cloth to have less weight and a smaller thickness, and thus provides a light, soft texture and does not deteriorate fashionability of clothing. In addition, the fabric or cloth consisting of the fiber containing the resin composition (A) contains a polymer-type latent heat storage material, and hence is superior in wash durability to fabrics or cloths consisting of a fiber containing a small molecule-type latent heat storage material encapsulated in a microcapsule.

<Foam Comprising Polymer>

A foam comprising the polymer according to the present invention can be obtained by blowing a resin composition containing the polymer (1) and a blowing agent (hereinafter, occasionally referred to as "resin composition (B)").

Examples of the blowing agent include physical blowing agents and pyrolytic blowing agents. A plurality of blowing agents may be used in combination. The resin composition (B) may contain a polymer different from the polymer (1). In the case that the resin composition (B) contains a polymer different from the polymer (1), examples of the polymer include the polymer (2). In the case that the resin composition (B) contains the polymer (1) and the polymer (2), it is preferable that the content of the polymer (1) be 30 wt % or more and 99 wt % or less with respect to 100 wt % of the total amount of the polymer (1) and the polymer (2), and it is more preferable that the content of the polymer (2) be 1 wt % or more and 70 wt % less.

Examples of physical blowing agents include air, oxygen, nitrogen, carbon dioxide, ethane, propane, n-butane, isobutane, n-pentane, isopentane, n-hexane, isohexane, cyclohexane, heptane, ethylene, propylene, water, petroleum ether, methyl chloride, ethyl chloride, monochlorotrifluoromethane, dichlorodifluoromethane, and dichlorotetrafluoroethane, and preferred among them are carbon dioxide, nitrogen, n-butane, isobutane, n-pentane, and isopentane for economic efficiency and safety.

Examples of pyrolytic blowing agents include inorganic blowing agents such as sodium carbonate and organic blowing agents such as azodicarbonamide, N,N-dinitropentamethylenetetramine, p,p'-oxybisbenzenesulfonylhydrazide, and hydrazodicarbonamide, and preferred among them are azodicarbonamide, sodium hydrogen carbonate, and p,p'-oxybisbenzenesulfonylhydrazide for economic efficiency and safety, and a blowing agent containing azodicarbonamide or sodium hydrogen carbonate is more preferred because the blowing agent allows formation in a broad range of temperature and provides a foam with fine voids.

When a pyrolytic blowing agent is used, a pyrolytic blowing agent having a decomposition temperature of 120 to 240° C. is typically used. If a pyrolytic blowing agent having a decomposition temperature of higher than 200° C., it is preferable to use a blowing aid in combination to lower the decomposition temperature to 200° C. or lower. Examples of the blowing aid include metal oxides such as zinc oxide and lead oxide; metal carbonates such as zinc carbonate; metal chlorides such as zinc chloride; urea; metal soaps such as zinc stearate, lead stearate, dibasic lead stearate, zinc laurate, zinc 2-ethylhexonate, and dibasic lead phthalate; organotin compounds such as dibutyltin laurate and dibutyltin dimalate; and inorganic salts such as tribasic lead sulfate, dibasic lead phosphite, and basic lead sulfite.

A master batch composed of a pyrolytic blowing agent, a blowing aid, and a resin can be used as a pyrolytic blowing agent. It is preferable that the resin for the master batch be a resin composition containing the polymer (1), the polymer (2), or at least one of the polymer (1) and the polymer (2), though the type of the resin is not limited thereto. The total amount of the pyrolytic blowing agent and the blowing aid contained in the master batch is typically 5 to 90 wt % with respect to 100 wt % of the resin contained in the master batch.

It is preferable for obtaining a foam with finer voids that the resin composition (B) further contain a foam-nucleating agent. Examples of the foam-nucleating agent include talc, silica, mica, zeolite, calcium carbonate, calcium silicate, magnesium carbonate, aluminum hydroxide, barium sulfate, aluminosilicate, clay, quartz powder, and diatomaceous earth; organic polymer beads consisting of polymethyl methacrylate or polystyrene with a particle diameter of 100 µm or smaller; metal salts such as calcium stearate, magnesium stearate, zinc stearate, sodium benzoate, calcium benzoate, and aluminum benzoate; and metal oxides such as magnesium oxide and zinc oxide, and two or more of them may be combined together.

The amount of the blowing agent in the resin composition (B) is appropriately set in accordance with the type of the blowing agent for use and the expansion ratio of a foam to be produced, and typically 1 to 100 parts by weight with respect to 100 parts by weight of the weight of resin components contained in the resin composition (B).

The resin composition (B) may contain an additive, as necessary, such as a thermal stabilizer, a weatherproofing agent, a pigment, a filler, a lubricant, an antistatic, and a flame retardant.

It is preferable that the resin composition (B) be a resin composition obtained by melt-kneading the polymer (1), a blowing agent, and an additional component to be blended as necessary. Examples of methods for melt-kneading include a method of mixing the polymer (1), the blowing agent, and so forth together by using a mixing apparatus such as a tumbler blender and a Henschel mixer followed by additional melt-kneading by using a single-screw extruder, a multi-screw extruder, or the like, and a method of melt-kneading by using a kneading apparatus such as a kneader and a Banbury mixer.

A known method is used for production of a foam containing the polymer, and extrusion foam molding, injection foam molding, pressure foam molding, etc., are suitably used.

In the case that the foam of the present invention contains the crosslinked polymer (1), examples of methods for producing the foam include: a method including a step of producing a resin composition (α) containing the crosslinked polymer (1) and a blowing agent by irradiating a resin composition containing the polymer (α) and a blowing agent with ionizing radiation or by melt-kneading the crosslinked polymer (1) and a blowing agent, and a step of producing a foam by heating the resin composition (α) (hereinafter, referred to as "method (A)"); and a method including a step of producing a resin composition (β) containing the crosslinked polymer (1) by pressurizing, with heating, a resin composition containing the polymer (α), a blowing agent, and an organic peroxide or a resin composition containing the crosslinked polymer (1) and a blowing agent in a sealed mold, and a step of producing a foam from the resin composition (B) by opening the mold (hereinafter, referred to as "method (B)").

<Method for Producing Foam: Production Method as Method (A)>

The method (A) will be specifically described in the following.

The method (A) includes a step of producing a resin composition (α) containing the crosslinked polymer (1) and a blowing agent (hereinafter, referred to as "resin composition (α) production step"), and a step of producing a foam by heating the resin composition (α) (hereinafter, referred to as "foam production step"). Now, the steps will be described.

[Resin Composition (α) Production Step]

In the case that a resin composition (α) containing the crosslinked polymer (1) and a blowing agent is produced by irradiating a resin composition containing the polymer (1) and a blowing agent with ionizing radiation in the resin composition (α) production step, examples of the ionizing radiation for irradiation of the resin composition containing the polymer (α) and a blowing agent include ionizing radiation used for production of the crosslinked polymer (1). Examples of the irradiation method and dose for the ionizing radiation include the method and dose described as the irradiation method and dose in production of the crosslinked polymer (1).

The resin composition containing the polymer (α) and a blowing agent is irradiated with ionizing radiation typically after being formed into a desired shape at a temperature lower than the decomposition temperature of the blowing agent. Examples of sheet-forming methods include a sheet-forming method with a calendar roll, a sheet-forming method with a press forming machine, and a sheet-forming method by melt-extruding from a T-die or an annular die.

Melt-kneading of the crosslinked polymer (1) and a blowing agent is typically performed at a temperature lower than the decomposition temperature of the blowing agent.

[Foam Production Step]

A known production method for a resin foam can be applied as a production method for a foam by heating in the foam production step to produce a foam by heating the resin composition (α), and methods allowing continuous heat blowing of the resin composition (α) are preferred such as vertical hot air blowing, horizontal hot air blowing, and horizontal chemical blowing. The heating temperature is a temperature equal to or higher than the decomposition temperature of the blowing agent, and, in the case that the blowing agent is a pyrolytic blowing agent, the heating temperature is preferably a temperature higher than the decomposition temperature of the pyrolytic blowing agent by 5 to 50° C., more preferably a temperature higher than the decomposition temperature of the pyrolytic blowing agent by 10 to 40° C., and even more preferably a temperature higher than the decomposition temperature of the pyrolytic blowing agent by 15 to 30° C. The heating time can be appropriately selected in accordance with the type and amount of the blowing agent, and typically 3 to 5 minutes in heating in an oven.

<Method for Producing Foam: Production Method as Method (B)>

The method (B) will be specifically described in the following.

The method (B) includes a step of producing a resin composition (β) containing the crosslinked polymer (1) by pressurizing, with heating, a resin composition containing the polymer (α), a blowing agent, and an organic peroxide or a resin composition containing the crosslinked polymer (1) and a foam in a sealed mold (hereinafter, referred to as "resin composition (β) production step"), and a step of producing a foam from the resin composition (β) by opening the mold (hereinafter, referred to as "foam production step"). Now, the steps will be described.

[Resin Composition (β) Production Step]

In the case that a resin composition (β) containing the crosslinked polymer (1) is produced by pressuring, with heating, a resin composition containing the polymer (1), a blowing agent, and an organic peroxide in a sealed mold in the resin composition (β) production step, examples of the organic peroxide include the organic peroxides applicable to production of the crosslinked polymer of the present invention.

It is preferable that the resin composition to be pressurized with heating in a mold be a resin composition obtained by melt-kneading in advance a resin composition containing the polymer (α), a blowing agent, and an organic peroxide or a resin composition containing the crosslinked polymer (1) and a foam at a temperature lower than the decomposition temperature of the blowing agent and lower than the 1-minute half-life temperature of the organic peroxide.

It is preferable that the temperature in heating the resin composition containing the polymer (α), a blowing agent, and an organic peroxide be a temperature equal to or higher than the 1-minute half-life temperature of the organic peroxide and equal to or higher than the decomposition temperature of the blowing agent.

[Foam Production Step]

In the foam production step to produce a foam from the resin composition (β) with a mold opened, it is preferable that the mold be opened after cooling the mold to 40° C. or higher and 100° C. or lower. To increase the melt viscosity of the resin composition (β) and promote swelling in blowing, the temperature of the mold when being opened is preferably 40° C. or higher, and more preferably 50° C. or higher. To prevent outgassing in blowing, the temperature of the mold when being opened is preferably 90° C. or lower, and more preferably 80° C. or lower.

However, the temperature of the mold suitable for opening varies depending on the viscosity and melting point of the resin composition (β) and the size of a foam to be produced, and thus can be appropriately adjusted.

It is preferable for increasing the expansion ratio or strength of a foam containing the crosslinked polymer (1) of the present invention that the resin composition containing the polymer (α) and a blowing agent further contain a crosslinking aid. Examples of the crosslinking aid include the crosslinking aids used for production of the crosslinked polymer (1) of the present invention. It is preferable that the amount of the crosslinking aid contained in the resin composition containing the polymer (α), a blowing agent, and a crosslinking aid be 0.01 to 4.0 parts by weight with respect to 100 parts by weight of the weight of resin components contained in the resin composition, and it is more preferable that the amount of the crosslinking aid be 0.05 to 2.0 parts by weight.

The heat storage material including the polymer according to the present invention is excellent in heat storage performance, formability, shape retention, and moisture permeability, and hence can be suitably used as a product directly or indirectly requiring performance to keep warm/cold, or a member thereof.

Examples of products directly or indirectly requiring performance to keep warm/cold, or members thereof include building materials, furniture, interior goods, bedding, bathroom materials, vehicles, air conditioners, appliances, heat-insulating containers, clothes, daily necessities, agricultural materials, fermentation systems, thermoelectric conversion systems, and heat carrier media.

Examples of building materials include floor materials, wall materials, wallpapers, ceiling materials, roof materials, floor heating systems, tatamis (rush mats), doors, fusumas (paper sliding doors), amados (rain shutter doors), shojis (paper screen doors), windows, and window frames.

In use for a floor material, a wall material, a ceiling material, or a roof material, for example, a laminate including the heat storage material in the form of a plate, a sheet, or a foam, a thermal insulation material consisting of a material different from the polymer according to the present invention, and an emission-insulating material consisting of a material different from the polymer according to the present invention can be suitably used to more reliably keep indoor space temperature constant against the variation of exterior environment temperature.

Examples of the thermal insulation material include polystyrene foam, polyurethane foam, acrylic resin foam, phenolic resin foam, polyethylene resin foam, foamed rubber, glass wool, rock wool, foamed ceramics, vacuum thermal insulation materials, and composites thereof.

Examples of the emission-insulating material include an aluminum sheet, an aluminum foil, an aluminum powder-containing coating material, a ceramic powder coating material, and a composite of them.

In use for a wall material, a ceiling material, or a roof material, for example, a laminate including the heat storage material in the form of a plate, a sheet, or a foam and a fireproof material consisting of a material different from the polymer according to the present invention and being flame-retardant, quasi-incombustible, or incombustible can be suitably used to impart fireproof properties.

Examples of the fireproof material include concrete, gypsum, wood cement, calcium silicate, glass, metal, a foaming fireproof material, a flame-retardant material-containing material, and a composite of them.

In use for a member of a floor heating system, for example, a laminate including the heat storage material in the form of a plate, a sheet, or a foam, a thermal insulation material consisting of a material different from the polymer according to the present invention, and a sensible heat storage material consisting of a material different from the polymer according to the present invention can be suitably used to efficiently utilize heat generated from a heat-generating object such as a heating cable, a sheet heater, and a hot water pipe to retain room temperature.

Examples of the sensible heat storage material include concrete, mortar, a concrete slab, and a composite of them.

In use for a member of a tatami, for example, a laminate including the heat storage material in the form of a plate, a sheet, or a foam, a thermal insulation material consisting of a material different from the polymer according to the present invention, a tatami board consisting of a material different from the polymer according to the present invention, and a tatami omote (tatami surface material) consisting of a material different from the polymer according to the present invention can be suitably used to more reliably keep indoor space temperature constant against the variation of exterior environment temperature. In use for a tatami board material, a heat storage tatami board consisting of a mixture of the heat storage material and a wood fiber can be suitably used, and, in use for a tatami omote material, a heat storage tatami omote consisting of a heat storage fiber formed of a core-sheath structure of the heat storage material in the form of a filament (fiber) or a strand and a tatami omote material consisting of a material different from the polymer according to the present invention can be suitably used.

In use for a member of a door, a member of a fusuma, or a member of an amado, for example, a laminate including the heat storage material in the form of a plate, a sheet, or a foam, a thermal insulation material consisting of a material different from the polymer according to the present invention, and a surface material consisting of a material different from the polymer according to the present invention can be suitably used to more reliably keep the temperature of a room partitioned by a door, a fusuma, or an amado constant.

In use for a member of a shoji, for example, a laminate including the heat storage material in the form of a foam or a nonwoven fabric, or a shoji paper sheet consisting of the heat storage material in the form of a foam or a nonwoven fabric and a material different from the polymer according to the present invention can be suitably used to more reliably keep the temperature of a room partitioned by a shoji constant, and impart a certain degree of light transmittance.

In use for a member of a window, for example, a laminate consisting of the heat storage material in the form of a foam or a nonwoven fabric and glass, polycarbonate, or polymethyl methacrylate can be suitably used to more reliably keep indoor space temperature constant against the variation of exterior environment temperature, and impart a certain degree of light transmittance.

In use for a member of a window frame, for example, a laminate consisting of the heat storage material in the form of a plate, a sheet, or a foam and a metal window frame or a window frame made of a polymer different from the polymer according to the present invention can be suitably used to more reliably keep indoor space temperature constant against the variation of exterior environment temperature and prevent dew condensation by lowering difference between room temperature and the temperature of a window frame.

Examples of furniture, interior goods, and bedding include partition boards, blinds, curtains, carpets, futons (bed quilts), and mattresses.

In use for a member of a partition board, for example, a laminate including the heat storage material in the form of a plate, a sheet, or a foam, a thermal insulation material consisting of a material different from the polymer according to the present invention, and a surface material consisting of a material different from the polymer according to the present invention can be suitably used to more reliably keep the temperature of a room partitioned by a partition board constant.

In use for a member of a blind, for example, a laminate including the heat storage material in the form of a plate or a sheet and an emission-insulating material consisting of a material different from the polymer according to the present invention can be suitably used to more reliably keep indoor space temperature constant against the variation of exterior environment temperature and impart shading performance. In the case that the configuration of a slat of a blind consists of an emission-insulating surface and a heat storage surface as described above, the amount of solar heat flowing into a building can be controlled in accordance with the season and time of day in a manner such that the emission-insulating surface is positioned in the outer side for use in summer, and the heat storage surface is positioned in the outer side in the daytime and reversed to be positioned in the inner side in the nighttime for use in winter, and thus the power consumption of an air conditioner can be reduced.

In use for a curtain, a carpet, or a futon, for example, a heat storage woven fabric or heat storage nonwoven fabric consisting of a heat storage fiber formed of a core-sheath structure of the heat storage material in the form of a filament (fiber) or a strand and a fiber material consisting of a material different from the polymer according to the present invention can be suitably used to impart an arbitrary handle and texture.

In use for a carpet, for example, a laminate including the heat storage material in the form of a plate, a sheet, or a foam and a woven fabric or nonwoven fabric consisting of a fiber consisting of a material different from the polymer according to the present invention can be suitably used to impart an arbitrary handle and texture.

In using the laminate as a mattress, for example, the heat storage material in the form of a foam can be suitably used to impart softness.

Examples of bathroom materials include bathtub materials, bathtub lid materials, bathroom floor materials, bathroom wall materials, and bathroom ceiling materials.

In use for a bathtub material or a bathtub lid material, for example, a laminate including the heat storage material in the form of a plate, a sheet, or a foam, a thermal insulation material consisting of a material different from the polymer according to the present invention, and a surface material consisting of a material different from the polymer according to the present invention can be suitably used to more reliably keep water temperature in a bathtub constant against the variation of temperature in a bathroom.

In use for a bathroom floor material, a bathroom wall material, or a bathroom ceiling material, for example, a laminate including the heat storage material in the form of a plate, a sheet, or a foam, a thermal insulation material consisting of a material different from the polymer according to the present invention, and an emission-insulating material consisting of a material different from the polymer according to the present invention can be suitably used to more reliably keep bathroom temperature constant against the variation of exterior environment temperature.

Examples of members for vehicles include engine warming-up systems, gasoline evaporation loss-preventing devices (canisters), car air conditioners, interior materials, container materials for refrigerator vehicles, and container materials for heat-insulating vehicles.

Examples of members for air conditioners include heat storage materials for air-conditioning systems of framework heat storage type, materials for heat storage tanks in air-conditioning systems of water heat storage type, materials for heat storage tanks in air-conditioning systems of ice heat storage type, heating medium pipe materials or thermal insulation materials thereof, cooling medium pipe materials or thermal insulation materials thereof, and duct materials for heat-exchanging ventilation systems.

Examples of appliances include:

electronic devices such as televisions, Blu-ray recorders and/or players, DVD recorders and/or players, monitors, displays, projectors, rear-projection televisions, stereo components, boomboxes, digital cameras, digital video cameras, cellar phones, smartphones, laptop computers, desktop computers, tablet PCs, PDAs, printers, 3D printers, scanners, video game consoles, handheld game consoles, batteries for electronic devices, and transformers for electronic devices;

heating home appliances such as electric heaters, fan heaters, dehumidifiers, humidifiers, hot carpets, kotatsus (tables with a heater and a quilt), electric blankets, electric lap robes, electric foot warmers, heated toilet seats, warm water washing toilet seats, irons, trouser presses, futon dryers, clothes dryers, hair dryers, hair irons, heat massagers, heat therapy machines, dishwashers, dish dryers, and dry garbage disposals;

heating home appliance for food preparation such as IH cookers, electric griddles, microwave ovens, microwave and electric ovens, rice cookers, rice cake makers, bread machines, toasters, electric fermenters, hot water dispensers, electric kettles, and coffee makers;

home appliances for food preparation which generate frictional heat such as mixers and/or food processors, and rice polishers; and power-supplied heat-insulating warmers/coolers such as refrigerators/freezers, thermo-hygrostatic coolers, milk coolers, brown rice coolers, vegetable coolers, rice refrigerators, freezing/refrigerated showcases, prefabricated coolers, prefabricated refrigerated showcases, hot/cold catering vehicles, wine cellars, food vending machines, and heat-insulating cabinets for boxed lunches.

In use for a member of an electronic device, the heat storage material in the form of a plate or a sheet can be suitably used to protect electronic parts constituting an electronic device from heat generated therefrom. Particularly in the case that a large amount of heat is locally generated such as cases with highly integrated electronic parts, for example, a laminate including the heat storage material in the form of a plate or a sheet and a high-thermal conductivity material consisting of a material different from the polymer according to the present invention can be suitably used to allow the heat storage material in the form of a plate or a sheet to efficiently absorb heat generated from a heat-generating object.

Examples of the high-thermal conductivity material include carbon nanotubes, boron nitride nanotubes, graphite, copper, aluminum, boron nitride, aluminum nitride, aluminum oxide, magnesium oxide, and composites of them.

In use for a member of an electronic device to be used in contact with a human body, for example, a laminate consisting of the heat storage material in the form of a plate or a sheet and a housing material can be suitably used to inhibit heat generated from electronic parts constituting an electronic device from being conducted to a human body via a housing constituting the electronic device.

In use for a member of a heating home appliance, for example, the heat storage material in the form of a plate or a sheet can be suitably used to protect other parts constituting a heating home appliance from heat generated from a heating device constituting the heating home appliance. For example, a laminate including the heat storage material in the form of a plate, a sheet, or a foam and a thermal insulation material consisting of a material different from the polymer according to the present invention can be suitably used to improve heat-insulating performance and reduce power consumption.

In use for a member of a heating home appliance for food preparation, for example, the heat storage material in the form of a plate or a sheet can be suitably used to protect other parts constituting a heating home appliance for food preparation from heat generated from a heating device constituting the heating home appliance for food preparation. For example, a laminate including the heat storage material in the form of a plate, a sheet, or a foam and a thermal insulation material consisting of a material different from the polymer according to the present invention can be suitably used to improve heat-insulating performance and reduce power consumption.

In use for a member of a home appliance for food preparation which generates frictional heat, for example, a laminate including the heat storage material in the form of a plate or a sheet and a high-thermal conductivity material consisting of a material different from the polymer according to the present invention can be suitably used to protect foods from frictional heat.

In use for a member of a power-supplied heat-insulating warmer/cooler, for example, a laminate including the heat storage material in the form of a plate, a sheet, or a foam, a thermal insulation material consisting of a material different from the polymer according to the present invention, and an emission-insulating material consisting of a material different from the polymer according to the present invention can be suitably used to more reliably keep inner temperature constant against the variation of exterior environment temperature.

Examples of heat-insulating warmer/cooler containers include heat-insulating warmer/cooler containers for transport and/or storage of specimens or organs, heat-insulating warmer/cooler containers for transport and/or storage of pharmaceuticals or chemicals, and heat-insulating warmer/cooler containers for transport and/or storage of foods.

In use for a member of a heat-insulating warmer/cooler container, for example, a laminate including the heat storage material in the form of a plate, a sheet, or a foam, a thermal insulation material consisting of a material different from the polymer according to the present invention, and an emission-insulating material consisting of a material different from the polymer according to the present invention can be suitably used to more reliably keep inner temperature constant against the variation of exterior environment temperature.

Examples of clothes include nightclothes, warm clothes, gloves, socks, sports wear, wet suits, dry suits, heat-resistant protective suits, and fire-resistant protective suits. In use for clothing, for example, a heat storage woven fabric or heat storage nonwoven fabric consisting of a heat storage fiber formed of a core-sheath structure of the heat storage material in the form of a filament (fiber) or a strand and a fiber material consisting of a material different from the polymer according to the present invention can be suitably used to keep body temperature constant and impart an arbitrary texture.

In use for a wet suit or a dry suit, for example, a laminate including the heat storage material in the form of a plate or a sheet, the heat storage woven fabric or heat storage nonwoven fabric, and a thermal insulation material consisting of a material different from the polymer according to the present invention can be suitably used to more reliably keep body temperature constant against cold water.

In use for a heat-resistant protective suit or a fire-resistant protective suit, for example, a laminate including the heat storage material in the form of a plate or a sheet, the heat storage woven fabric or heat storage nonwoven fabric, a thermal insulation material consisting of a material different from the polymer according to the present invention, and an emission-insulating material consisting of a material different from the polymer according to the present invention can be suitably used to more reliably keep body temperature constant against a heat-generating object or flame.

Examples of daily necessities include table wear, lunch boxes, water bottles, thermos bottles, body warmers, hot-water bottles, cold packs, and heat-insulating materials for heating with microwave ovens.

In use as a member of table wear or a lunch box, for example, the laminate may be used as a laminate including the heat storage material in the form of a plate, a sheet, or a foam, and a thermal insulation material consisting of a material different from the polymer according to the present invention to more reliably keep food temperature constant against exterior environment temperature.

Examples of fermentation systems to produce compost or biogas by fermenting organic wastes including business or household garbage, sludge, excreta from livestock, etc., and residues from stock raising and fisheries, or woods and grasses include biological garbage disposals, fermenters for compost production, and fermenters for biogas production. In use for the fermentation system, for example, a laminate including the heat storage material in the form of a plate, a sheet, or a foam and a thermal insulation material consisting of a material different from the polymer according to the present invention can be suitably used to more reliably keep inner temperature at a temperature suitable for fermentation against the variation of exterior environment temperature.

Examples of agricultural materials include films for plastic greenhouses, agricultural heat-insulating sheets, hoses/pipes for irrigation, and agricultural electric heating mats for raising seedlings. In use for an agricultural material, for example, a laminate including the heat storage material in the form of a plate, a sheet, or a foam and a thermal insulation material consisting of a material different from the polymer according to the present invention can be suitably used to more reliably keep temperature around agricultural crops at a temperature suitable for growth of agricultural crops against the variation of exterior environment temperature.

EXAMPLES

Hereinafter, the present invention will be described in more detail with reference to Examples and Comparative Examples.

[I] Proportions of the number of constitutional unit (A) derived from ethylene, constitutional unit (B) represented by formula (1.), and constitutional unit (C) represented by formula (2) included in polymer (1) (unit: %)

Nuclear magnetic resonance spectra (hereinafter, abbreviated as "NMR spectra") were determined by using a nuclear magnetic resonance spectrometer (NMR) under the following measurement conditions.

<Carbon Nuclear Magnetic Resonance ($^{13}$C-NMR) Measurement Conditions>

Apparatus: AVANCE III 600HD produced by Bruker BioSpin GmbH
Measurement probe: 10 mm CryoProbe
Measurement solvent: mixed solvent of 1,2-dichlorobenzene/1,1,2,2-tetrachloroethane-$d_2$=85/15 (volume ratio)
Sample concentration: 100 mg/mL
Measurement temperature: 135° C.
Measurement method: proton decoupling method
Number of scans: 256
Pulse width: 45 degrees
Pulse repetition time: 4 seconds
Measurement reference: tetramethylsilane <Proportions of the Number of Constitutional Unit ($A_1$) Derived from Ethylene and Constitutional Unit ($C_1$) Derived from Methyl Acrylate Included in Ethylene-Methyl Acrylate Copolymer> (Unit: %)

Integrated values in the following ranges of $a_1$, $b_1$, $c_1$, $d_1$, and $e_1$ were determined from the $^{13}$C-NMR spectrum acquired for ethylene-methyl acrylate copolymer under the $^{13}$C-NMR measurement conditions, and the contents (proportions of the number) of three dyads (EE, EA, AA) were determined by using the following formulas, and the proportions of the number of the constitutional unit ($A_1$) derived from ethylene and the constitutional unit ($C_1$) derived from methyl acrylate were calculated from the contents. EE represents an ethylene-ethylene dyad, EA represents an ethylene-methyl acrylate dyad, and AA represents a methyl acrylate-methyl acrylate dyad.

$a_1$: 28.1-30.5 ppm
$b_1$: 31.9-32.6 ppm
$c_1$: 41.7 ppm
$d_1$: 43.1-44.2 ppm
$e_1$: 45.0-46.5 ppm
EE=$a_1$/4+$b_1$/2
EA=$e_1$
AA=$c_1$+$d_1$ Proportion of the number of constitutional unit ($A_1$)=100−proportion of the number of constitutional unit ($C_1$)

Proportion of the number of constitutional unit ($C_1$)=100×(EA/2+AA)/(EE+EA+AA)

<Conversion Rate ($X_1$) of Constitutional Unit ($C_1$) Derived from Methyl Acrylate into Constitutional Unit ($B_2$) Represented by Formula (1)> (Unit: %)

In Examples in each of which ethylene-methyl acrylate copolymer and long-chain alkyl alcohol were reacted together to obtain a polymer consisting of the constitutional unit ($A_2$) derived from ethylene, the constitutional unit ($B_2$) represented by the formula (1), and the constitutional unit ($C_2$) derived from methyl acrylate, a $^{13}$C-NMR spectrum was determined for the polymer under the $^{13}$C-NMR measurement conditions and integrated values in the following ranges of $f_1$ and $g_1$ were determined therefrom. Subsequently, the conversion rate ($X_1$) of the constitutional unit ($C_1$) derived from methyl acrylate included in the ethylene-methyl acrylate copolymer into the constitutional unit ($B_2$) of the polymer (1) represented by formula (1) was calculated.

$f_1$: 50.6-51.1 ppm
$g_1$: 63.9-64.8 ppm

Conversion rate ($X_1$)=100×$g_1$/($f_1$+$g_1$)

<Proportions of the Number of Constitutional Unit ($A_2$) Derived from Ethylene, Constitutional Unit ($B_2$) Represented by Formula (1), and Constitutional Unit ($C_2$) Derived from Methyl Acrylate Included in Polymer (1)> (Unit: %)

The proportions of the number of the constitutional unit ($A_2$) derived from ethylene, the constitutional unit ($B_2$) represented by the formula (1), and the constitutional unit ($C_2$) derived from methyl acrylate included in the polymer (1) were calculated by using the following formulas.

Proportion of the number of constitutional unit ($A_2$) included in polymer (1)=proportion of the number of constitutional unit ($A_1$) included in ethylene-methyl acrylate copolymer Proportion of the number of constitutional unit ($B_2$) included in polymer (1)=(proportion of the number of constitutional unit ($C_1$) included in ethylene-methyl acrylate copolymer)×conversion rate ($X_1$)/100

Proportion of the number of constitutional unit ($C_2$) included in polymer (1)=(proportion of the number of constitutional unit ($C_1$) included in ethylene-methyl acrylate copolymer)−(proportion of the number of constitutional unit ($B_2$) included in polymer (1))

The thus-determined proportion of the number of the constitutional unit ($A_2$), proportion of the number of the constitutional unit ($B_2$), and proportion of the number of the constitutional unit ($C_2$) respectively correspond to the proportion of the number of the constitutional unit (A) derived from ethylene, proportion of the number of the constitutional unit (B) represented by the above formula (1), and proportion of the number of the constitutional unit (C) represented by the above formula (1) included in a polymer (unit: %).

[II] Content of Unreacted Compound Including Alkyl Group Having 14 or More and 30 or Less Carbon Atoms (Unit: Wt %)

A product obtained in "Production of polymer (1)" in each Example is a mixture of the polymer (1) and an unreacted compound including an alkyl group having 14 or more and 30 or less carbon atoms. The content of the unreacted compound including an alkyl group having 14 or more and 30 or less carbon atoms in the product was measured in the following manner using gas chromatography (GC). The content of the unreacted compound is a value with respect to 100 wt % of the total weight of the polymer (1) obtained and the unreacted compound.

[GC measurement conditions]
GC apparatus: Shimadzu GC2014
Column: DB-5MS (60 m, 0.25 mmϕ, 1.0 μm)
Column temperature: a column retained at 40° C. was warmed to 300° C. at a rate of 10° C./min, and then retained at 300° C. for 40 minutes
Vaporizing chamber/detector temperature: 300° C./300° C. (FID)
Carrier gas: helium
Pressure: 220 kPa
Total flow rate: 17.0 mL/min
Column flow rate: 1.99 mL/min
Purge flow rate: 3.0 mL/min
Linear velocity: 31.8 cm/sec
Injection mode/sprit ratio: split injection/6:1
Amount of injection: 1 μL
Sample preparation method: 8 mg/mL (o-dichlorobenzene solution)

(1) Preparation of Calibration Curve
[Preparation of Solution]

Into a 9 mL vial, 5 mg of an authentic sample was weighed, and 100 mg of n-tridecane as an internal standard material was weighed therein, and 6 mL of o-dichlorobenzene as a solvent was further added and the sample was completely dissolved to afford a standard solution for preparation of a calibration curve. Two standard solutions were additionally prepared in the described manner except that the quantity of the authentic sample was changed to 25 mg or 50 mg.

[Gc Measurement]

The standard solutions for preparation of a calibration curve were subjected to measurement under the GC measurement conditions described in the previous section to prepare a calibration curve in which the ordinate represented the GC area ratios between the authentic sample and the internal standard material and the abscissa represented the weight ratios between the authentic sample and the internal standard material, and the slope of the calibration curve, a, was determined.

(2) Measurement of Content of Measuring Object (Unreacted Compound Including Alkyl Group Having 14 or More and 30 or Less Carbon Atoms) in Sample (Product)
[Preparation of Solution]

Into a 9 mL vial, 50 mg of a sample and 100 mg of n-tridecane were weighed, and 6 mL of o-dichlorobenzene was further added and the sample was completely dissolved at 80° C. to afford a sample solution.

[Gc Measurement]

The sample solution was subjected to measurement under the GC measurement conditions described in the previous section to determine the content of a measuring object in the sample, $P_S$, by using the following equation.
$P_S$: content of measuring object in sample (wt %)
$W_S$: weight of sample (mg)
$W_{IS}$: weight of internal standard material (IS) (mg)
$A_S$: peak area counts for measuring object
$A_{IS}$: peak area counts for internal standard material (IS)
a: slope of calibration curve for measuring object $$P_S = \frac{W_{IS} \times A_S}{W_S \times A_{IS} \times a} \times 100 \qquad \text{[Formula 1]}$$

[III] Method for Evaluating Physical Properties of Polymer (1)

(1) Melting Peak Temperature, $T_m$ (Unit: ° C.), Enthalpy of Fusion Observed in Temperature Range of 10° C. or Higher and Lower than 60° C., ΔH (Unit: J/g)

In a differential scanning calorimeter (produced by TA Instruments, Inc., DSC Q100) under nitrogen atmosphere, an aluminum pan encapsulating approximately 5 mg of a sample therein was (1) retained at 150° C. for 5 minutes, and then (2) cooled from 150° C. to −50° C. at a rate of 5° C./min, and then (3) retained at −50° C. for 5 minutes, and then (4) warmed from −50° C. to 150° C. at a rate of 5° C./min. A differential scanning calorimetry curve acquired in the calorimetry of the process (4) was defined as a melting curve. The melting curve was analyzed by using a method in accordance with JIS K7121-1987 to determine the melting peak temperature, $T_m$.

A part in the temperature range of 10° C. or higher and lower than 60° C. in the melting curve was analyzed by using a method in accordance with JIS K7122-1987 to determine the enthalpy of fusion, $\Delta H_1$ (J/g).

A part in the temperature range of the melting peak temperature minus 5° C. or higher and the melting peak temperature plus 5° C. or lower in the melting curve was analyzed by using a method in accordance with JIS K7122-1987 to determine the enthalpy of fusion, $\Delta H_2$ (J/g), where the melting peak temperature was one determined in the aforementioned method.

It can be said that as the ratio of $\Delta H_2$ to $\Delta H_1$ is higher, the melting peak is sharper.

(2) Ratio Defined as Formula (I), A (Unit: None)

Absolute molecular weight and intrinsic viscosity were measured for the polymer (1) and Polyethylene Standard Reference Material 1475a (produced by National Institute of Standards and Technology) through gel permeation chromatography (GPC) with an apparatus including a light scattering detector and a viscosity detector.

GPC apparatus: Tosoh HLC-8121 GPC/HT
Light scattering detector: Precision Detectors PD2040
Differential viscometer: Viscotek H502
GPC column: Tosoh GMHHR-H (S) HT×3
Concentration of sample solution: 2 mg/mL
Amount of injection: 0.3 mL
Measurement temperature: 155° C.
Dissolution conditions: 145° C. 2 hr
Mobile phase: ortho-dichlorobenzene (with 0.5 mg/mL of BHT)
Flow rate in elution: 1 mL/min
Measurement time: approx. 1 hr

[Gpc Apparatus]

An HLC-8121 GPC/HT from Tosoh Corporation was used as a GPC apparatus equipped with a differential refractometer (RI). A PD2040 from Precision Detectors, Inc., as a light scattering detector (LS), was connected to the GPC apparatus. The scattering angle used in detection of light scattering was 90° C. Further, an H502 from Viscotek Corp., as a viscosity detector (VISC), was connected to the GPC apparatus. The LS and the VISC were set in a column oven of the GPC apparatus, and the LS, the RI, and the VISC were connected together in the order presented. For calibration for the LS and the VISC and correction of delay volumes between detectors, the polystyrene standard reference material Polycal TDS-PS-N (weight-average molecular weight, Mw: 104349, polydispersity: 1.04) from Malvern Instruments Limited was used with a solution concentration of 1 mg/mL. Ortho-dichlorobenzene to which dibutylhydroxytoluene in a concentration of 0.5 mg/mL had been added as a stabilizer was used for the mobile phase and the solvent. The dissolution conditions for the sample were 145° C. and 2 hours. The flow rate was 1 mL/min. Three columns of Tosoh GMHHR-H (S) HT were connected together for use as a column. The temperatures of the column, the sample injection part, and the detectors were each 155° C. The concentration of the sample solution was 2 mg/mL. The amount of the sample solution to be injected (sample loop volume) was 0.3 mL. The refractive index increment for the NIST 1475a and the sample in ortho-dichlorobenzene (dn/dc) was −0.078 mL/g. The dn/dc for the polystyrene standard reference material was 0.079 mL/g. In determining absolute molecular weight and intrinsic viscosity ([η]) from data from the detectors, calculation was made by using the data processing software OmniSEC (version 4.7) from Malvern Instruments Limited with reference to the literature "Size Exclusion Chromatography, Springer (1999)". The refractive index increment is the change rate of the refractive index to concentration change.

$\alpha_1$ and $\alpha_0$ in the formula (I) were determined in the following manner and they were substituted into the formula (I) to determine A.

$$A = \alpha_1/\alpha_0 \quad (I)$$

$\alpha_1$ represents a value obtained by using a method including: plotting measurements in a manner such that logarithms of the absolute molecular weight of the polymer (1) were plotted on an abscissa and logarithms of the intrinsic viscosity of the polymer (1) were plotted on an ordinate; and performing least squares approximation for the logarithms of the absolute molecular weight and the logarithms of the intrinsic viscosity by using a formula (I-I) within a range of the logarithm of the weight-average molecular weight of the polymer (1) or more and the logarithm of the z-average molecular weight of the polymer (1) or less along the abscissa to derive the slope of the line representing the formula (I-I) as $\alpha_1$:

$$\log[\eta_1] = \alpha_1 \log M_1 + \log K_1 \quad (I\text{-}I)$$

wherein
$[\eta_1]$ represents the intrinsic viscosity (unit: dl/g) of the polymer, $M_1$ represents the absolute molecular weight of the polymer, and $K_1$ represents a constant.

$\alpha_0$ represents a value obtained by using a method including: plotting measurements in a manner such that logarithms of the absolute molecular weight of the Polyethylene Standard Reference Material 1475a were plotted on an abscissa and logarithms of the intrinsic viscosity of the Polyethylene Standard Reference Material 1475a were plotted on an ordinate; and performing least squares approximation for the logarithms of the absolute molecular weight and the logarithms of the intrinsic viscosity by using a formula (I-II) within a range of the logarithm of the weight-average molecular weight of the Polyethylene Standard Reference Material 1475a or more and the logarithm of the z-average molecular weight of the Polyethylene Standard Reference Material 1475a or less along the abscissa to derive the slope of the line representing the formula (I-II) as $\alpha_0$:

$$\log[\eta_0] = \alpha_0 \log M_0 + \log K_0 \quad (I\text{-}II)$$

wherein
$[\eta_0]$ represents the intrinsic viscosity (unit: dl/g) of the Polyethylene Standard Reference Material 1475a, $M_0$ represents the absolute molecular weight of the Polyethylene Standard Reference Material 1475a, and $K_0$ represents a constant.

[IV] Raw Materials

<Copolymer Including Constitutional Unit (A) and Constitutional Unit (C)>

A-1: Ethylene-Methyl Acrylate Copolymer

Ethylene-methyl acrylate copolymer A-1 was produced as follows.

In an autoclave reactor, ethylene and methyl acrylate were copolymerized with tert-butyl peroxypivalate as a radical polymerization initiator at a reaction temperature of 195° C. under a reaction pressure of 160 MPa to afford ethylene-methyl acrylate copolymer A-1. The composition and MFR of the copolymer A-1 obtained were as follows.
Proportion of the number of constitutional unit derived from ethylene: 87.1% (68.8 wt %)
Proportion of the number of constitutional unit derived from methyl acrylate: 12.9% (31.2 wt %)
MFR (measured at 190° C., 21 N): 40.5 g/10 min A-2: Ethylene-Methyl Acrylate Copolymer Ethylene-methyl acrylate copolymer A-2 was produced as follows.

In an autoclave reactor, ethylene and methyl acrylate were copolymerized with tert-butyl peroxypivalate as a radical polymerization initiator at a reaction temperature of 195° C. under a reaction pressure of 160 MPa to afford ethylene-methyl acrylate copolymer A-2. The composition and MFR of the copolymer A-2 obtained were as follows.
Proportion of the number of constitutional unit derived from ethylene: 84.0% (63.2 wt %)
Proportion of the number of constitutional unit derived from methyl acrylate: 16.0% (36.8 wt %)
MFR (measured at 190° C., 21 N): 43.0 g/10 min <Compound Including Alkyl Group Having 14 or More and 30 or Less Carbon Atoms>

B-1: KALCOL 220-80 (mixture of n-docosyl alcohol, n-eicosyl alcohol, and n-octadecyl alcohol) [produced by Kao Corporation]

B-2: KALCOL 8098 (n-octadecyl alcohol) [produced by Kao Corporation]

B-3: GINOL-18 (n-octadecyl alcohol) [produced by GODREJ]

B-4: GINOL-16 (n-hexadecyl alcohol) [produced by GODREJ]

B-5: n-Docosyl acrylate [produced by Tokyo Chemical Industry Co., Ltd.]

B-6: n-Octadecyl methacrylate [produced by Tokyo Chemical Industry Co., Ltd.]

<Catalyst>

C-1: TA-90 (tetra(n-octadecyl) orthotitanate) [produced by Matsumoto Fine Chemical Co. Ltd.]

C-2: Tetra(isopropyl) orthotitanate [produced by Nippon Soda Co., Ltd.]

<Azo Compound>

E-1: Azobisisobutyronitrile (10-hour half-life temperature: 65° C.) [produced by Tokyo Chemical Industry Co., Ltd.]

Reference Example 1

(1) Production of Polymer Consisting of Constitutional Unit (A), Constitutional Unit (B), and Constitutional Unit (C) (Ethylene-n-Docosyl Acrylate-n-Eicosyl Acrylate-n-Octadecyl Acrylate-Methyl Acrylate Copolymer)

The inside of a reactor equipped with a stirrer was purged with nitrogen, and then A-1: 100 parts by weight, B-1: 97.4 parts by weight, and C-1: 2.1 parts by weight were added, and heated and stirred with the jacket temperature set at 140° C. under a reduced pressure of 1 kPa for 12 hours to afford a polymer (cf1) (ethylene-n-docosyl acrylate-n-eicosyl acrylate-n-octadecyl acrylate-methyl acrylate copolymer). Evaluation results for the polymer (cf1) are shown in Table 1. The contents of alcohols contained in B-1 used as a raw material are shown in Table 3.

Reference Example 2

(1) Production of Polymer Consisting of Constitutional Unit (A), Constitutional Unit (B), and Constitutional Unit (C) (Ethylene-n-Octadecyl Acrylate-Methyl Acrylate Copolymer)

A polymer (cf2) (ethylene-n-octadecyl acrylate-methyl acrylate copolymer) was obtained in the same manner as in Reference Example 1(1) except that B-1: 97.4 parts by weight was replaced with B-2: 82.2 parts by weight and C-1: 2.1 parts by weight was replaced with C-1: 0.8 parts by weight Evaluation results for the polymer (cf2) are shown in Table 1. The contents of alcohols contained in B-2 used as a raw material are shown in Table 3.

Reference Example 3

(1) Production of Polymer Consisting of Constitutional Unit (A), Constitutional Unit (B), and Constitutional Unit (C) (Ethylene-n-Octadecyl Acrylate-Methyl Acrylate Copolymer)

The inside of a reactor equipped with a stirrer was purged with nitrogen, and then A-2: 100 parts by weight, B-3: 100.4 parts by weight, and C-2: 0.6 parts by weight were added, and heated and stirred with the jacket temperature set at 150° C. under a reduced pressure of 1 kPa for 6 hours to afford a polymer (cf3) (ethylene-n-octadecyl acrylate-methyl acrylate copolymer). Evaluation results for the polymer (cf3) are shown in Table 1. The contents of alcohols contained in B-3 used as a raw material are shown in Table 3.

Reference Example 4

(1) Production of Polymer Consisting of Constitutional Unit (A), Constitutional Unit (B), and Constitutional Unit (C) (Ethylene-n-Hexadecyl Acrylate-Methyl Acrylate Copolymer)

A polymer (cf4) (ethylene-n-octadecyl acrylate-methyl acrylate copolymer) was obtained in the same manner as in Reference Example 1(1) except that B-3: 100.4 parts by weight was replaced with B-4: 89.9 parts by weight. Evaluation results for the polymer (cf4) are shown in Table 1. The contents of alcohols contained in B-4 used as a raw material are shown in Table 3.

Reference Example 5

(1) Production of Polymer Consisting of Constitutional Unit (B) (n-Docosyl Acrylate Homopolymer)

A flask having an inner volume of 100 mL was dried under reduced pressure and the inside was then purged with nitrogen, into which B-5: 10.0 g was added, and heated and stirred with the inner temperature set at 50° C. to completely dissolve B-5. Subsequently, E-1: 21.6 mg was added thereto, and the resultant was heated and stirred with the inner temperature set at 80° C. for 80 minutes, and the product was washed with 100 mL of ethanol and vacuum-dried at 120° C. to afford a polymer (cf5) (n-docosyl acrylate homopolymer). Physical property values and evaluation results for the polymer (cf5) are shown in Table 2.

Reference Example 6

(1) Production of Polymer Consisting of Constitutional Unit (B) (n-Octadecyl Methacrylate Homopolymer)

A polymer (cf6) (n-octadecyl methacrylate homopolymer) was obtained in the same manner as in Reference Example 5(1) except that the inner volume of 100 mL was changed to 300 mL, B-5: 10.0 g was replaced with B-6: 126.7 g, E-1: 21.6 mg was replaced with E-1: 307.3 mg, and 100 mL of ethanol was replaced with 1000 mL of ethanol. Physical property values and evaluation results for the polymer (cf6) are shown in Table 2.

Example 1

(1) Production of Polymer Consisting of Constitutional Unit (A), Constitutional Unit (B), and Constitutional Unit (C) (Ethylene-n-Docosyl Acrylate-n-Eicosyl Acrylate-n-Octadecyl Acrylate-Methyl Acrylate Copolymer)

The inside of a separable flask equipped with a stirrer and a finger baffle and having an inner volume of 0.3 L was purged with nitrogen, and then A-1: 80.00 g, B-1: 38.56 g, B-2: 32.54 g, and C-1: 0.65 g were added, and heated and stirred with the oil bath temperature set at 130° C. under a reduced pressure of 1 kPa for 12 hours to afford a polymer (ex1) (ethylene-n-docosyl acrylate-n-eicosyl acrylate-n-octadecyl acrylate-methyl acrylate copolymer). Evaluation results for the polymer (ex1) are shown in Table 1. The contents of alcohols contained in the mixture of B-1 and B-2 with respect to 100 mol % of the total of B-1 and B-2 used as raw materials are shown in Table 23.

Example 2

(1) Production of Polymer Consisting of Constitutional Unit (A), Constitutional Unit (B), and Constitutional Unit (C) (Ethylene-n-Octadecyl Acrylate-n-Hexadecyl Acrylate-Methyl Acrylate Copolymer)

The inside of a reactor equipped with a stirrer was purged with nitrogen, and then A-2: 100 parts by weight, B-3: 65.2 parts by weight, B-4: 31.5 parts by weight, and C-2: 0.6 parts by weight were added, and heated and stirred with the jacket temperature set at 150° C. under a reduced pressure of 1 kPa for 6 hours to afford a polymer (ex2) (ethylene-n-octadecyl acrylate-n-hexadecyl acrylate-methyl acrylate copolymer). Evaluation results for the polymer (ex2) are shown in Table 1. The contents of alcohols contained in the mixture of B-3 and B-4 with respect to 100 mol % of the total of B-3 and B-4 used as raw materials are shown in Table 3.

Example 3

(1) Production of Polymer Consisting of Constitutional Unit (B) (n-Docosyl Acrylate-n-Octadecyl Methacrylate Copolymer)

A flask having an inner volume of 100 mL was dried under reduced pressure and the inside was then purged with nitrogen, into which B-5: 5.6 g and B-6: 5.0 g were added, and heated and stirred with the inner temperature set at 50° C. to completely dissolve the mixture of B-5 and B-6. Subsequently, E-1: 24.2 mg was added thereto, and the resultant was heated and stirred with the inner temperature set at 80° C. for 3 hours, and the product was washed with 100 mL of ethanol and vacuum-dried at 120° C. to afford a polymer (ex3) (n-docosyl acrylate-n-octadecyl methacrylate copolymer). Physical property value and evaluation results for the polymer (ex3) are shown in Table 2. The melting curve for the polymer (ex3) is shown in FIG. 1. The contents of (meth)acrylates contained in the mixture of B-5 and B-6 with respect to 100 mol % of the total of B-5 and B-6 used as raw materials are shown in Table 4.

Comparative Example 1

(1) Production of Resin Composition Containing Polymer (Ethylene-n-Docosyl Acrylate-n-Eicosyl Acrylate-n-Octadecyl Acrylate-Methyl Acrylate Copolymer) and Polymer (Ethylene-n-Octadecyl Acrylate-Methyl Acrylate Copolymer) Each Consisting of Constitutional Unit (A), Constitutional Unit (B), and Constitutional Unit (C)

The polymer (cf1) obtained in Reference Example 1(1): 35.0 g (50 parts by weight) and the polymer (cf2) obtained in Reference Example 2(1): 35.0 g (50 parts by weight) were kneaded together by using a LABO PLASTOMILL (produced by Toyo Seiki Seisaku-sho, Ltd., model: 65C150) under nitrogen atmosphere with a rotational frequency of 80 rpm and a chamber temperature of 100° C. for 10 minutes to afford a resin composition (ref1). Evaluation results for the resin composition (ref1) are shown in Table 1. The melting curve for the resin composition (ref3) is shown in FIG. 1.

Comparative Example 2

(1) Production of Resin Composition Containing Polymer (Ethylene-n-Octadecyl Acrylate-Methyl Acrylate Copolymer) and Polymer (Ethylene-n-Hexadecyl Acrylate-Methyl Acrylate Copolymer) Each Consisting of Constitutional Unit (A), Constitutional Unit (B), and Constitutional Unit (C)

The polymer (cf3) obtained in Reference Example 3(1): 7.8 g (65 parts by weight) and the polymer (cf4) obtained in Reference Example 4(1): 4.2 g (35 parts by weight) were kneaded together by using a compact kneading machine (produced by DSM, Xplore) under nitrogen atmosphere with a rotational frequency of 200 rpm and a chamber temperature of 100° C. for 5 minutes to afford a resin composition (ref2). Evaluation results for the resin composition (ref2) are shown in Table 1.

Comparative Example 3

(1) Production of Resin Composition Containing Polymer (n-Docosyl Acrylate Homopolymer) and Polymer (n-Octadecyl Acrylate Homopolymer) Each Consisting of Constitutional Unit (B)

The polymer (cf5) obtained in Reference Example 5(1): 6.0 g (50 parts by weight) and the polymer (cf6) obtained in Reference Example 6(1): 6.0 g (50 parts by weight) were kneaded together by using a compact kneading machine (produced by DSM, Xplore) under nitrogen atmosphere with a rotational frequency of 200 rpm and a chamber temperature of 100° C. for 5 minutes to afford a resin composition (ref3). Evaluation results for the resin composition (ref3) are shown in Table 2.

TABLE 1

| Polymer | | Reference Example 1 | Reference Example 2 | Reference Example 3 | Reference Example 4 | Example 1 | Example 2 | Comparative Example 1 | Comparative Example 2 |
|---|---|---|---|---|---|---|---|---|---|
| Constitutional unit (A) | % | 87.1 | 87.1 | 84.0 | 84.0 | 87.1 | 84.0 | — | — |
| Constitutional unit (B) | % | 10.9 | 10.8 | 13.4 | 13.5 | 10.7 | 13.5 | — | — |
| Constitutional unit (C) | % | 2.0 | 2.0 | 2.5 | 2.5 | 2.2 | 2.5 | — | — |
| Content of unreacted compound including alkyl group having 14 or more and 30 or less carbon atoms | wt % | 1.2 | 0.6 | 1.2 | 1.2 | 0.6 | 1.2 | — | — |
| Melting peak temperature, $T_m$ | ° C. | 51 | 36 | 35 | 23 | 43 | 31 | 40 | 33 |
| Enthalpy of fusion, $\Delta H_1$ (10 to 60° C.) | J/g | 92 | 81 | 86 | 66 | 85 | 78 | 88 | 75 |
| Enthalpy of fusion, $\Delta H_2$ ($T_m - 5$° C. to $T_m + 5$° C.) | J/g | — | — | — | — | 42 | 38 | 32 | 32 |
| Number-average molecular weight, Mn | g/mol | 45,000 | 41,000 | 37,000 | 30,000 | 36,000 | 24,000 | — | — |

TABLE 1-continued

| Polymer | | Reference Example 1 | Reference Example 2 | Reference Example 3 | Reference Example 4 | Example 1 | Example 2 | Comparative Example 1 | Comparative Example 2 |
|---|---|---|---|---|---|---|---|---|---|
| Weight-average molecular weight, Mw | g/mol | 302,000 | 163,000 | 219,000 | 140,000 | 228,000 | 162,000 | — | — |
| z-Average molecular weight, Mz | g/mol | 1,856,000 | 1,134,000 | 1,684,000 | 604,000 | 4,057,000 | 755,000 | — | — |
| Ratio represented by formula (I), A | | 0.65 | 0.78 | 0.52 | 0.61 | 0.44 | 0.61 | — | — |

TABLE 2

| Polymer | | Reference Example 5 | Reference Example 6 | Example 3 | Comparative Example 3 |
|---|---|---|---|---|---|
| Constitutional unit (A) | % | — | — | — | — |
| Constitutional unit (B) | % | 100.0 | 100.0 | 100.0 | 100.0 |
| Constitutional unit (C) | % | — | — | — | — |
| Content of unreacted compound including alkyl group having 14 or more and 30 or less carbon atoms | wt % | — | — | — | — |
| Melting peak temperature, $T_m$ | °C. | 66 | 35 | 45 | 66 |
| Enthalpy of fusion, $\Delta H_1$ (10 to 60° C.) | J/g | 20 | 69 | 97 | 51 |
| Enthalpy of fusion, $\Delta H_2$ ($T_m - 5$° C. to $T_m + 5$° C.) | J/g | — | — | 53 | 46 |
| Number-average molecular weight, Mn | g/mol | 82,000 | 209,000 | 197,000 | — |
| Weight-average molecular weight, Mw | g/mol | 871,000 | 2,154,000 | 1,820,000 | — |
| z-Average molecular weight, Mz | g/mol | 5,190,000 | 12,531,000 | 14,877,000 | — |
| Ratio represented by formula (I), A | | 0.80 | 0.58 | 0.49 | — |

TABLE 3

| Content of compound including alkyl group having 14 or more and 30 or less carbon atoms in raw materials | | Reference Example 1 | Reference Example 2 | Reference Example 3 | Reference Example 4 | Example 1 | Example 1 |
|---|---|---|---|---|---|---|---|
| n-Docosyl alcohol | mol % | 88 | — | — | — | 44 | — |
| n-Eicosyl alcohol | mol % | 10 | — | 1 | — | 5 | — |
| n-Octadecyl alcohol | mol % | 1 | 99 | 98 | 2 | 50 | 65 |
| 11-Hexadecyl alcohol | mol % | — | — | 1 | 98 | — | 35 |

TABLE 4

| Content of compound including alkyl group having 14 or more and 30 or less carbon atoms in raw materials | | Reference Example 5 | Reference Example 6 | Example 3 |
|---|---|---|---|---|
| n-Docosyl acrylate | mol % | 100 | — | 50 |
| n-Octadecyl methacrylate | mol % | — | 100 | 50 |
| n-Hexadecyl acrylate | mol % | — | — | — |

In the attempts to obtain a polymer having a melting peak temperature of approximately 40° C., the polymer (ex1) obtained in Example 1 had a melting peak temperature of 43° C. and the resin composition (ref1) obtained in Comparative Example 1 had a melting peak temperature of 40° C., and these results suggest that the melting peak temperature was successfully adjusted to the intended temperature for both the polymer (ex1) and the resin composition (ref1), where the $\Delta H_2/\Delta H_1$ of the polymer (ex1) was 0.49 while the $\Delta H_2/\Delta H_1$ of the resin composition (ref1) was 0.36 and thus the melting peak of the polymer (ex1) was sharper than the melting peak of the resin composition (ref1).

In the attempts to obtain a polymer having a melting peak temperature of approximately 30° C., the polymer (ex2) obtained in Example 2 had a melting peak temperature of 31° C. and the resin composition (ref2) obtained in Comparative Example 2 had a melting peak temperature of 33° C., and these results suggest that the melting peak temperature was successfully adjusted to the intended temperature for both the polymer (ex2) and the resin composition (ref2), where the $\Delta H_2/\Delta H_1$ of the polymer (ex2) was 0.49 while the $\Delta H_2/\Delta H_1$ of the resin composition (ref2) was 0.43 and thus the melting peak of the polymer (ex2) was sharper than the melting peak of the resin composition (ref2).

In the attempt to obtain a polymer having a melting peak temperature of approximately 45° C., the polymer (ex3) obtained in Example 3 had a melting peak temperature of 45° C., and this result suggests that the melting peak temperature was successfully adjusted to the intended temperature, and the $\Delta H_2/\Delta H_1$ of the polymer (ex3) was 0.55, and the melting peak of the polymer (ex3) was sharp.

In order to obtain a polymer having a melting peak temperature of approximately 45° C., the polymer (cf5) obtained in Reference Example 5, which had a melting peak temperature of 66° C., and the polymer (cf6) obtained in Reference Example 6, which had a melting peak temperature of 35° C., were kneaded together to prepare the resin composition (ref3) in Comparative Example 3, but the melting peak temperature of the resin composition (ref3) was 66° C. and thus the melting peak temperature was not successfully adjusted to the intended temperature.

The invention claimed is:

1. A polymer comprising:
two or more kinds of constitutional units containing an alkyl group having 14 or more and 30 or less carbon atoms, wherein
proportions of the number of the two or more kinds of constitutional units containing an alkyl group having 14 or more and 30 or less carbon atoms are each 20% or more, with respect to 100% of a total number of all constitutional units containing an alkyl group having 14 or more and 30 or less carbon atoms, and
an enthalpy of fusion of the polymer observed within a temperature range of 10° C. or higher and lower than 60° C. in differential scanning calorimetry is 30 J/g or more,
   wherein the polymer comprises a constitutional unit (A) derived from ethylene and a constitutional unit (B) represented by the following formula (1), and optionally comprises at least one constitutional unit (C) selected from the group consisting of a constitutional unit represented by the following formula (2) and a constitutional unit represented by the following formula (3);
   wherein a proportion of a number of a constitutional unit (A) is 70% or more and 99% or less and a proportion of a number of the constitutional unit (B) and the constitutional unit (C) in total is 1% or more and 30% or less, with respect to 100% of a total number of the constitutional unit (A), the constitutional unit (B) and the constitutional unit (C); and
   wherein a proportion of the number of the constitutional unit (B) is 1% or more and 100% or less and a proportion of the number of the constitutional unit (C) is 0% or more and 99% or less, with respect to 100% of a total number of a constitutional unit (B) and the constitutional unit (C):

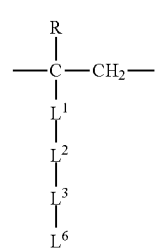

formula (1)

wherein
R represents a hydrogen atom or a methyl group;
$L^1$ represents a single bond, —CO—O—, —O—CO—, or —O—;
$L^2$ represents a single bond, —CH$_2$—, —CH$_2$—CH$_2$—, —CH$_2$—CH$_2$—CH$_2$—, —CH$_2$—CH(OH)—CH$_2$—, or —CH$_2$—CH(CH$_2$OH)—;
$L^3$ represents a single bond, —CO—O—, —O—CO—, —O—, —CO—NH—, —NH—CO—, —CO—NH—CO—, —NH—CO—NH—, —NH—, or —N(CH$_3$)—;
$L^6$ represents an alkyl group having 14 or more and 30 or less carbon atoms; and
a left side and a right side of each of the horizontal chemical formulas for describing chemical structures of $L^1$, $L^2$, and $L^3$ correspond to an upper side of the formula (1) and a lower side of the formula (1), respectively,

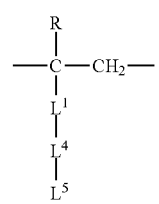

formula (2)

wherein
R represents a hydrogen atom or a methyl group;
$L^1$ represents a single bond, —CO—O—, —O—CO—, or —O—;
$L^4$ represents an alkylene group having one or more and eight or less carbon atoms;
$L^5$ represents a hydrogen atom, an epoxy group, —CH(OH)—CH$_2$OH, a carboxy group, a hydroxy group, an amino group, or an alkylamino group having one or more and four or less carbon atoms; and
a left side and a right side of each of the horizontal chemical formulas for describing a chemical structure of $L^1$ correspond to an upper side of the formula (2) and a lower side of the formula (2), respectively,

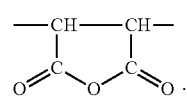

formula (3)

2. The polymer according to claim 1, wherein a proportion of the number of the constitutional unit (A), the constitutional unit (B) and the constitutional unit (C) in total is 90% or more, with respect to 100% of a total number of all constitutional units contained in the polymer.

3. The polymer according to claim 1, wherein a ratio A, defined as the following formula (I), is 0.95 or lower:

$$A = \alpha_1 / \alpha_0 \qquad (I)$$

wherein $\alpha_1$ represents a value obtained by using a method comprising: measuring an absolute molecular weight and an intrinsic viscosity of a polymer by using gel permeation chromatography with an apparatus equipped with a light scattering detector and a viscosity detector; plotting measurements in such a manner that logarithms of absolute molecular weight are plotted on an abscissa and logarithms of intrinsic viscosity are plotted on an ordinate; and performing least squares approximation for the logarithms of the absolute molecular weight and the logarithms of the intrinsic viscosity by using formula (I-I) within a range of not less than a logarithm of a weight-average molecular weight of the polymer and not more than a logarithm of a z-average molecular weight of the polymer along the abscissa to derive a slope of a line representing the formula (I-I) as $\alpha_1$:

$$\log[\eta_1] = \alpha_1 \log M_1 + \log K_1 \qquad (I\text{-}I)$$

wherein $[\eta_1]$ represents an intrinsic viscosity (unit: dl/g) of the polymer, $M_1$ represents an absolute molecular weight of the polymer, and $K_1$ represents a constant; and $\alpha_0$ represents a value obtained by using a method comprising: measuring an absolute molecular weight and an intrinsic viscosity of Polyethylene Standard Reference Material 1475a produced by National Institute of Standards and Technology by using gel permeation chromatography with an apparatus equipped with a light scattering detector and a viscosity detector; plotting measurements in such a manner that logarithms of absolute molecular weight are plotted on an abscissa and logarithms of intrinsic viscosity are plotted on an ordinate; and performing least squares approximation for the logarithms of the absolute molecular weight and the logarithms of the intrinsic viscosity by using the formula (I-II) within a range of not less than a logarithm of a weight-average molecular weight of the Polyethylene Standard Reference Material 1475a and not more than a logarithm of a z-average molecular weight of the Polyethylene Standard Reference Material 1475a along the abscissa to derive a slope of a line representing the formula (I-II) as $\alpha_0$:

$$\log[\eta_0] = \alpha_0 \log M_0 + \log K_0 \qquad (I\text{-}II)$$

wherein $[\eta_0]$ represents an intrinsic viscosity (unit: dl/g) of the Polyethylene Standard Reference Material 1475a, $M_0$ represents an absolute molecular weight of the Polyethylene Standard Reference Material 1475a, and $K_0$ represents a constant, provided that in the measurement of the absolute molecular weight and the intrinsic viscosity of each of the polymer and the Polyethylene Standard Reference Material 1475a by using gel permeation chromatography, a mobile phase is ortho-dichlorobenzene and the measurement temperature is 155° C.

4. The polymer according to claim 1, wherein the polymer is a crosslinked polymer.

5. The polymer according to claim 1, wherein a gel fraction of the polymer is 20 wt % or more.

6. A molded article comprising the polymer according to claim 1.

7. A foam comprising the polymer according to claim 1.

8. A resin composition comprising:

a polymer (1) which is the polymer according to claim 1; and a polymer (2) which is a polymer whose melting peak temperature or glass transition temperature observed in differential scanning calorimetry is 50° C. or higher and 180° C. or lower, provided that the polymer (2) is different from an excluded polymer defined below, wherein a content of the polymer (1) is 30 wt % or more and 99 wt % or less and a content of the polymer (2) is 1 wt % or more and 70 wt % or less, with respect to 100 wt % of the total amount of the polymer (1) and the polymer (2), the excluded polymer is a polymer comprising two or more kinds of constitutional units containing an alkyl group having 14 or more and 30 or less carbon atoms, proportions of the number of the two or more kinds of constitutional units containing an alkyl group having 14 or more and 30 or less carbon atoms in the excluded polymer are each 20% or more, with respect to 100% of the total number of all constitutional units containing an alkyl group having 14 or more and 30 or less carbon atoms, and an enthalpy of fusion of the excluded polymer observed in a temperature range of 10° C. or higher and lower than 60° C. in differential scanning calorimetry is 30 J/g or more.

9. A production method for the polymer according to claim 1, comprising:

a step of reacting a polymer comprising at least one constitutional unit (C) selected from the group consisting of a constitutional unit represented by the following formula (2) and a constitutional unit represented by the following formula (3) with two or more kinds of compounds selected from the group consisting of an alcohol containing an alkyl group having 14 or more and 30 or less carbon atoms, an amine containing an alkyl group having 14 or more and 30 or less carbon atoms, an alkyl halide containing an alkyl group having 14 or more and 30 or less carbon atoms, a carboxylic acid containing an alkyl group having 14 or more and 30 or less carbon atoms, a carboxamide containing an alkyl group having 14 or more and 30 or less carbon atoms, a carboxylic acid halide containing an alkyl group having 14 or more and 30 or less carbon atoms, a carbamic acid containing an alkyl group having 14 or more and 30 or less carbon atoms, an alkylurea containing an alkyl group having 14 or more and 30 or less carbon atoms, and an isocyanate containing an alkyl group having 14 or more and 30 or less carbon atoms, wherein contents of the two or more kinds of compounds are each 20 mol % or more, with respect to 100 mol % of the total amount of compounds used in the step:

formula (2)

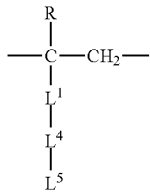

wherein

R represents a hydrogen atom or a methyl group;

$L^1$ represents —CO—O—, —O—CO—, or —O—;

$L^4$ represents an alkylene group having one or more and eight or less carbon atoms;

$L^5$ represents a hydrogen atom, an epoxy group, —CH(OH)—CH$_2$OH, a carboxy group, a hydroxy group, an amino group, or an alkylamino group having one or more and four or less carbon atoms; and a left side and a right side of each of the horizontal chemical formulas for describing a chemical structure of $L^1$ correspond to an upper side of the formula (2) and a lower side of the formula (2), respectively, formula (3)

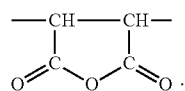

* * * * *